(12) United States Patent
Mita

(10) Patent No.: US 6,243,490 B1
(45) Date of Patent: *Jun. 5, 2001

(54) DATA PROCESSING USING NEURAL NETWORKS HAVING CONVERSION TABLES IN AN INTERMEDIATE LAYER

(75) Inventor: Yoshinobu Mita, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,832

(22) Filed: Nov. 13, 1997

Related U.S. Application Data

(62) Division of application No. 08/026,093, filed on Mar. 4, 1994, now Pat. No. 5,719,955, which is a continuation of application No. 07/713,141, filed on Jun. 11, 1991, now abandoned.

(30) Foreign Application Priority Data

| Jun. 14, 1990 | (JP) | 2-153938 |
| Jun. 14, 1990 | (JP) | 2-153939 |
| Jun. 19, 1990 | (JP) | 2-161903 |
| Jun. 19, 1990 | (JP) | 2-161904 |
| Jun. 19, 1990 | (JP) | 2-161907 |
| Jun. 19, 1990 | (JP) | 2-161908 |

(51) Int. Cl.$^7$ .................................................. G06T 1/40

(52) U.S. Cl. ............................................. 382/158; 706/26

(58) Field of Search ..................................... 382/156, 157, 382/158; 706/15, 41, 42, 43, 26; 364/757, 760.03, 148.03

(56) References Cited

U.S. PATENT DOCUMENTS

| 4,718,031 | * | 1/1988 | Nukiyama | 708/625 |
| 4,782,398 | | 11/1988 | Mita | 358/443 |
| 4,864,529 | * | 9/1989 | Shah et al. | 708/630 |
| 4,941,122 | | 7/1990 | Weideman | 382/158 |
| 4,994,982 | * | 2/1991 | Duranton et al. | 706/41 |
| 5,033,006 | | 7/1991 | Ishizuka et al. | 706/25 |
| 5,058,179 | * | 10/1991 | Denker et al. | 382/158 |
| 5,091,864 | * | 2/1992 | Baji et al. | 706/42 |
| 5,251,269 | | 10/1993 | Korner et al. | 382/158 |
| 5,253,330 | | 10/1993 | Ramacher et al. | 706/42 |
| 5,309,525 | | 5/1994 | Shimomura et al. | 382/157 |

FOREIGN PATENT DOCUMENTS

2224139  4/1990  (EP).

OTHER PUBLICATIONS

Zhao et al. "A Simple Design of FIR Filters with Powers–of–Two Coefficients." IEEE Transactions on Circuits and Systems, vol. 35, No. 5, pp. 566–570, May 1988.*

Marchesi et al. "Design of Multi–Layer Neural Networks with Powers–of–Two Weights." 1990 IEEE International Symposium on Circuitts and Systems, vol. 4, pp. 2951–2954, May 1, 1990.*

Lim et al. "Design of Cascade Form FIR Filters with Discrete Valued Coefficients." IEEE Trans. on Acoustics, Speech and Signal Processing, vol. 36, No. 11, pp. 1735–1739, Nov. 1988.*

(List continued on next page.)

Primary Examiner—Jon Chang
(74) Attorney, Agent, or Firm—Fitzpatrick, Cella, Harper & Scinto

(57) ABSTRACT

In a neural network which includes one input layer, one or more intermediate layers and one output layer, neural elements in the input layer and neural elements in the intermediate layer are divided into groups. Arithmetic operations representing the coupling between the neural elements of the input layer and the neural elements of the intermediate layer are put into table form.

12 Claims, 34 Drawing Sheets

OTHER PUBLICATIONS

Lim et al., "VLSI Circuits for Decomposing Binary Integers into Signed Power–of–Two Terms." 1990 IEEE International Symposium on Circuits and Systems, vol. 3, pp. 2304–2307, May 1, 1990.*

"Color Correction of Hard Color Copies Using a Neural Network" in Image Electronics Engineers of Japan, Chu et al., 1989.

R. Floyd & L. Steinberg, "An Adaptive Algorithm for Spatial Grey Scale," SID International SYMP. Syp. Digest of Technical Papers 4.3, Apr., 1975.

Lippman "An Introduction to Computing with Neural Nets", IEEE ASSP. pp. 4–22, Apr. 1987.

"Proceedings of The 1990 American Control Conference" vol. 2, May 23, 1990, San Diego, U.S.A., pp. 1839–1842.

"1990 IEEE International Symposium On Circuits and Systems", vol. 4, May 1990, New Orleans, U.S.A., pp. 2951–2954.

"IEEE Communications Magazine", vol. 27, No. 11, Nov. 1989, Piscataway, NJ, U.S. pp. 41–46.

"IJCNN International Joint Conference On Neural Networks", vol. 1, Jun. 19, 1989, Washington, U.S.A., pp. 251–258.

"IEEE International Conference on Neural Networks", Jul. 24, 1988, San Diego, U.S.A., pp. 525–532.

"Design of Multi–Layer Neural Networks With Powers–Of–Two Weights", M. Marchesi, et al., 8/90, pp. 2951–2954.

"A 1 MHz Compact Digitally Controlled Perception Integrated Circuit Implementation with Process Insensitivity", J.L. Pino et al., pp. 1066–1068.

"A Systolic Power–Of–Two Multiplier Structure", Feb., 1989, Ching Yih Tseng and Lloyd J. Griffiths, pp. 146–149.

"Efficient Implentation of Piecewise Linear Activation Function For Digital VLSI Neural Networks", 11/89; S. Herts, pp. 1662–1663.

"Switched–Capacitor Building Blocks for Fuzzy Logic and Neural Networks", T. Inoue et al., The Transactions of the Inst. of Electronics, Information & Communication Engineers, 12/88; pp. 1259–1200.

Watanabe et al., "Neura Network Simulation on a Massively Parallel Cellular Array Processor: AAP–2." IJCNN, vol. 2, Jun. 1989, pp. 155–161.

* cited by examiner

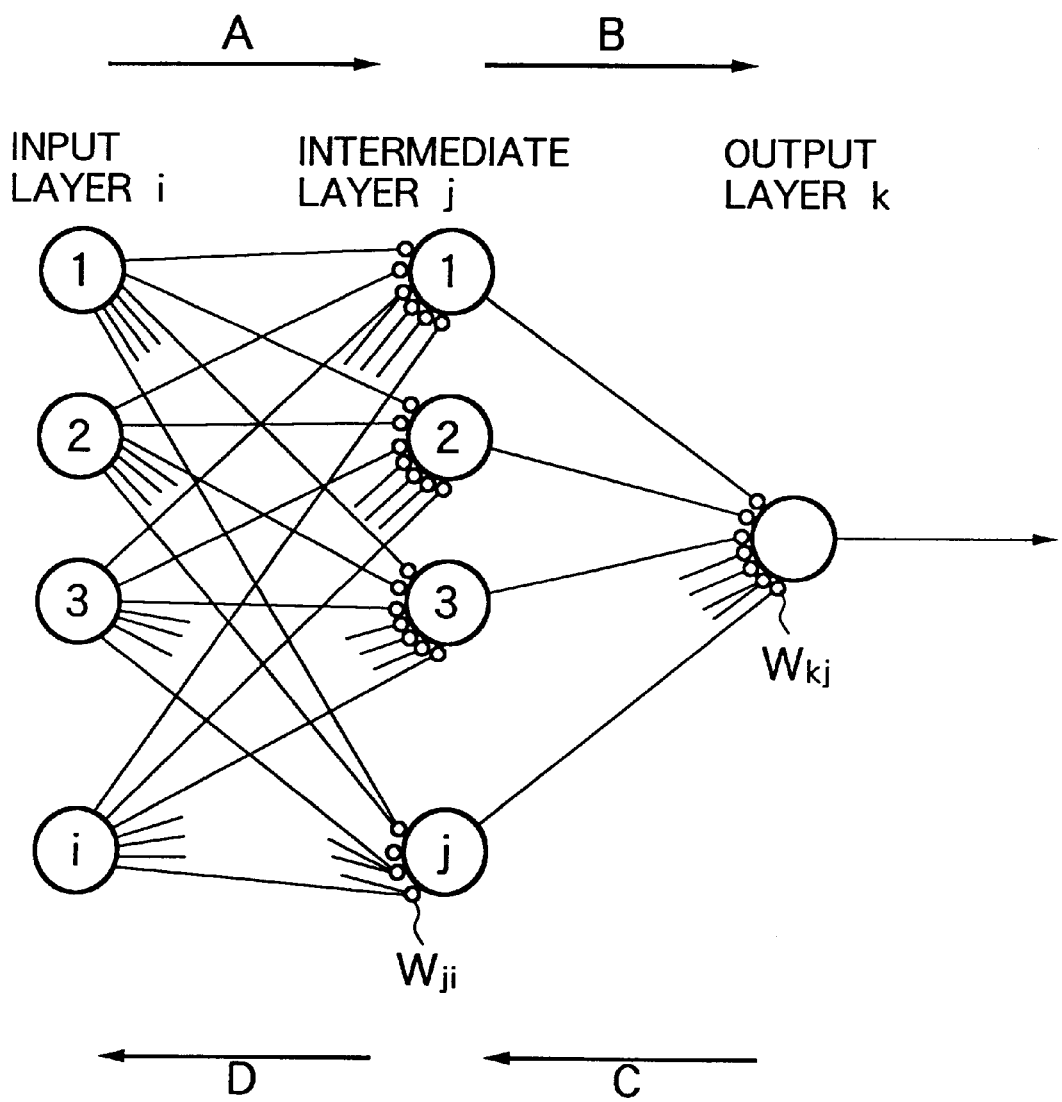

WITH RESPECT TO m₃

WITH RESPECT TO m₂

WITH RESPECT TO m₁

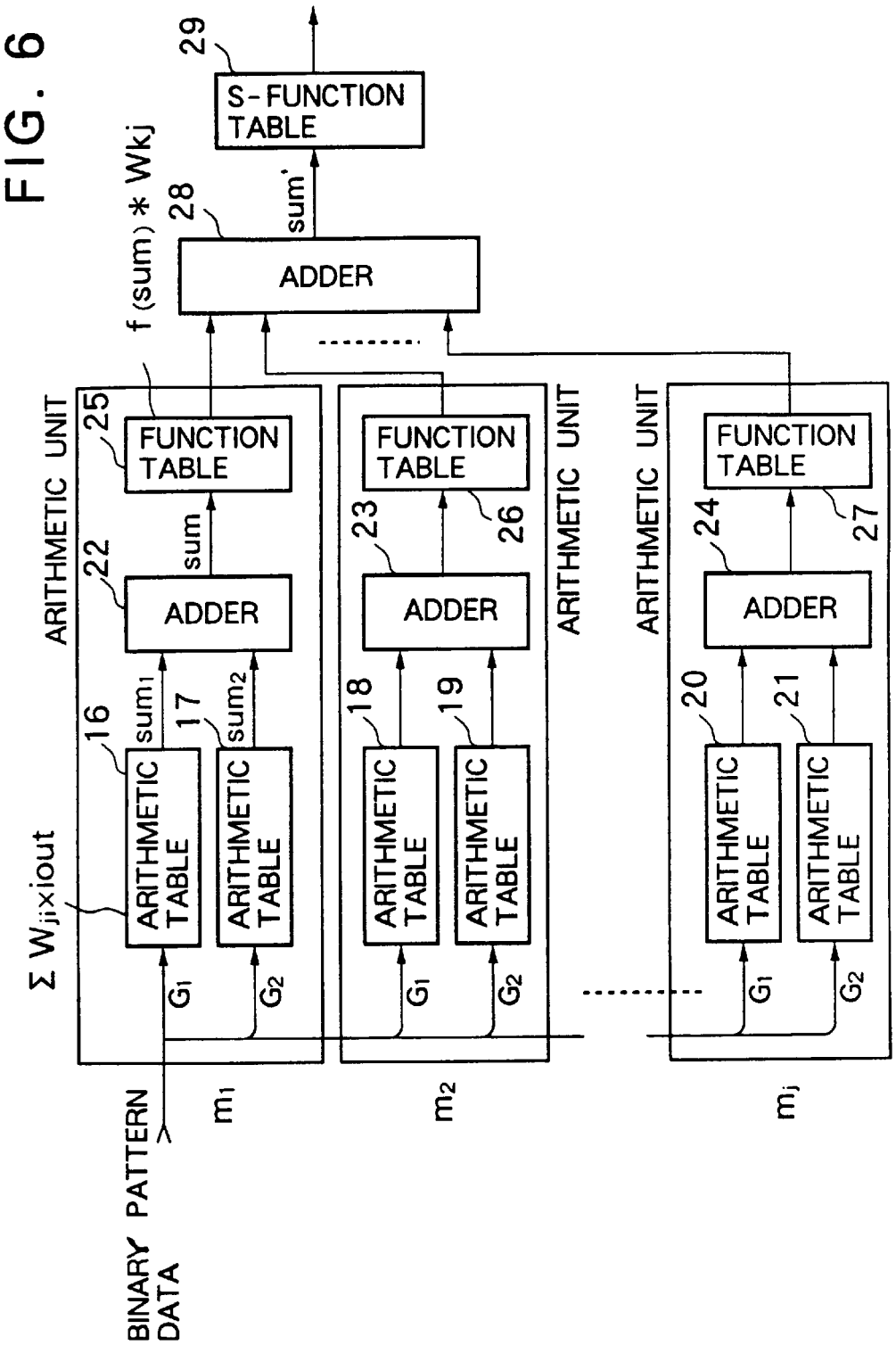

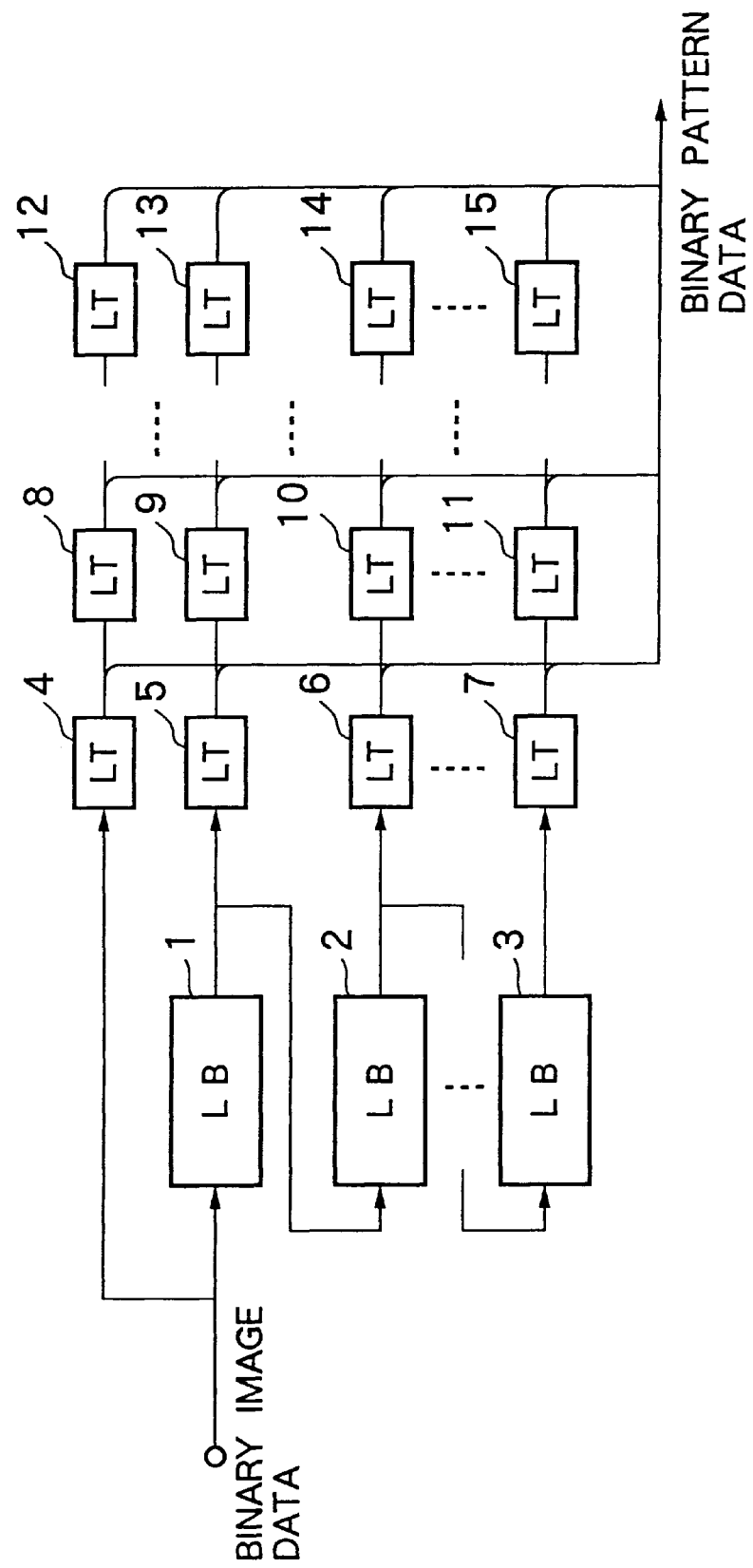

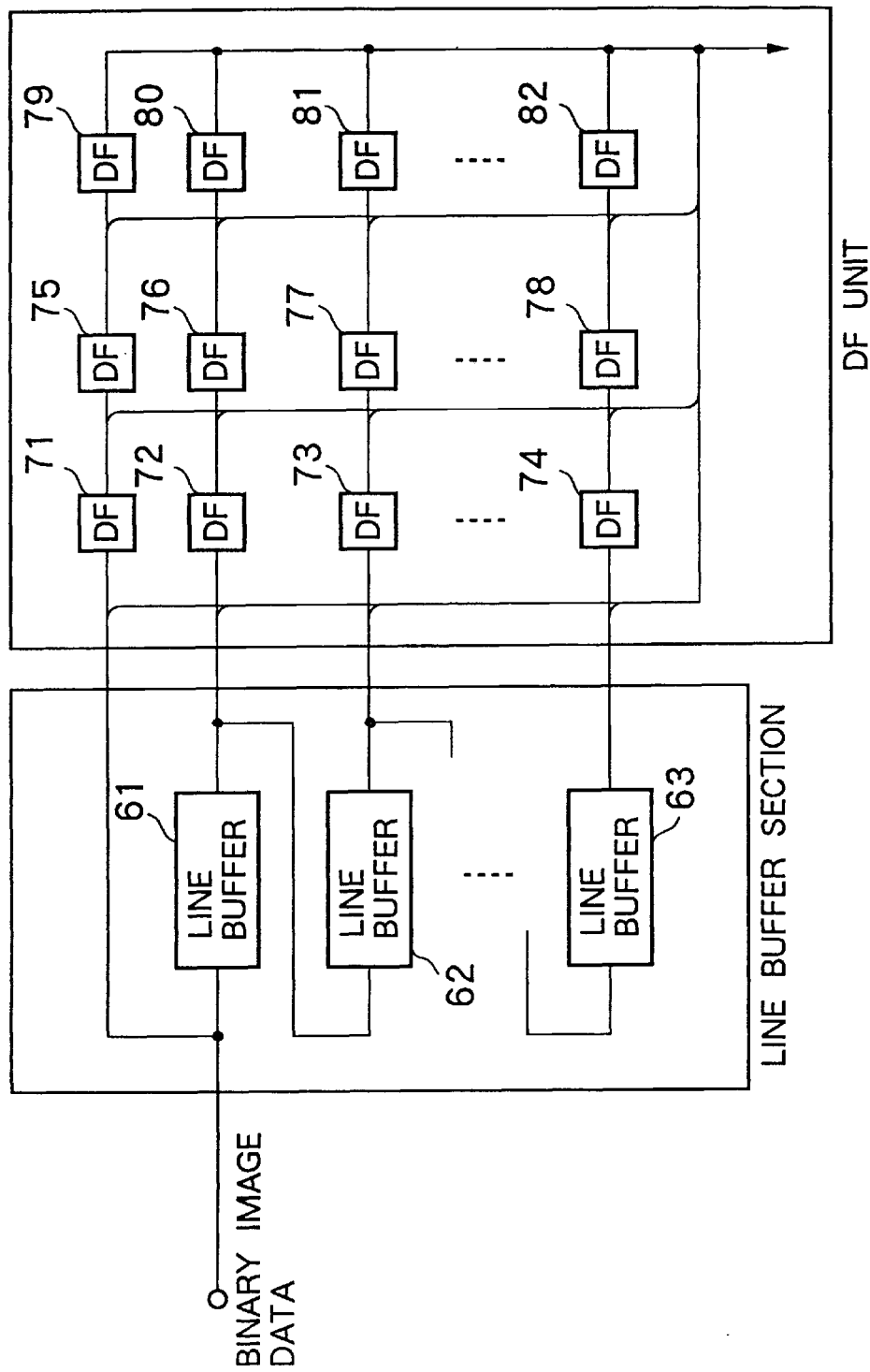

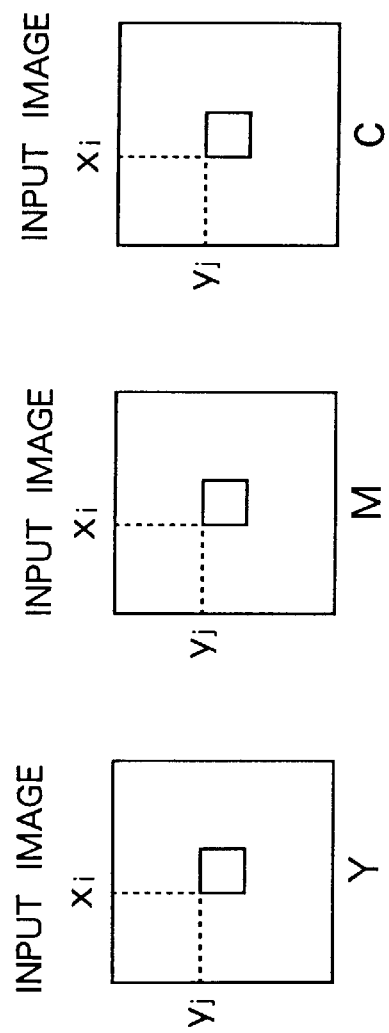
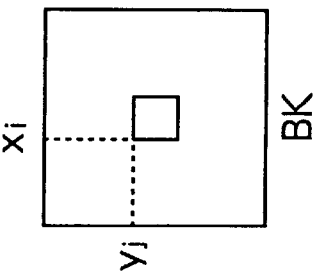
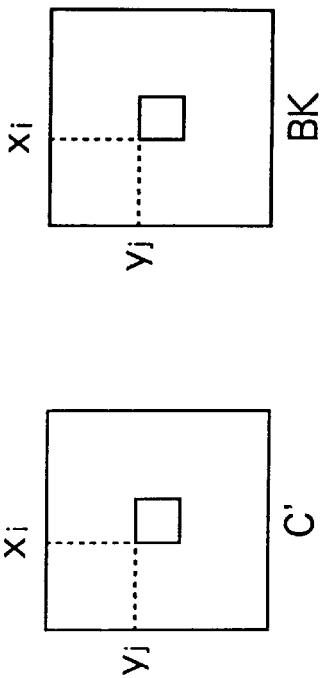
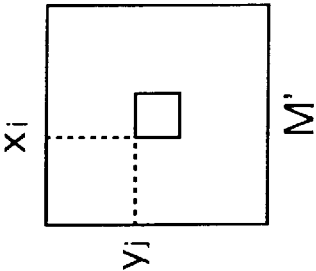
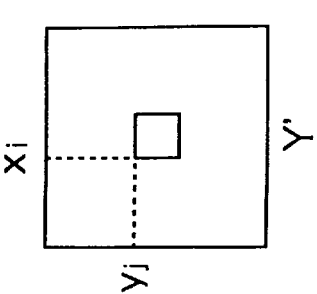

HALF-TONE IMAGE SIGNAL
CHARACTER IMAGE SIGNAL
AREA-SEPARATION SIGNAL

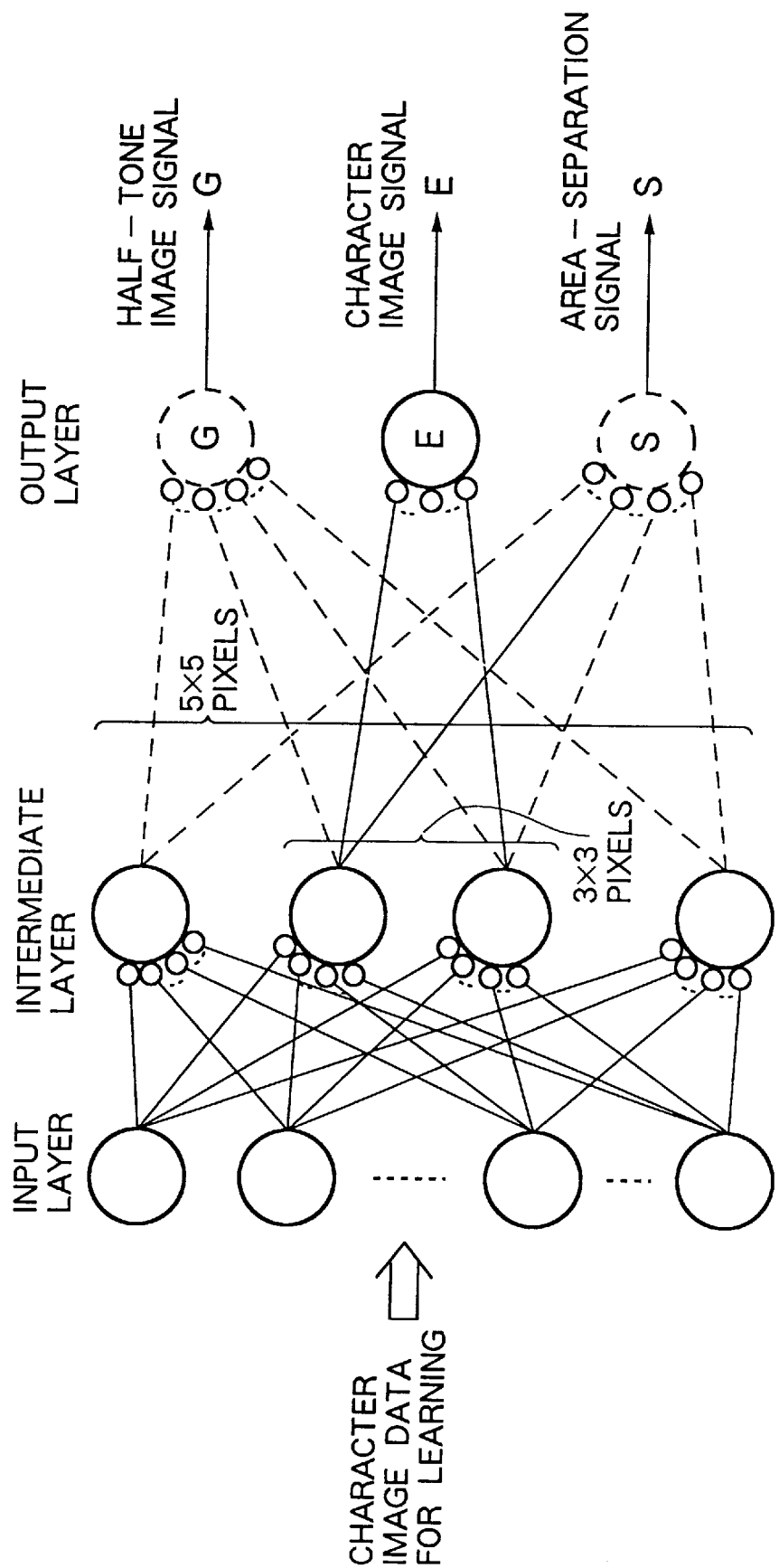

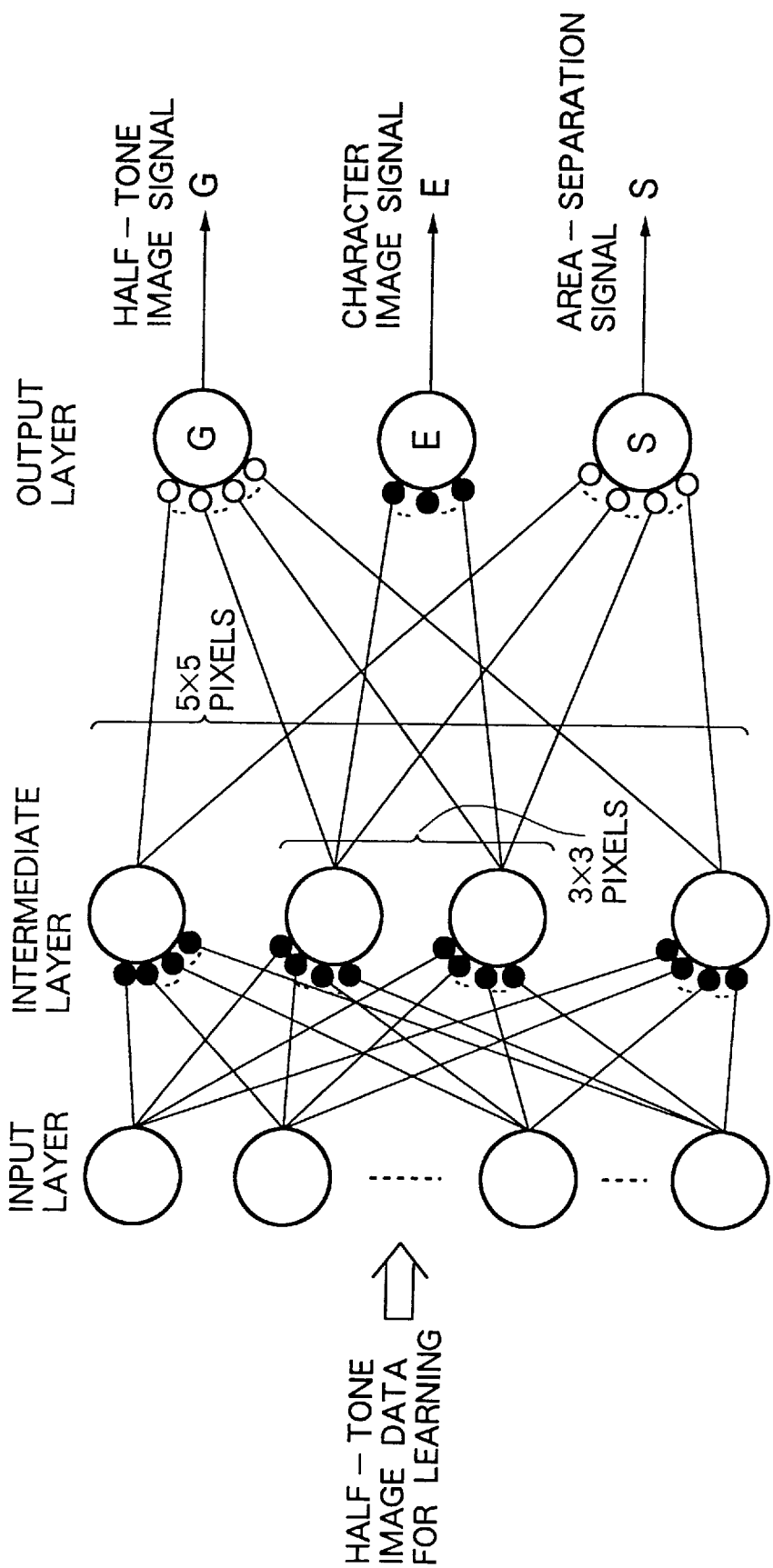

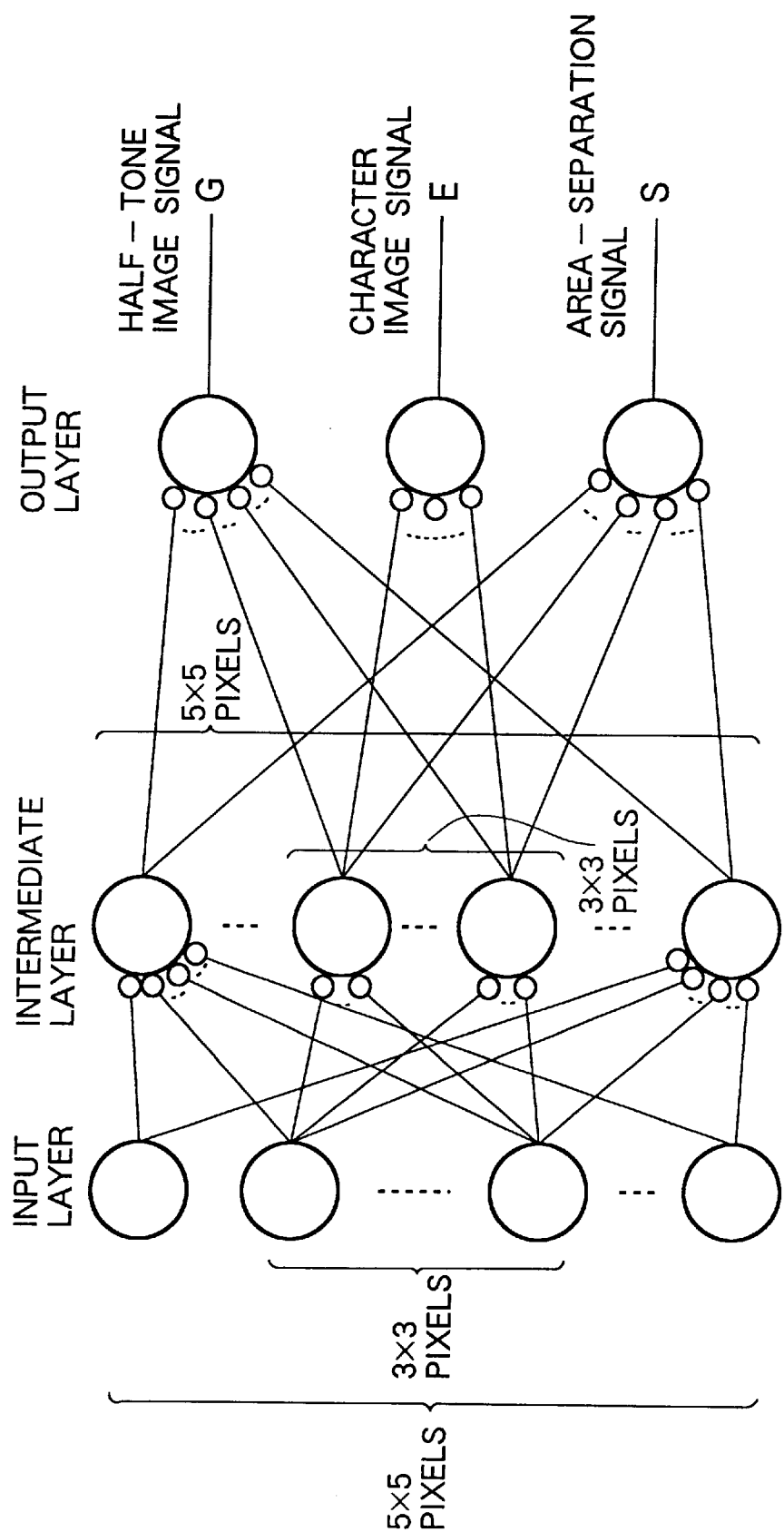

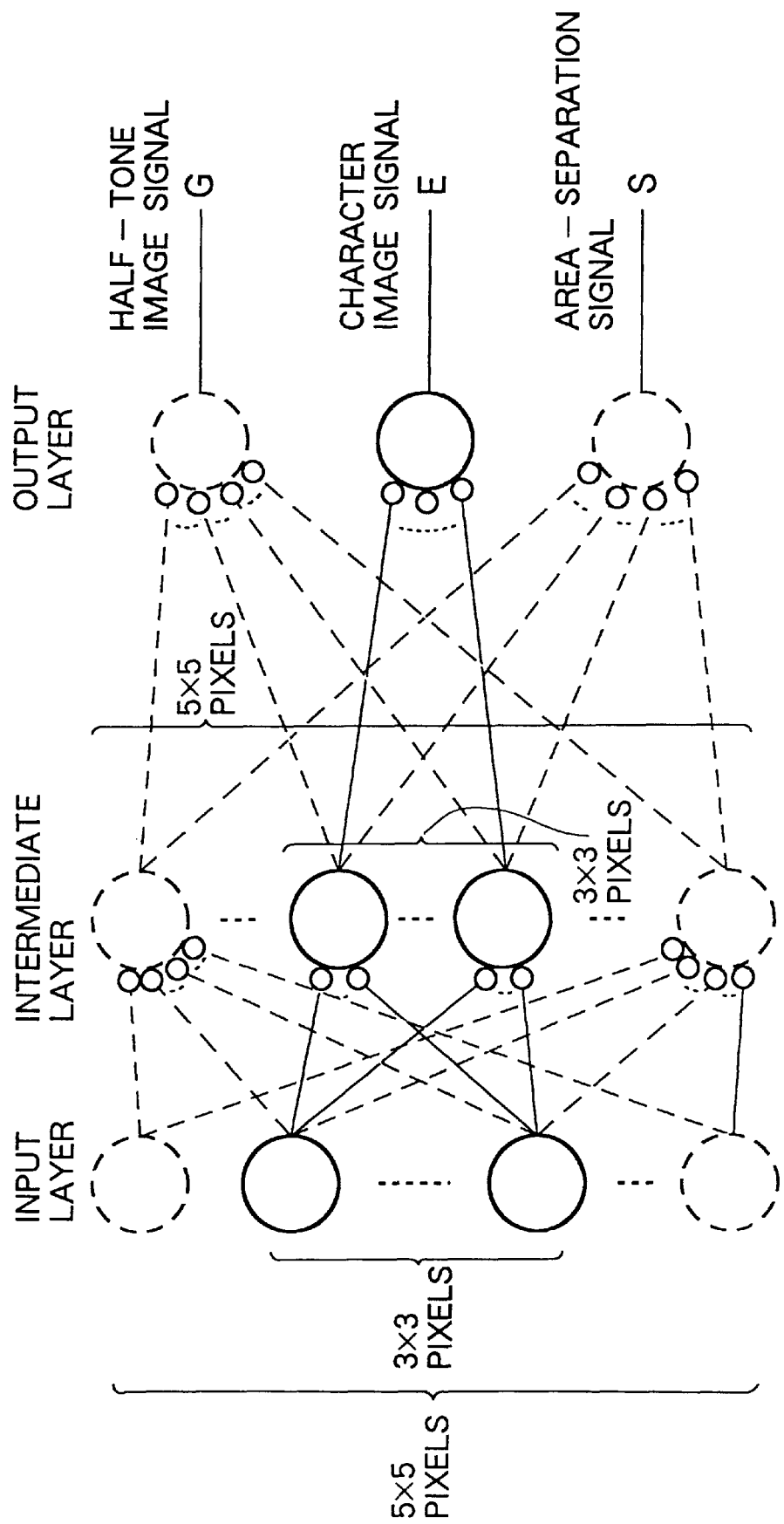

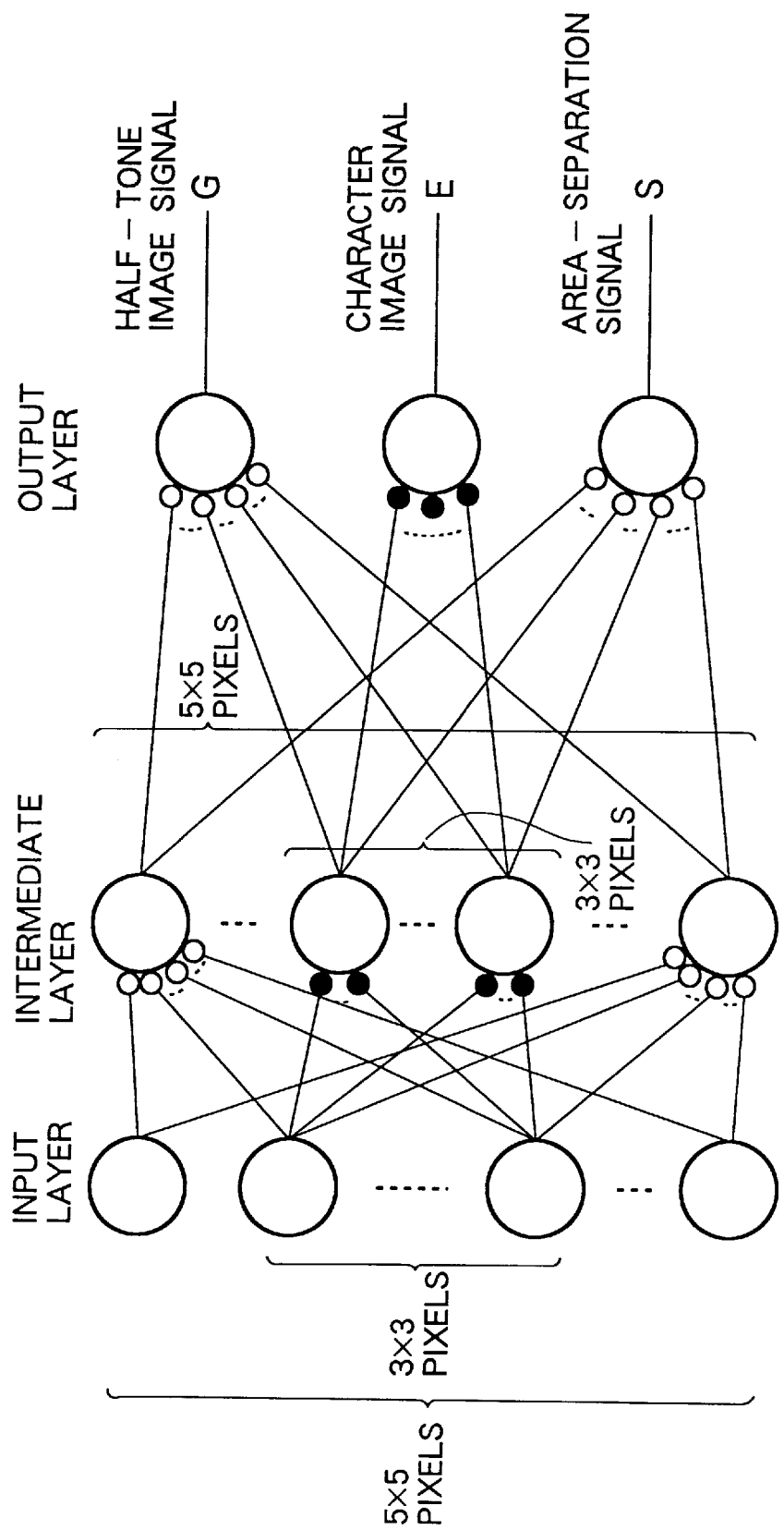

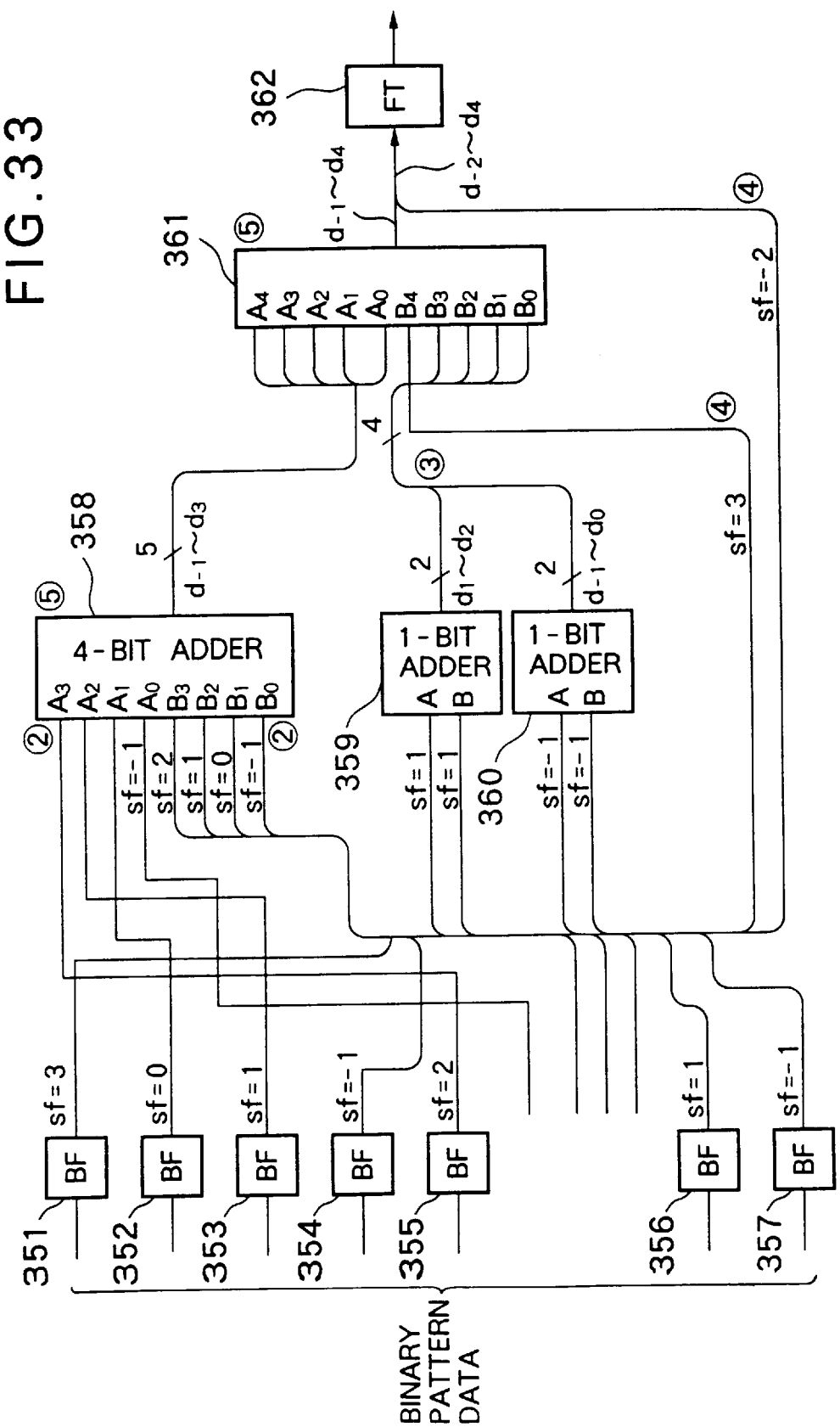

DATA PROCESSING USING NEURAL NETWORKS HAVING CONVERSION TABLES IN AN INTERMEDIATE LAYER

This application is a division of application No. 08/026,093, filed on Mar. 4, 1994, now U.S. Pat. No. 5,719,955 which is a continuation of application No. 07/713,141, filed on Jun. 11, 1991 now abandoned.

BACKGROUND OF THE INVENTION

This invention relates to neural networks well suited for various types of data processing and, more particularly, to techniques for reducing the size of neural-network circuitry and raising the speed at which arithmetic operations are performed in a neural network. Furthermore, the invention relates to image processing using a neural network.

The fact that various processing operations are performed by neural networks has been the subject of research in recent years. In order to raise the processing accuracy of processing using a neural network, each element (neuron) constituting the neural network receives a large number of items of input data, subjects these items of input data to processing and outputs the results. Specifically, a neural network generally comprises an input layer, an intermediate layer and an output layer. For example, in a case where the number of neurons in the input layer is i and the number of neurons in the intermediate layer is j, i-number of multiplications and i-number of additions are performed by one neuron of the intermediate layer, and these multiplications and additions are performed j times by the intermediate layer as a whole. Furthermore, j-number of multiplications and j-number of additions are performed by one neuron of the output layer. These arithmetic operations, which are enormous in number, are performed whenever there is an input. In other words, the multiplication and addition operations have the form of a network.

Accordingly, when a neural network is merely constructed of hardware, the scale of the circuitry is very large and processing speed is reduced as a result.

Next, consider image processing by a neural network. In examples of such processing, image compression and character recognition of Chinese characters, numerals and the like have been attempted. However, studies relating to the processing of natural images by neural network, spatial filtering processing and image conversion have not yet been carried out. A review of masking processing is reported in the paper of a research group of the *Image Electronics Engineers of Japan* (1989).

FIG. 1 is a simplified block diagram showing such a neural network for masking processing disclosed in the papers of the aforesaid research group. As shown in FIG. 1, an input layer comprises input elements for inputs Y, M, C, and an output layer similarly comprises output elements for outputs Y', M', C' obtained as the result of masking processing. Two layers are provided as intermediate layers, each of which comprises 10 or 20 nodes (neural elements, or neurons). In FIG. 1, only one intermediate layer is shown for the sake of simplicity.

In the arrangement of FIG. 1, the intermediate layer has a large number of elements, namely ten, and the intermediate layer is a double layer. For this reason, the length of time needed for learning and execution is very long.

The present inventors have given careful consideration to the foregoing points. Specifically, in the prior-art example of FIG. 1, the neural elements of the preceding intermediate layer and the neural elements of the succeeding intermediate layer are coupled on an equivalent basis. Similarly, the neural elements of the succeeding intermediate layer and the neural elements of the output layer are coupled on an equivalent basis.

Consequently, when the coupling constants are learned, a sense of direction cannot be given to the convergence of the learning of the coupling constants because there is no difference between the neural elements of the intermediate layers.

The Y, M and C image signals are mutually independent in nature. At learning, image signals for learning Y, M and C are applied to respective ones of the Y, M and C input elements of the input layer, and ideal signals Y', M' and C' resulting from masking are applied to respective ones of the Y', M' and C' output elements of the output layer.

In other words, when the Y, M and C learning signals having mutually independent properties enter the neural network, convergence at learning of the coupling coefficients is in a state of disorder with regard to the coupling coefficients between the input layer and the intermediate layers and the coupling coefficients between the preceding stage of the intermediate layer and the succeeding stage of the intermediate layer. Accordingly, convergence requires a great deal of time. In addition, as the result of convergence, only the learned results regarding solely the coupling coefficients between the elements of the succeeding intermediate layer and the elements of the output layer contribute to the formation of a neural network for masking processing while maintaining the aforementioned mutually independent properties. More specifically, coefficients other than the coupling coefficients between the elements of the intermediate layers and the three elements of the output layer are decided so as to be favorable for all of the outputs Y', M', C' and Bk'. Therefore, even if, say, the ideal output of Y' has excellent accuracy, the other ideal outputs exhibit poor accuracy, or vice versa. Even if learning is repeated, a situation arises in which the coupling coefficients oscillate with a certain fixed range.

Accordingly, when it is attempted to suppress the range of oscillation and execute highly precise masking, a dilemma is encountered in which the intermediate layer must be made a double layer, for example, and the number of elements in each intermediate layer must be increased. That is, since learning for masking processing is substantially decided only between the elements of the succeeding intermediate layer and the elements of the output layer, the number of intermediate-layer elements must be increased and, as a result, convergence of the learning process takes considerable time. In addition, since the result of the foregoing is that the coupling coefficients between the input and intermediate layers do not participate in masking processing, a high precision cannot be obtained in such masking processing. Greater accuracy cannot be hoped for even if the number of intermediate-layer elements is increased further.

The foregoing problem essentially arises between image signals having little mutual participation, as between like ones of the image signals. Therefore, the problem does not arise only in masking processing and only when using the image signals Y, M and C; it can arise also in many types of image processing in general.

Considered next will be image processing such as a technique for binarizing a multivalued image, a technique for restoring multivalued image data from binary image data, and a technique for spatial filtering.

In a case where a multivalued image is binarized using a conventional binarizing method, such as the dither method, the resolution of character portions declines and edge components are lost and tend to deteriorate. With the ED (error diffusion) method, stripe patterns peculiar to binarization are produced, and the picture characteristic is not always good. Though the deterioration of character portions is less than with the dither method, the improvement is only partial. for a sufficient understanding of the ED method, see Floyd Stelnloerg; SID, International SYMP. Syp. Digest of Technical Papers 4-3 April '75.

A technique for restoring a multivalued half-tone image from a binary image using a neural network has not yet been realized. In the prior art, the best that can be done is to restore a multivalued half-tone image by applying a smoothing filter to a binary image.

In such conventional restoration of a multivalued image by a smoothing filter, the resolution of character portions declines and portions of the image having a smooth density gradient do not develop a sufficient number of tones. Accordingly, a technique for restoring a multivalued image from, say, a binary image by image processing using a neural network is eagerly awaited. The characterizing feature of a neural network is that processing accuracy is greatly improved by learning. However, using a neural network in binarizing processing and multivalued restoration processing is not easy. In particular, when a binary image such as that of a character and an image of half-tones such as that of a photograph mixed with the binary image are processed simultaneously, a problem arises in which coupling coefficients diverge in the learning process. Accordingly, with regard to image processing using a neural network in the prior art, it would not be an exaggeration to say that absolutely no thought has been given to the best way to configure a network to construct a neural circuit network.

SUMMARY OF THE INVENTION

According to the present invention, a reduction in the scale of network circuitry and an increase in the processing speed of the network are achieved by:

①  an approach in which the couplings between those neurons of a neural network that can be easily constructed of hardware are divided into groups;

② an approach in which the nature of data (especially image data) applied as an input to this network is taken into consideration and those neurons that are optimum with regard to this nature are divided into groups; and ③ an approach in which time-consuming arithmetic operations (especially the multiplication of coupling coefficients between neurons) in each neuron are replaced by shift processing (and further, by addition processing).

The present invention based upon approach ① provides a neural network the entirety of which is designed in such a manner that predetermined data processing is executed, comprising: an input layer having a plurality of neural elements divided into a plurality of groups; an intermediate layer comprising a plurality of neural elements, each of the neural elements in this intermediate layer having at least one processing means, the processing means accepting, as inputs thereto, outputs from neural elements belonging to one group of the input layer, and converting the outputs from these neural elements by referring to a table; and an output layer having at least one neural element for accepting, as inputs thereto, outputs from the neural elements of the intermediate layer.

In accordance with this neural network, the arithmetic operations in the neurons of the intermediate layer are implemented by table conversion group by group, thus making it possible to reduce the scale of the circuitry.

According to a preferred embodiment of the neural network of the invention constructed as set forth above, the neural elements of the input layer are divided into n-number of groups with regard to each neural element of the intermediate layer, and each neural element of the intermediate layer has n-number of processing means.

According to a preferred embodiment of the neural network of the invention constructed as set forth above, the neural elements of the input layer are divided into n-number of groups with regard to each neural element of the intermediate layer, each neural element of the intermediate layer has m (m<n)-number of the processing means, and individual ones of the processing means accepts, as inputs thereto, outputs from some of the groups of the neural elements of the input layer.

According to a preferred embodiment of the neural network of the invention constructed as set forth above, individual neural elements of the intermediate layer have m-number of the processing means, adding means for adding outputs from these processing means, and multiplying means for multiplying the results of addition by a coupling coefficient $W_{kj}$ between a neural element of the intermediate layer and a neural element of the output layer that is connected to this neural element.

According to a preferred embodiment of the neural network of the invention constructed as set forth above, processing based upon a sigmoid function also is put into table form.

According to a preferred embodiment of the neural network of the invention constructed as set forth above, in sigmoid-function processing, the sigmoid function is approximated by first order lines.

A neural network having a different construction according to the present invention based upon approach ① comprises an input layer, an intermediate layer having one or more layers, and an output layer, wherein the neural network executes predetermined data processing; the input layer having a plurality of neural elements divided into n-number of groups; the intermediate layer has the one or more layers each having a plurality of neural elements divided into n-number of groups, wherein the neural elements of individual groups of some of the layers of the intermediate layer are connected to the neural elements of only one group of the input layer; and the output layer has at least one neural element for accepting, as inputs thereto, outputs from the neural elements of the intermediate layer having the one or more layers.

In accordance with the neural network having this construction, the neural elements of the input layer and the neural elements of the intermediate layer are divided into groups, and the neural elements belonging to one group are not connected to the neural elements of another group. As a result, the number of connecting lines can be reduced, and this contributes to a reduction in the scale of the circuitry.

According to a preferred embodiment of the neural network of the invention constructed as set forth above, each group is provided with an arithmetic table which performs the processing of each layer within the group by a table conversion.

According to a preferred embodiment of the neural network of the invention constructed as set forth above, image data inputted to each neural element of the input layer is an image block having a two-dimensional spread, and the image block is divided into a centrally located pixel group and a peripheral pixel group.

According to a preferred embodiment of the neural network of the invention constructed as set forth above, image data inputted to each neural element of the input layer is an image block having a two-dimensional spread, and the image block is divided into two pixel groups that are distributed uniformly.

The present invention based upon approach ② provides an image processing system using a neural network comprising an input layer, an intermediate layer and an output layer, wherein image data is inputted to the input layer, predetermined image processing is executed within the neural network, and processed image data is outputted by the output layer; the intermediate layer being constituted by a plurality of neural elements divided into groups the number of which is the same as the number of neural elements in the output layer; each of the neural elements of the output layer being coupled only to the neural elements of a respective one of the groups.

According to this image processing system, each neural element of the output layer is coupled only to the neural elements of its own group in the intermediate layer, and the neural elements of the output layer are independent of one another. As a result, convergence in the learning process is quicker and learning accuracy is improved correspondingly. This makes it possible to reduce the intermediate layer by an amount commensurate with the improvements in speed and accuracy. The end result is that both a reduction in the scale of the neural network and greater efficiency when learning the coupling coefficients of the neural elements can be attained.

According to a preferred embodiment of the neural network of the invention constructed as set forth above, all coupling coefficients between individual ones of all neural elements of the intermediate layer and individual ones of all neural elements of the input layer are set independently of one another.

According to a preferred embodiment of the neural network of the invention constructed as set forth above, the predetermined image processing is masking processing.

According to a preferred embodiment of the neural network of the invention constructed as set forth above, items of input data which enter each group of the intermediate layer from the input layer are one-pixel image signals of yellow, magenta and cyan, and image signals of yellow, magenta, cyan and black are outputted from respective ones of four neural elements of the output layer.

According to another aspect of the present invention based upon approach ②, there is provided an image processing system in which image data is inputted to a neural network and predetermined image processing is executed within the neural network, the neural network comprising: an input layer having a plurality of neural elements for inputting plural items of image data corresponding to respective ones of a plurality of pixels; an intermediate layer having a plurality of neural elements coupled to the neural elements of the input layer; and an output layer having a plurality of neural elements some of which are coupled to only some of the neural elements of the intermediate layer.

In a case where an image is subjected to block processing, and an area to which block processing is applied is to be changed in conformity with picture characteristic of the image, the image processing system of the present invention constructed as set forth above is such that the neural elements of the output layer given so as to output an image of a certain picture characteristic are coupled to only some of the neural elements of the intermediate layer suited to the aforementioned block of an appropriate size. As a result, the quality of image processing is improved and so is the accuracy of learning.

Another advantage is that it is unnecessary to use a plurality of neural networks in order to obtain final outputs having different properties. This makes it possible to reduce the scale of the circuitry.

According to a preferred embodiment of the neural network of the invention constructed as set forth above, the input image data includes a mixture of a plurality of images having different picture characteristics, and the plurality of neural elements of the output layer simultaneously deliver output image data having different picture characteristics.

According to a preferred embodiment of the neural network of the invention constructed as set forth above, the plurality of neural elements of the output layer respectively deliver a half-tone image signal, an edge-portion or character-portion image signal, and an area-separation signal.

According to a preferred embodiment of the neural network of the invention constructed as set forth above, some of the neural elements of the intermediate layer are coupled to all of the neural elements of said input layer.

According to a preferred embodiment of the neural network of the invention constructed as set forth above, some of the neural elements of the intermediate layer are coupled to only some of the neural elements of the input layer.

According to a preferred embodiment of the neural network of the invention constructed as set forth above, when learning of the neural network is carried out, coupling coefficients between some of the neural elements of the output layer and some of the neural elements of the intermediate layer coupled to these neural elements of the output layer are decided by learning first, and remaining coupling coefficients are decided upon performing relearning while holding fixed the coupling coefficients decided first.

According to a preferred embodiment of the neural network of the invention constructed as set forth above, when coupling coefficients of some of the neural elements of the intermediate layer are decided first, an image having a strong local property from among the images having different picture characteristics is used as an ideal signal applied to the neural network.

According to a preferred embodiment of the neural network of the invention constructed as set forth above, the image having the strong local property is an image having a strong edge property, such as a character image.

According to a preferred embodiment of the neural network of the invention constructed as set forth above, coupling coefficients decided at relearning are coupling coefficients between neural elements other than said some of the neural elements of the intermediate layer and neural elements other than said some of the neural elements of the output layer.

According to a preferred embodiment of the neural network of the invention constructed as set forth above, coupling coefficients decided at relearning are coupling coefficients between neural elements other than said some of the neural elements of the intermediate layer and neural elements other than said some of the neural elements of the output layer as well as neural elements other than said some of the neural elements of the input layer.

According to a preferred embodiment of the neural network of the invention constructed as set forth above, the half-tone image signal and character-portion image signal from the neural elements of the output layer are outputted upon being changed over by the area-separation signal from the same neural elements of the output layer, whereby a final image signal of the system is obtained.

According to another aspect of the present invention based upon approach ②, there is provided an image processing system which executes predetermined image processing using a neural network comprising an input layer, at least one intermediate layer and an output layer; the input layer having a plurality of neural elements to which an image having a spatial spread is inputted pixel by pixel; the intermediate layer comprising a first group of neural elements connected to only some of the neural elements of the input layer that correspond to a continuous area of part of an image, and a second group of neural elements connected to all neural elements of the input layer; and the output layer includes one first neural element for outputting image data having a strong local property and one second neural element for outputting image data having a weak local property, wherein the first neural element is coupled to only the first group of neural elements of the intermediate layer.

The present invention based upon approach ③ provides a neural network having a plurality of neural elements, wherein some of the plurality of neural elements have shift arithmetic means for performing multiplication of coupling coefficients in these neural elements by a shift operation.

The present invention based upon approach ③ further provides a neural network having a plurality of neural elements, wherein some of the plurality of neural elements have shift arithmetic means for executing a shift operation in order to perform multiplication of coupling coefficients in these neural elements, and adding means adding results obtained from the shift operation.

Thus, since multiplication is replaced by a shift operation and addition, the scale of the circuitry can be reduced.

According to a preferred embodiment of the neural network of the invention constructed as set forth above, the coupling coefficients are approximated by $2^n$ (where n is an integer).

According to a preferred embodiment of the neural network of the invention constructed as set forth above, the coupling coefficients are approximated by a sum of a plurality of terms that are powers of 2.

According to a preferred embodiment of the neural network of the invention constructed as set forth above, shift processing is equivalent to treating inputted data as data after a shift. That is, a shift operation by hardware is unnecessary.

According to a preferred embodiment of the neural network of the invention constructed as set forth above, after multiplication is replaced by shift processing and addition processing, the coupling coefficients of remaining neural elements are relearned.

According to another aspect of the present invention based upon approach ③, there is provided a method of concretely constructing a neural network in which coupling coefficients have already been decided by learning, comprising the steps of: approximating each coupling coefficient of one or more neural elements contained in the neural network by a sum of a plurality of terms of powers of 2; and replacing multiplication between a coupling coefficient and input data inputted to the neural element thereof by processing for shifting the input data by each exponent for every one of a plurality of exponents of the obtained powers of 2, and addition processing for adding the results of shifting, in such a manner that the sum of the plurality of terms of powers of 2 falls within limits of a predetermined allowable error with regard to the coefficients, and the number of terms of the plurality of terms of powers of 2 is minimum.

According to another aspect of the present invention based upon approach ③, there is provided a method of concretely constructing a neural network in which coupling coefficients have already been decided by learning, comprising the steps of approximating each coupling coefficient of a plurality of neural elements contained in the neural network by term of a power of 2; replacing multiplication between each coupling coefficient of the plurality of neural elements and input data inputted to this neural element by processing for shifting the input data by each exponent for every one of a plurality of exponents of the obtained powers of 2; and gathering a plurality of items of shifted data not at the same digit positions in the plurality of items of shifted data arising from different neural elements, and inputting the gathered data to one input terminal of one adder.

In still another aspect of the invention, there is provided a method of concretely constructing a neural network in which coupling coefficients have already been decided by learning, comprising the steps of approximating each coupling coefficient of a plurality of neural elements contained in the neural network by a sum of a plurality of terms of a power of 2; replacing multiplication between each coupling coefficient of the plurality of neural elements and input data inputted to this neural element by processing for shifting the input data by each exponent for every one of a plurality of exponents of the obtained powers of 2, and addition processing for adding the results of shifting; and, in an adder having two input terminals used in this addition processing, gathering a plurality of items of shifted data not at the same digit positions in a plurality of items of shifted data arising from different neural elements, and inputting the gathered data to one input terminal of the adder.

In a neural network constructed according to this method, the number of adders is reduced.

According to a preferred embodiment of the present invention, two items of shifted data at the same digit positions in shifted data arising from two or more different neural elements are inputted to respective input terminals of the adder. This embodiment makes skillful use of the properties of a two-input adder.

According to a preferred embodiment of the present invention, in a case where first, second and third items of shifted data at the same digit positions in shifted data arising from two or more different neural elements are three or more in number, the method further comprises the steps of: preparing first and second adders and inputting the first and second items of shifted data to respective inputs of the first adder; inputting, to one input terminal of the second adder, the output of the first adder and bits at the same bit positions in bit data of the third item of shifted data; and inputting, to respective input terminals of the second adder, the output of the first adder and bits at the same bit positions in bit data of the third item of shifted data.

In accordance with an embodiment of the present invention, the coupling coefficients of remaining neural elements are relearned. As a result, accuracy is improved.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a diagram for describing, in general terms, the learning procedure of a neural network according to first through sixth embodiments of the present invention;

FIG. 6 is a block diagram showing the structure of neurons in the first embodiment;

FIG. 7 is a circuit diagram of a circuit for extracting a binary image data block in the first embodiment;

FIG. 13A is a circuit diagram of a circuit for extracting a binary image data block in the second embodiment;

FIGS. 19A through 19C are diagrams showing the composition of input signals used in learning of a network according to the third embodiment;

FIGS. 20A through 20D are diagrams showing ideal-output signal data used in learning of a network according to the third embodiment;

FIGS. 25A and 25B are diagrams for describing two steps, namely steps I and II, in a second learning method according to the fourth embodiment;

FIG. 26 is a diagram showing the construction of a neural network used in a modification of the fourth embodiment;

FIGS. 27A and 27B are diagrams for describing two steps, namely steps I and II, in the second learning method according to a modification of the fourth embodiment;

FIG. 33 is a circuit diagram showing a neuron according to a modification of the fifth embodiment.

DESCRIPTION OF THE PREFERRED EMBODIMENTS

Figure 1:
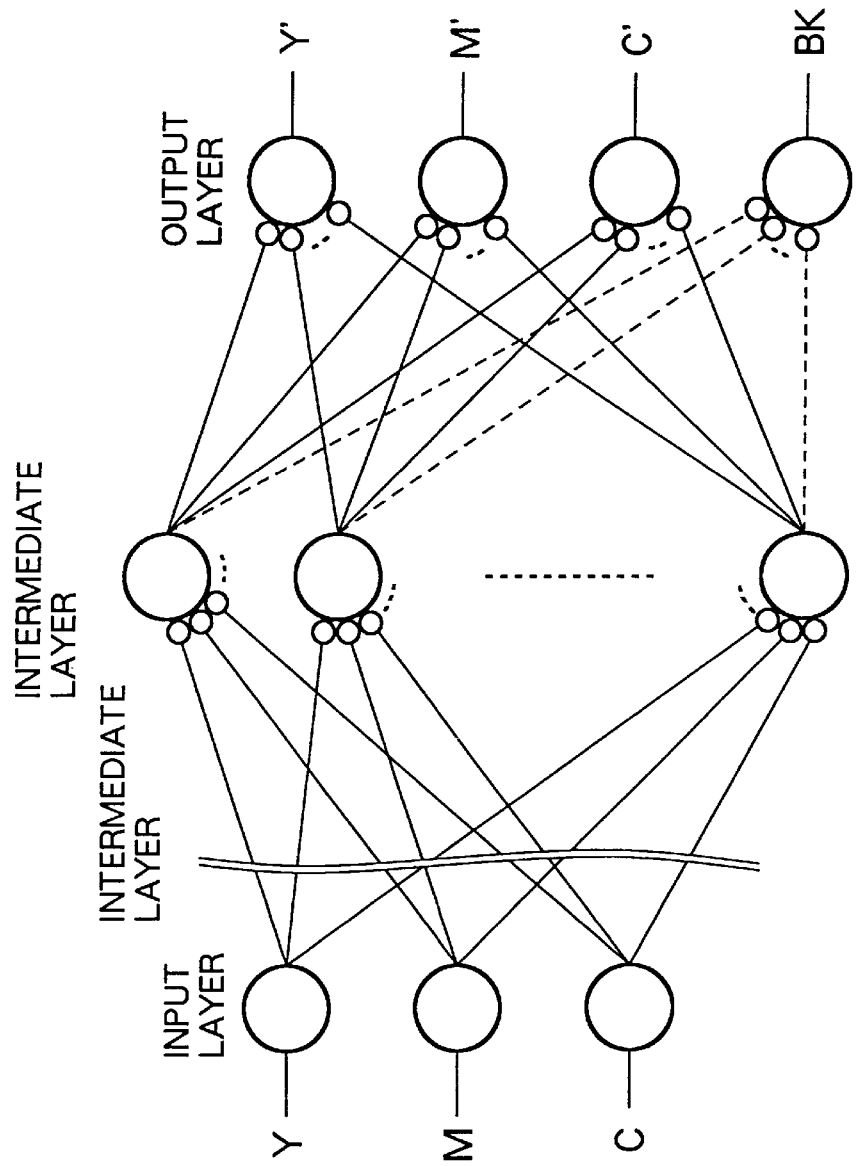
FIG. 1 is a diagram illustrating the construction of the prior art, in which a neural network is applied to image processing.

Five preferred embodiments (first through fifth embodiments) of the present invention, as well as modifications of these embodiments, will be described with reference to the accompanying drawings.

All of the embodiments employ the so-called "back-propagation method" as the learning method. The first through fourth embodiments are characterized by the method of interconnecting neurons in a neural network (i.e, by the manner in which neurons are grouped), and the fifth embodiment is characterized in that a binary arithmetic circuit is substituted for the arithmetic operation performed in a network.

<Learning of Neural Network>

A procedure for back-propagation-type learning in a common neural network will now be described taking FIG. 2 as an example.

The neural network illustrated in FIG. 2 is constituted by an input layer i comprising i-number of neurons (each of which is represented by a large circle in the drawing), an intermediate layer j comprising one layer (which comprises j-number of neurons), and an output layer k comprising a single neuron. Here the output layer k is taken to comprise one neuron in order to simplify the description; it can comprise k-number of neurons in general. By way of example, the output layer includes three neurons in the third embodiment, described below.

In FIG. 2, the coupling between one neuron and the neurons of another layer is represented by the solid lines. For example, the neuron 1 of the intermediate layer is coupled to all neurons of the neural layers. Coupling between two layers (referred to as a "preceding layer" and a "succeeding layer", respectively) means that the neural output of the preceding layer is operated upon by being inputted to a neuron of the succeeding layer. The small circles in FIG. 2 represent coupling strength W. For example, the neuron 1 of the intermediate layer in FIG. 2 is coupled to all neurons of the input layer, so that the output jout(1) is expressed as follows:

$$jout(1) = \frac{1.0}{1.0 + \exp(-Sum_{FI})}$$

where $$Sum_{FI} = \sum_i W_{1i}(1, i) * iout(i)$$

Learning of a neural network entails deciding coupling strength $W_{ji}$ between the input layer and the intermediate layer, and coupling strength $W_{kj}$ between the intermediate layer and the output layer. In order to perform learning, the initial step is to prepare, in advance, the input data for learning and an ideal output corresponding thereto, and suitably decide an initial value of the coupling strength $W_{ji}$ in the intermediate layer and an initial value of the coupling strength $W_{kj}$ in the output layer. This is the preliminary stage of learning. Next, the prepared input data is applied to the network coupled based upon the initial values, whereupon these items of data are processed first in the intermediate and then in the output layer to obtain output data from the output layer. The procedure up to this point is indicated by the flow of arrows A and B in FIG. 2. Next, the output obtained from the output layer and the prepared ideal output are compared, a teach signal (a teach signal for the output layer) is generated by the comparison, and the coupling strength $W_{kj}$ in the output layer is corrected by the teach signal. This process is indicted by arrow C in FIG. 2. Further, a teach signal for the intermediate layer is generated to correct the coupling strength $W_{ji}$ in the intermediate layer. This is the process indicated by arrow D in FIG. 2.

The foregoing is the first step of learning. By repeating this learning process, the coupling strengths $W_{ji}$, $W_{kj}$ are successively corrected toward appropriate values. As the result of learning, the updated coupling strengths are maintained within the network.

The learning procedure set forth above will now be described in further detail using the flowcharts of FIGS. 3A and 3B.

First, at step S402, the initial values of weighting coefficients (coupling strengths) $W_{ji}$, $W_{kj}$ are applied. In consideration of convergence in the learning process, values in the range −0.5 to +0.5 are selected.

Next, at step S404, input data iout(i) for learning is selected, and this data iout(i) is set in the input layer at step S406. If this network is to be utilized in image processing, the input data iout(i) is image data of one pixel. An ideal output (ideal_out) corresponding to the input data iout(i) is prepared at step S408. The foregoing steps constitute the preliminary stage.

Next, the output jout(j) of the intermediate layer is obtained in the following manner at step S410.

First, the data iout(i) from the input layer is multiplied by the weighting coefficient $W_{ji}$ of the intermediate layer, and the sum $Sum_{Fj}$ thereof is calculated in accordance with $$Sum_{Fj} = \sum_i W_{ji}(j, i) * iout(i) \quad (1)$$

Next, $Sum_{Fj}$ is subjected to a sigmoid function and the j-th output jout(j) of the intermediate layer is calculated in accordance with $$jout(j) = \frac{1.0}{1.0 + \exp(-Sum_{Fj})} \quad (2)$$

Next, the output kout(k) of the output layer is obtained at step S411. This procedure is similar to that of step S410. Specifically, the output jout(j) from the intermediate layer is multiplied by the weighting coefficient $W_{kj}$ of the output layer, and the sum $Sum_{Fk}$ thereof is calculated in accordance with $$Sum_{Fk} = \sum_j W_{ki}(k, i) * jout(j) \quad (3)$$

Next, $Sum_{FK}$ is subjected to a sigmoid function and the k-th output kout(k) of the intermediate layer is calculated in accordance with $$kout(k) = \frac{1.0}{1.0 + \exp(-Sum_{Fk})} \quad (4)$$

These output values jout(j), kout(k) are normalized by the sigmoid function.

This is followed by step S412, at which the output kout(k) obtained by the foregoing and the ideal output ideal_out(k) prepared at step S408 are compared and the following is obtained as the teach signal teach_k(k) of the output layer:

teach_k(k)={ideal_out(k)−kout(k)}*kout(k)*{1−kout(k)}   (5)

Here kout(k)*{1−kout(k)} is defined as the differential of the sigmoid function kout(k).

Next, at step S414, a change $\Delta W_{kj}(k,j)$ in the weighting coefficient of the output layer is calculated in accordance with $\Delta W_{kj}(k,j)=\beta*jout(j)*teach\_k(k)+\alpha* \Delta W_{kj}(k,j)$   (6)

Here α represents a constant referred to as a stabilizing constant, and β represents a constant referred to as a learning constant. These function to suppress a sudden change in $\Delta W_{kj}(k,j)$.

The weighting coefficient $W_{kj}(k,j)$ is updated as follows at step S415 based upon the aforementioned change $\Delta W_{kj}(k,j)$:

$W_{kj}(k,j)=W_{kj}(k,j)+\Delta W_{kj}(k,j)$   (7)

This constitutes the first cycle of learning of the weighting coefficient $W_{kj}$ between the intermediate layer and output layer.

Next, at step S416, the teach signal teach-j(j) of the intermediate layer is computed. To this end, the contribution in the backward direction from the output layer to each element of the intermediate layer is computed based upon $$Sum_{Bj} = \sum_k teach\_k(k) * W_{kj}(j, i) \quad (8)$$

Next, the teach signal teach j(j) of the intermediate layer is computed from $Sum_{Bj}$ in accordance with the following equation:

teach−j(j)=jout(j)*{1−jout(j)}*$Sum_{Bj}$   (9)

Next, at step S418, a change $\Delta W_{ji}(j,i)$ in the weighting coefficient of the intermediate layer is calculated in accordance with $\Delta W_{ji}(j,i)=\beta*iout(j)*teach\_j(j)+\alpha*\Delta W_{ji}(j,i)$   (10)

The weighting coefficient $W_{kj}(j,i)$ is updated as follows at step S420 based upon the aforementioned change $\Delta W_{ji}(j,i)$:

$W_{ji}(j,i)=W_{ji}(j,i)+\Delta W_{ji}(j,i)$   (11)

Thus, learning is performed.

Thus, by virtue of steps S402 through S420, the weighting coefficients $W_{ji}$, $W_{kj}$ are learned one time from one set of input data and the corresponding ideal output.

It is determined at step S422 whether the foregoing learning has been carried out with regard to all input data. If learning is still incomplete, the processing of steps S402 through S420 is repeated.

It is determined at step S424 whether the number of learning cycles has attained the prescribed number. If the number of learning cycles is still inadequate, the processing of steps S402 through S422 is repeated.

The foregoing is a description of a learning procedure of a common neural network based upon the back-propagation method.

<First Embodiment>

Operations between neurons take time not only in the neural network of the kind shown in FIG. 2 but also in neural networks in general. The reason for this, taking FIG. 2 as an example, is that processing is required in which the operation $W_{ji}$*iout is performed i×j times, the sum of the products is taken and a sigmoid function is applied to the sum. If the number of intermediate layers is increased, the above-described operation in the intermediate layers increases exponentially. Accordingly, the first embodiment takes note of the fact that once coupling strengths (weighting coefficients) have been decided by carrying out learning in a neural network, this network can be put into the form of a table. Which part of a network should be put into a particular table form, and the manner in which this should be done for greatest efficiency has been studied. If logic is carried to extremes with regard to neural networks, all networks can be put into the form of a single table. However, such a table would be so voluminous in size that any attempt at realization would be impossible. Accordingly, the characterizing features of the first embodiment reside in the following two points:

(1) The coupling relationships between a neuron of the input layer and each neuron of the intermediate layer are divided into two groups, and a table is created for each group. Though the actual number of groups will depend upon the number of neurons and allowability with regard to the size of a table after grouping, in this embodiment the number of groups is made two in order to facilitate the description.

(2) The computation of a sigmoid function is made more efficient.

Figure 4:
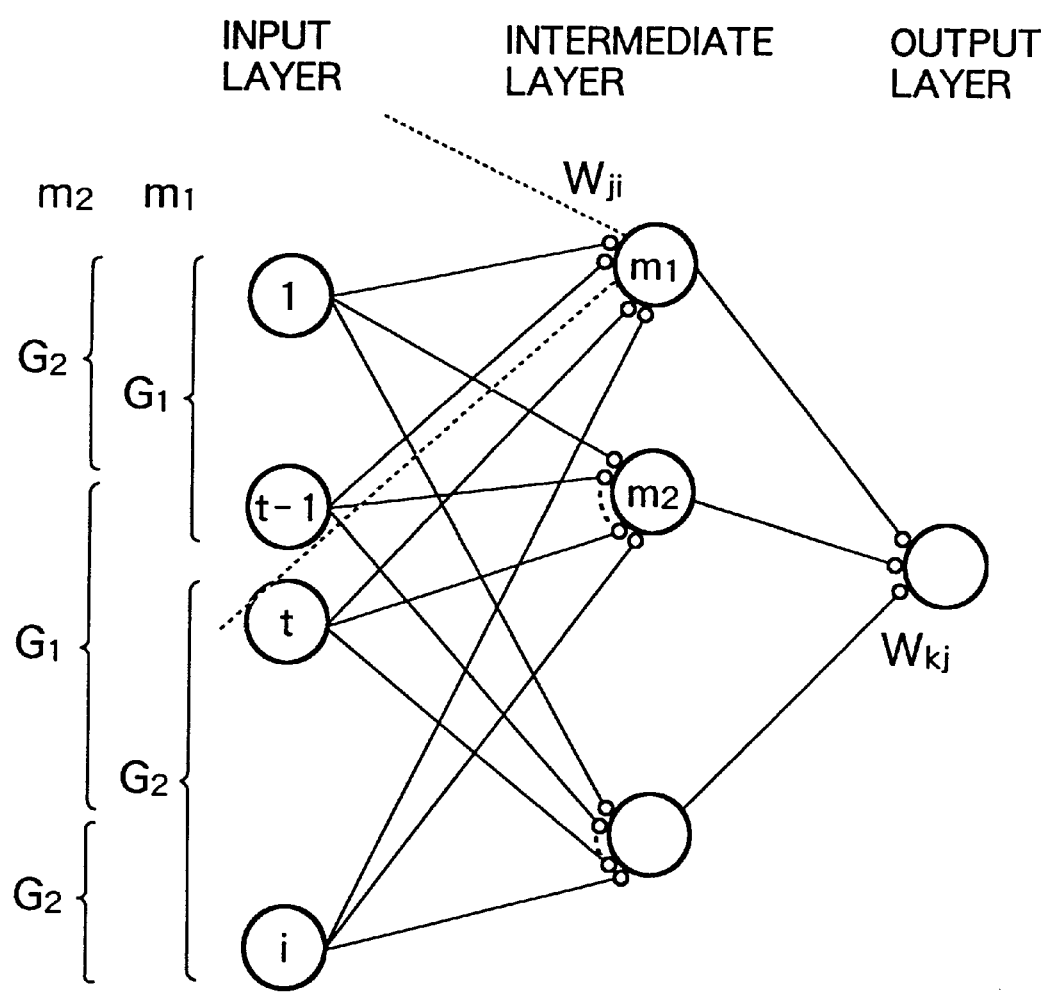
FIG. 4 is a diagram for describing the construction of a neural network according to the first embodiment.

FIG. 4 shows an example of the grouping of neural coupling coefficients according to the first embodiment. The grouping of FIG. 4 is applied to the i×j×1 network of FIG. 2, namely a network of the type in which each element of an input layer comprising i-number of neurons is connected to all j-number of elements of the intermediate layer, and each element of the j-number of elements of the intermediate layer is connected to the output layer, which comprises a single element.

The grouping of the first embodiment shown in FIG. 4 is performed as follows: First, to facilitate the description, the neurons of the intermediate layer are numbered $m_1$, $m_2$, . . . and so on. The couplings between the neuron $m_1$ of the intermediate layer and the neurons 1 through t-1 of the input layer are grouped as group $G_1$, and the couplings between the neuron $m_2$ of the intermediate layer and the neurons t through i of the input layer are grouped as group $G_2$. Further, the couplings between the neuron $m_2$ of the intermediate layer and the neurons 1 through p-1 and q through i of the input layer are grouped as group $G_2$, and the couplings between the neuron $m_2$ of the intermediate layer and the neurons p through q-1 of the input layer are grouped as group $G_1$. Thus, the neurons $m_1$, $m_2$ are alike in that they are each involved in the same number of groups and both are coupled to all neurons of the neural layers, but they differ in the manner in which they are grouped with regard to their coupling to the neurons of the input layer. In other words, grouping relative to the neurons of the input layer differs for each neuron of the intermediate layer. Grouping of this type is applied with regard to all neurons of the intermediate layer.

Figure 5C:
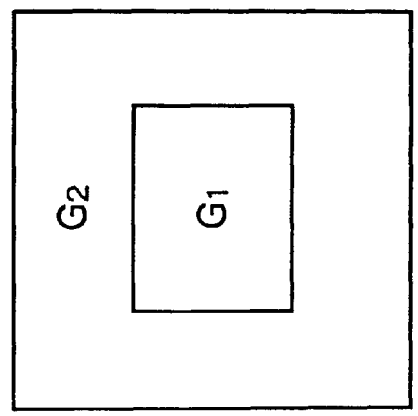
FIGS. 5A through 5C are diagrams for describing various ways of performing grouping in the first embodiment.
Figure 5B:
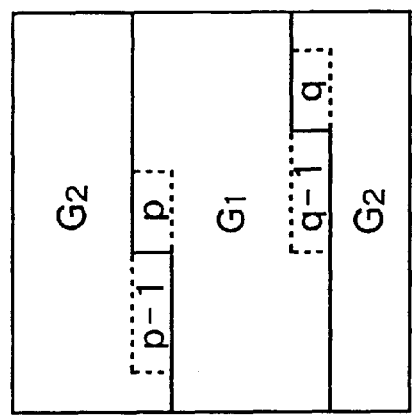
Figure 5A:
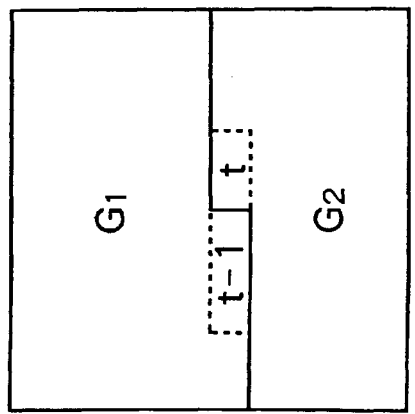

FIGS. 5A through 5C are examples of grouping with regard to the neurons $m_1$ through $m_{is}$. In the examples of FIG. 4 and FIGS. 5A through 5C, the grouping differs for each element of the intermediate layer. However, the groupings can be made to coincide.

The manner in which the computations in the intermediate and output layers are put into table form is indicated by the groupings of FIG. 4 and FIGS. 5A through 5C. The circuit system is illustrated in FIG. 6. More specifically, the operations performed by all of the neurons of FIG. 4 are replaced by the operations implemented by j-number of arithmetic units, the addition performed by an adder 28, and the operation implemented by a table 29, as shown in FIG. 6.

The operations in each of the j-number of arithmetic units of FIG. 6 approximately agree with the operations in the j-number of neurons in the intermediate layer. Each arithmetic unit comprises two arithmetic tables which perform the operation $W_{ji}$×iout; one adder which adds the results of the two arithmetic operations; and one function table which performs an operation based upon a sigmoid function. As set forth earlier, the number of groups in the first embodiment is set at two, and therefore two arithmetic tables are employed. Entered in the two arithmetic tables of each arithmetic unit are the items of neural data of the input layer grouped into the groups $G_1$ and $G_2$, as described in connection with FIG. is (FIG. 4 and FIGS. 5A through 5C).

Before describing the operation of the circuit shown in FIG. 6, a circuit for carrying out the grouping of the kind shown in FIG. is will be discussed with reference to FIG. 7.

FIG. 7 shows a circuit for grouping the neurons of the input layer when the neural network of FIG. 4 is utilized in the image processing of a binary image, by way of example. Since the image processing (e.g., image discrimination) of a binary image requires that reference be made to pixels in a range having a two-dimensional spread, the grouping circuit is formed from line buffers (LB) and latch circuits (LT), as illustrated in FIG. 7.

In the circuit of FIG. 7, an inputted binary image is applied to serially connected line buffers (LB) 1 through is from which delayed data of one line, two lines and three lines and obtained, respectively. Thus, data in the vertical direction of the image is obtained. The items of original binary image data and delayed data from the buffers LB first enter latches (LT) 4 through 7, whereby a delay of one pixel is carried out in the horizontal direction. The outputs of the latches enter latches (LT) 8 through 11, where a further delay of one pixel is carried out in the horizontal direction. Similarly, a delay of one pixel is successively carried out by latches 12 through 15. Thus, a pixel of interest and image data in a rectangular area surrounding this pixel are extracted. The image data in the rectangular area shall be referred to as "binary pattern data". These items of binary pattern data enter the arithmetic units of FIG. 6. For example, if the latches of FIG. 7 are five in number in the horizontal direction and five in number in the vertical direction, then 5×5=25 bits of data are outputted on 25 lines as the binary pattern data. The wiring is such that the items of data on these 100 lines will match the groupings of FIG. 4 and FIGS. 5A through 5C for every neuron of the intermediate layer. The items of data enter the arithmetic units of FIG. 6 in accordance with such wiring.

In each arithmetic table, $\Sigma W_{ji} \times iout$ corresponding to the neuron iout of the input layer is computed for each group. For example, in an arithmetic table 16 corresponding to the computation of group $G_1$ of neuron $m_1$, the following arithmetic operation is performed:

$$\sum_{i=1}^{t-1} W_{1i} \times iout \qquad (12)$$

Further, in an arithmetic table 17, the following arithmetic operation is performed:

$$\sum_{i=t}^{i} W_{1i} \times iout \qquad (13)$$

If the results from these arithmetic units 16, 17 are assumed to be sum1 and sum2, respectively, sum=sum1+sum2 is obtained by the adders 22 through 24 In other words, the following is outputted by the adder 22:

$$\sum_{i=1}^{t-1} W_{1i} \times iout + \sum_{i=t}^{i} W_{1i} \times iout = \sum_{i=1}^{i} W_{1i} \times iout \qquad (14)$$

If it is attempted to put the arithmetic operations in the neurons of the intermediate layer into table form by one arithmetic table, or in other words, if an attempt is made to realize the operations in the arithmetic tables 16, 17 and adder 22 in the circuitry of FIG. 6 by one arithmetic table, a large table of $2^i$ bits per arithmetic unit will be required. However, if grouping is performed in the manner shown in FIG. 6, e.g., if the number of neurons in each group is assumed to be $G_1=G_2=i/2$, only two tables having a size of $2^{i/2}$ will suffice. As a result, the circuitry can be reduced in scale.

As described in connection with Eqs. (1) and (2), the output of each neuron of the intermediate layer is obtained by subjecting $Sum_{Fj}=\rho W_{ji}*iout$ to a sigmoid function. Also, as described in connection with Eqs. (3) and (4), the sum $Sum_{Fk}=\Sigma W_{kj}*jout(j)$ from each neuron of the intermediate layer is subjected to a sigmoid function, and this becomes the output of the output layer. In general, the benefits of putting arithmetic operations in able form are greater for multiplication and division than for addition and subtraction. Accordingly, function tables (25, 26, ...) of the respective arithmetic units in FIG. 6 are made tables in which the products of sigmoid function processing and $W_{kj}$ are calculated en masse. More specifically, if the results of subjecting the outputs sum from the respective adders (22, 23, ...) to sigmoid function processing are expressed in the functional notation "f(sum)", then the following arithmetic operations will be performed in the function tables 25, 26, ... 27:

f(sum)*$W_{k1}$ f(sum)*$W_{k2}$ f(sum)*$W_{ki}$

By thus taking the products the sigmoid function processing and $W_{kj}$ en masse, high-speed processing and a reduction in circuit scale can be obtained.

The adder 28 performs the operation $$sum' = \sum_j f(sum) * W_{kj} \qquad (16)$$

An arithmetic operation in accordance with Eq. (4) is performed by the sigmoid function table 29.

Thus, the circuit system of FIG. 6 is such that all operations in the network illustrated in FIG. 4 are put into table form.

<First Modification of the First Embodiment>

Figure 8:
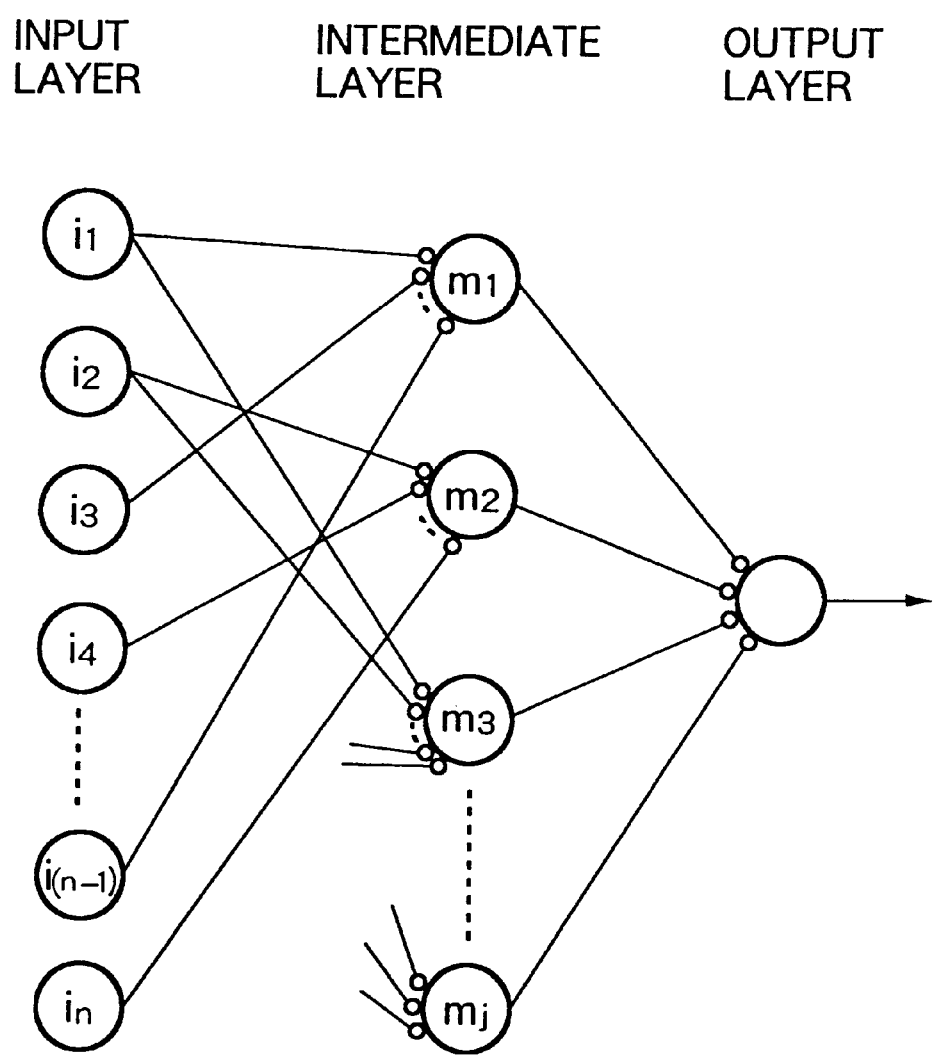
FIG. 8 is a block diagram showing the structure of a neural network according to a modification of the first embodiment.

In the first embodiment shown in FIG. 4, each neuron of the intermediate layer is coupled to all neurons of the input layer. FIG. 8 illustrates a modification of the first embodiment, specifically a modification in which the neurons of the intermediate layer are connected only to some of the neurons of the input layer.

In FIG. 8, an element $m_1$ of the intermediate layer is coupled to elements $i_1$, $i_{is}$, $i_{n-1}$ of the input layer, and an element $m_2$ of the intermediate layer is coupled to elements $i_2$, $i_4$, in of the input layer. As seen in this modification, the neurons of the intermediate layer need not be coupled to all inputs of the input layer.

<Second Modification of the First Embodiment>

In the second modification, the construction of the arithmetic units in the first embodiment is further simplified. In order to achieve this simplification, the sigmoid function is approximated by a linear function.

Figure 9:
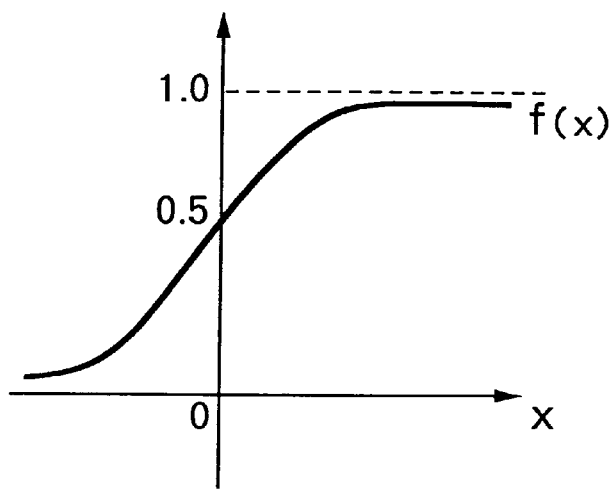
FIG. 9 is a graph showing the characteristic of a sigmoid function in the first embodiment, etc.

A sigmoid function f(x) generally has a characteristic of the kind shown in FIG. 9. According to the second modification, a sigmoid function having the characteristic of FIG. 9 is approximated by a linear function f'(x). As the approximating linear function, use is made of one (e.g., FIG. 10) in which the y-intercept (0.5) is identical with that of the sigmoid function.

Figure 11:
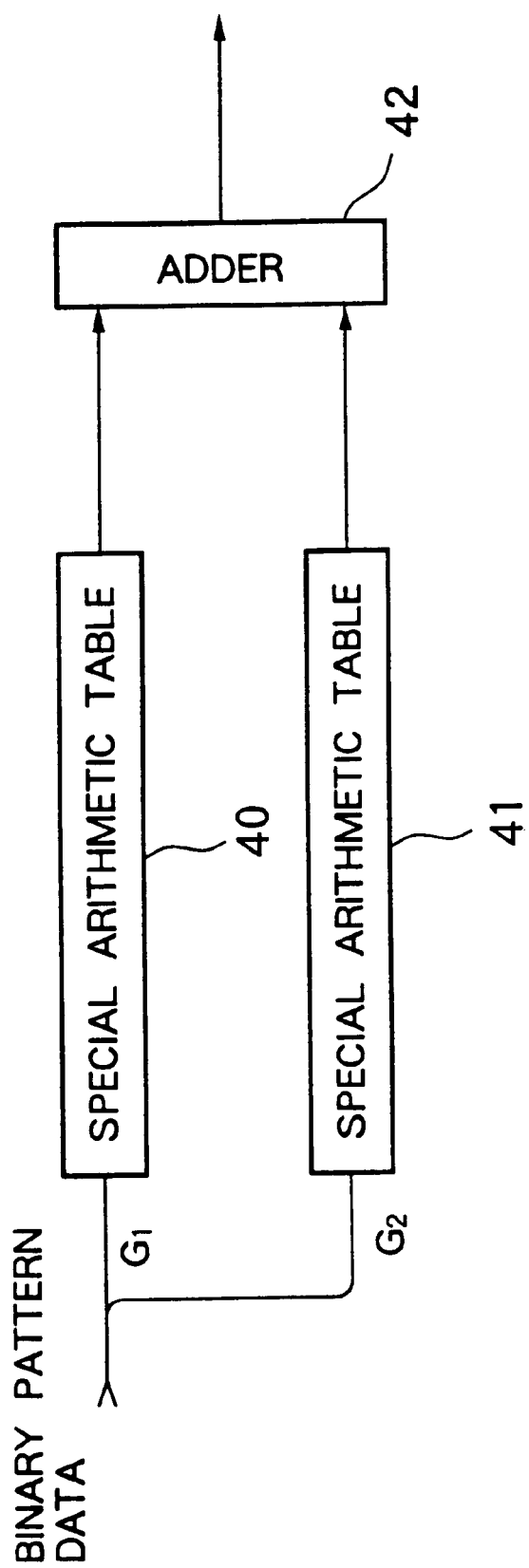
FIG. 11 is a diagram for describing the structure of a neuron according to another modification of the first embodiment.

By virtue of this approximation, the second modification makes it possible to substitute the circuit arrangement of FIG. 11 for the arithmetic tables 16–21, the adders 22–24, the function tables 25–27 and the adder 28 of FIG. 6. This will be illustrated below.

The circuitry of FIG. 11 comprises a special arithmetic table 40 for group G1, a special arithmetic table 41 for group G2, and an adder 42.

In this case, if the output produced by the adder 42 is f'(sum)*$W_{kj}$ which corresponds to $\Sigma$f(sum)*$W_{kj}$ outputted by the adder 28, then a substitution of the kind shown in FIG. 11, namely an approximation by the linear function f'(x), will be possible. Here the output sum of the adder 22 is $$sum=sum_1+sum_2 \qquad (17)$$

Figure 10:
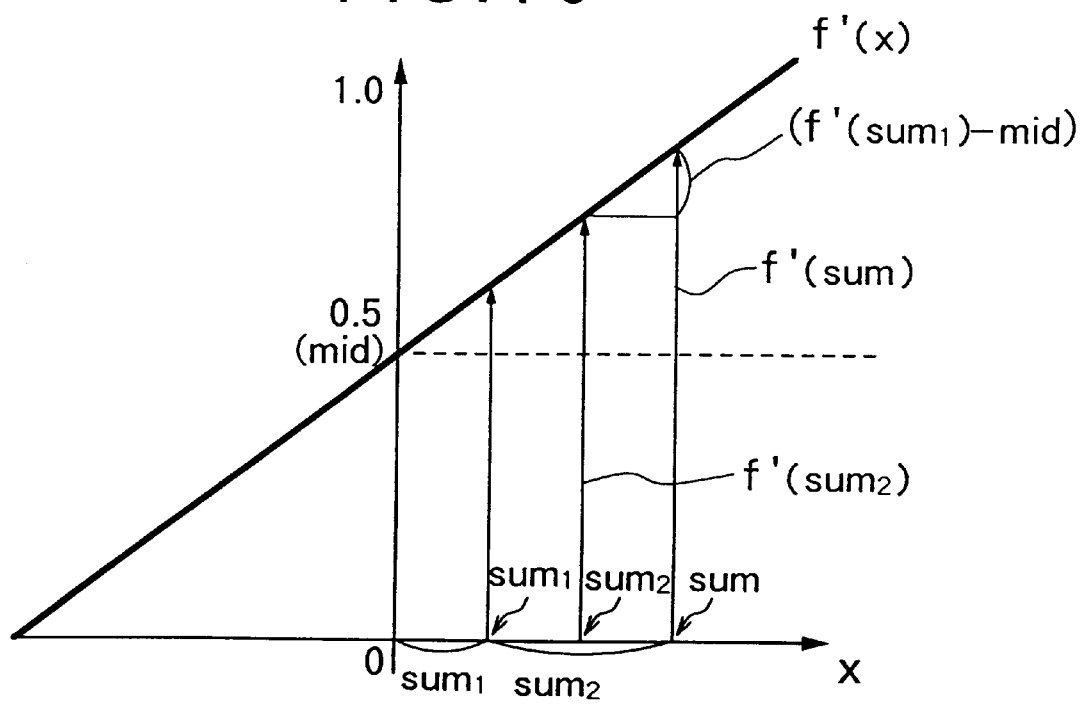
FIG. 10 is a diagram showing the characteristic of the approximate function of a sigmoid function used in another modification of the first embodiment.

Since f' (x) is a linear function, i.e., since it maintains linearity, the following is obtained by referring also to FIG. 10:

f'(sum)

=$f'(sum_1)+f'(sum_2)-f'(o)$

=$f'(sum_1)+f'(sum_2)-mid \qquad (18)$

Accordingly, we have $$\Sigma f'(sum) \times W_{kj}$$
$$= \Sigma f'(sum_1) \times W_{kj}$$
$$+ \Sigma f'(sum_2) \times W_{kj}$$
$$- \Sigma f'(0) \times W_{kj} \quad (19)$$

If the first and third terms on the right side of the above equation are computed by the special function tables 40, 41, respectively, of FIG. 11, and the third term (a constant) is added by either table (e.g., table 40), then the output of the adder 42 will be the left side of Eq. (19), namely $$\Sigma f'(sum) \times W_{kj}$$

Therefore, substitution of the above-described circuit is possible.

More specifically, in the special function table 40, the following is outputted in response to an input:

$$\Sigma f'(sum_1) \times W_{kj} - \Sigma f'(mid) \times W_{kj}$$
$$= \Sigma f'(sum_1 - mid) \times W_{kj}$$

and the special function table 41 outputs the following:

$$\Sigma f'(sum_2) \times W_{kj}$$

Thus, it is possible to substitute the circuit arrangement of FIG. 11 for the arithmetic tables 16–21, the adders 22–24, the function tables 25–27 and the adder 28 of FIG. 6.

<Other Modifications of the First Embodiment>

One embodiment and two modifications thereof have been described above with reference to FIGS. 3 is through 11. Further alterations will now be described.

In the foregoing embodiment and modifications, the number of groups is two. However, three of more groups can be used, as set forth earlier. In such case, the number of arithmetic tables required to be prepared in each arithmetic unit would be equal to the number of groups.

Further, in the embodiment and modifications of FIGS. 3 through 11, the arithmetic unit corresponding to one neuron of the intermediate layer comprises a plurality of tables and an adder. If the number of connecting lines between the input layer and the intermediate layer is reduced, one table may be substituted for one arithmetic unit in its entirety. In such case, $$f(\Sigma W_{ji} \times iout) \times W_{kj}$$

would be written in the table with respect to an input pattern iout. Accordingly, a value which results from multiplying the output of the intermediate layer by the weighting coefficient of the output layer is obtained by the arithmetic operation of the table.

<Second Embodiment>

The aim of the first embodiment described above was to reduce the scale of the circuitry in an ordinary neural network. From this viewpoint, grouping of the connections between the input layer and output layer was attempted. To this end, the neurons of the input layer were divided into two groups, the individual neurons belonging to the individual groups and one neuron of the intermediate were coupled, and the input layer and intermediate layer were divided into groups. In such case, the neurons of the input layer were shared by different neurons of the intermediate layer, and arithmetic operations within each group were put into table form to the maximum extent possible. In the second embodiment to be described below, however, the neurons of the input layer and intermediate layer are divided into a plurality of groups, and there is no coupling between neurons belonging to the different groups. The data processed in each group is processed for the first time as one nerve cell in the output layer.

The second embodiment will now be described in detail.

Figure 12:
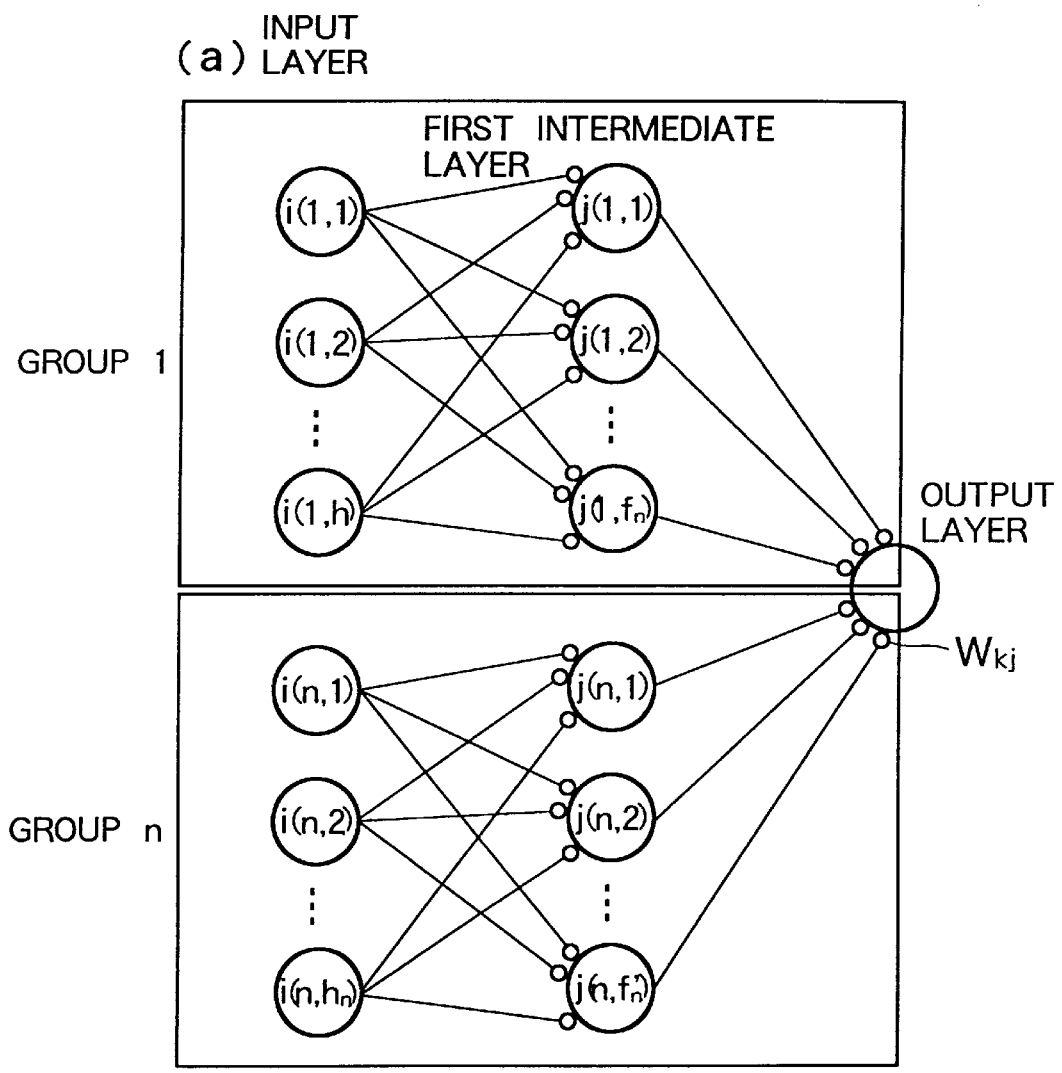
FIG. 12 is a block diagram showing the structure of neurons according to the second embodiment.

FIG. 12 illustrates a grouping technique according to the second embodiment. A neural network in the second embodiment comprises one input layer, one intermediate layer and one output layer. The neurons of the input layer are divided into n-number of groups, and the neurons of the intermediate layer also are divided into n-number of groups. The number of neurons of group 1 of the input layer is $h_1$, that of group 2 is $h_2$, and that of group n is $h_n$. That is, the number of neurons of the input layer is as follows:

$$\sum_{m=1}^{n} h_m$$

Further, the number of neurons of group 1 of the intermediate layer is $f_1$, that of group 2 is $f_2$, and that of group n is $f_n$. That is, the number of neurons of the intermediate layer is as follows:

$$\sum_{m=1}^{n} f_m$$

It does not matter whether $f_m = h_m$ or $f_m \ h_m$ holds. The $\Sigma f_i$-number of outputs of the intermediate layer are coupled to one neuron of the output layer.

In accordance with such coupling, the neurons of the input layer and the neurons of the intermediate layer are divided into n-number of groups, and there is no coupling between the input-layer neurons and intermediate-layer neurons belonging to different groups.

By virtue of such grouping, it is possible to realize the hardware configuration described below, thereby reducing the processing in the output layer. Specifically, the arithmetic operation executed by the output layer entails multiplying the output data from the input layer of each group by the weighting coefficient of the output layer, and calculating the total sum. That is, the following arithmetic operation is executed by the output layer:

$$sum = \sum_{j} W_{kj} \times jout(j)$$

If the contribution from the neurons of the intermediate layer in group m to the neurons of the output layer is defined as follows:

$$sum(m) = \sum_{j=1}^{} W_{kj} \times jout(m, j) \quad (20)$$

then we have $$sum = sum(1) + sum(2) + \ldots + sum(n) \quad (21)$$

Accordingly, if sum(m) is obtained within each group and this is adopted as the output from each group, then it will suffice for the output layer to compute the total sum of the outputs from each group to obtain sum, and then subject this to the sigmoid function.

Figure 13B:
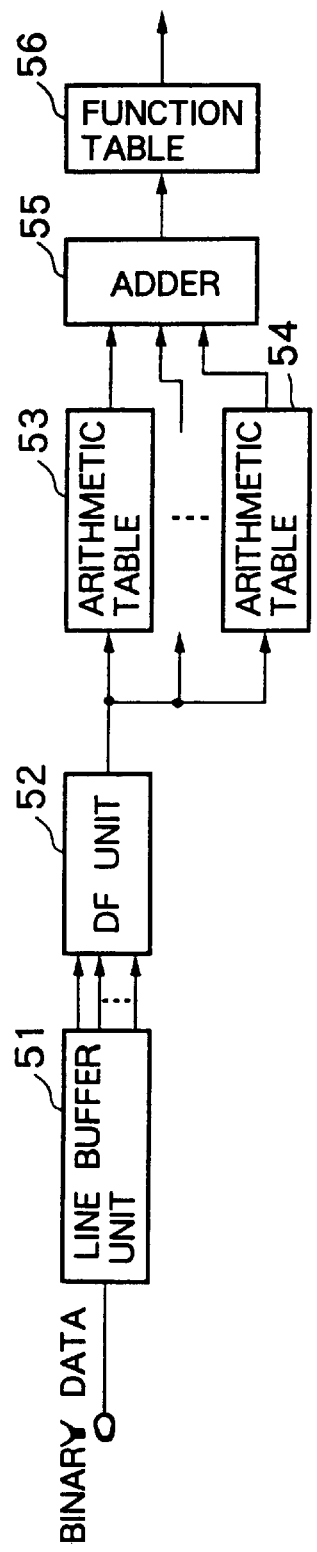
FIG. 13B is a block diagram showing the structure of neurons according to the second embodiment.

The processing in each group, inclusive of computation of sum(n), is realized by conversion using a table, in the same manner as the first embodiment. FIGS. 13A and 13B illustrate circuit arrangements for hardware implementation of the structure obtained by such grouping.

The circuits of FIGS. 13A and 13B are obtained by constructing the network of FIG. 12 out of hardware mainly for the purpose of processing a binary image.

As shown in FIG. 13B, an inputted binary image is delayed in the direction of vertical pixels by a line buffer 51, and in the horizontal direction by a DF unit 52, thereby obtaining an image which surrounds the pixel of interest. The output of the DF unit 52 enters n-number arithmetic tables 53–54. The arithmetic tables correspond to the groups 1-n and perform arithmetic operations up to the determination of sum(m). In other words, in each arithmetic table, only data of the input-layer neurons relating to the corresponding group within the output from the DF unit 52 are inputted, and arithmetic operations up to the determination of sum(m) are performed by table conversion. The total sum sum(m) with regard to all groups is calculated by an adder 55, and sigmoid-function processing is carried out by table conversion in a function table 56.

The structures of the line buffer 51 and DF unit 52 are shown in greater detail in FIG. 13A. The line buffer comprises serially connected line buffers 61–63 from which delayed data of one line, two lines and three lines are obtained, respectively. Thus, data in the vertical direction of the image is obtained. In the DF unit 52, The delayed data from the line buffer 51 first enters D-type flip-flops DF77–74, whereby a delay of one pixel is achieved in the horizontal direction. The outputs of the these flip-flops enter flip-flops DF75–78, where a further delay of one pixel is achieved in the horizontal direction. Similarly, a delay of one pixel is successively achieved by flip-flops DF79–82. Thus, pixels peripheral to a pixel of interest are extracted. Assigned to each group are pixels, which are contained in these peripheral pixels, corresponding to the group.

Figure 14A:
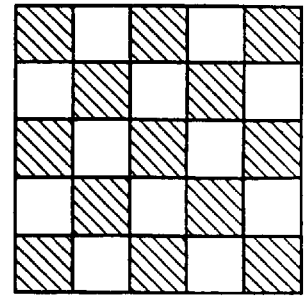
FIGS. 14A and 14B are diagrams showing examples of groupings of an input image in the second embodiment.
Figure 14B:
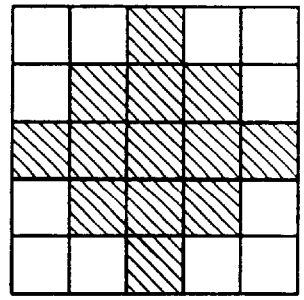

Examples of grouping in a case where the number of groups is two are illustrated in FIGS. 14A and 14B, in which the shaded portions are adopted as group 1 and the remaining portions are adopted as group 2. FIG. 14A is an example in which 5×5 (=25) pixels (neurons of the input layer) are grouped into a central portion and a peripheral portion. FIG. 14B is an example in which 5×5 (=25) pixels (neurons of the input layer) are divided uniformly into two groups.

The circuitry of the second embodiment in FIG. 13B will now be compared, from the viewpoint of circuit scale, with a circuit in which the arithmetic tables 53–54, adder 55 and function table 56 are realized by a single table. If a neural network having p-number of input elements is equally divided by n in accordance with the technique of the second embodiment in order to obtain n-number of groups, the number of required inputs of each group will by p/n for binary data, and a table capacity of $2^{p/n} \times n$ will suffice with respect to the n-number of groupings. On the other hand, in a case where the entirety is implemented by one table, a table of size $2^p$ is required. The fact that $(2^{p/n} \times n) \ll 2^p$ holds is obvious. By way of example, if the input is 5×5 pixels and this is divided into five groups, $2^{25} \approx 3.4 \times 6^7$ will be required to achieve consolidation into one table. By contrast, $2^5 \times 5 = 160$ will suffice according to the second embodiment.

<Modification of the Second Embodiment>

Figure 15:
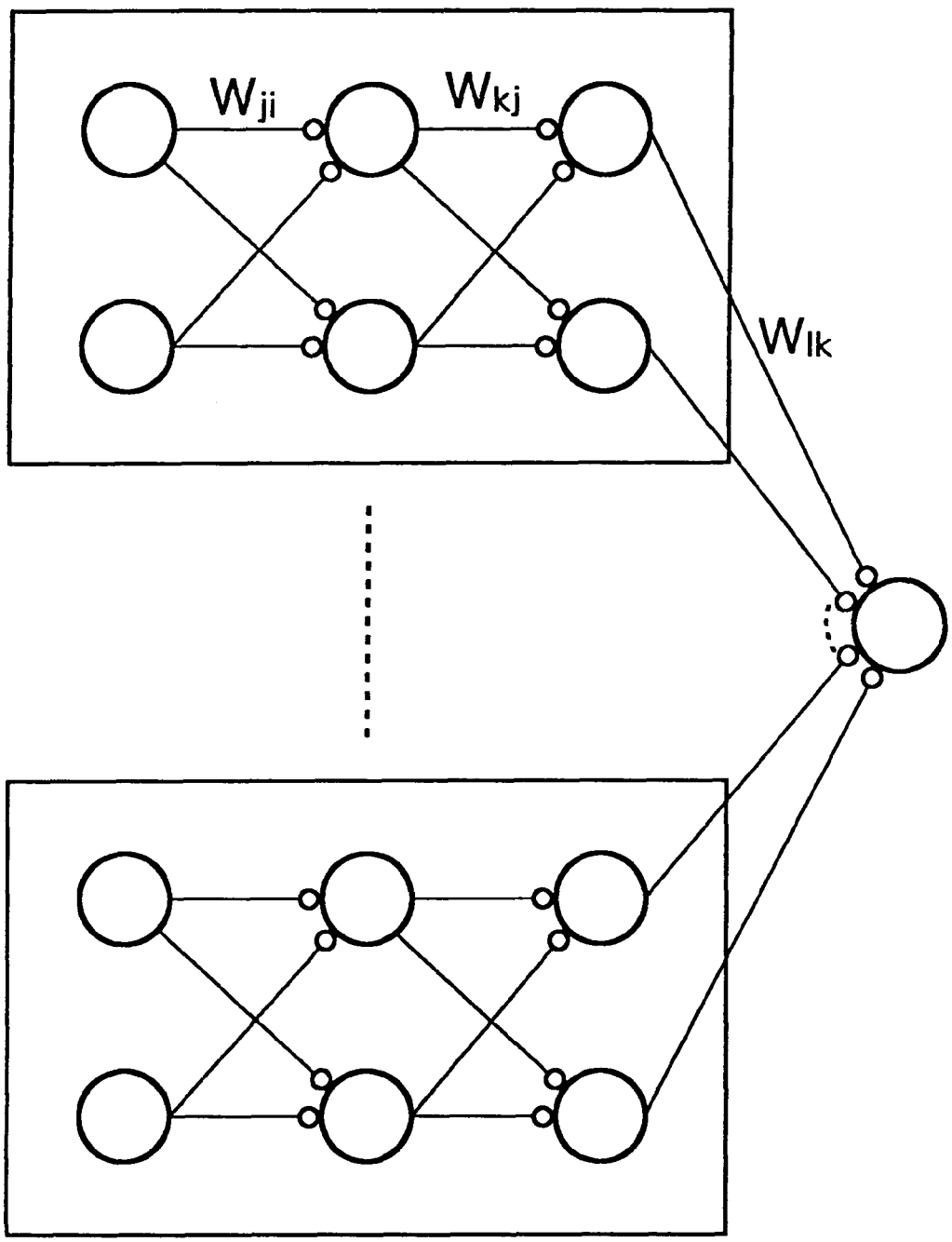
FIG. 15 is a diagram showing the construction of a neural network according to a modification of the second embodiment.
Figure 16:
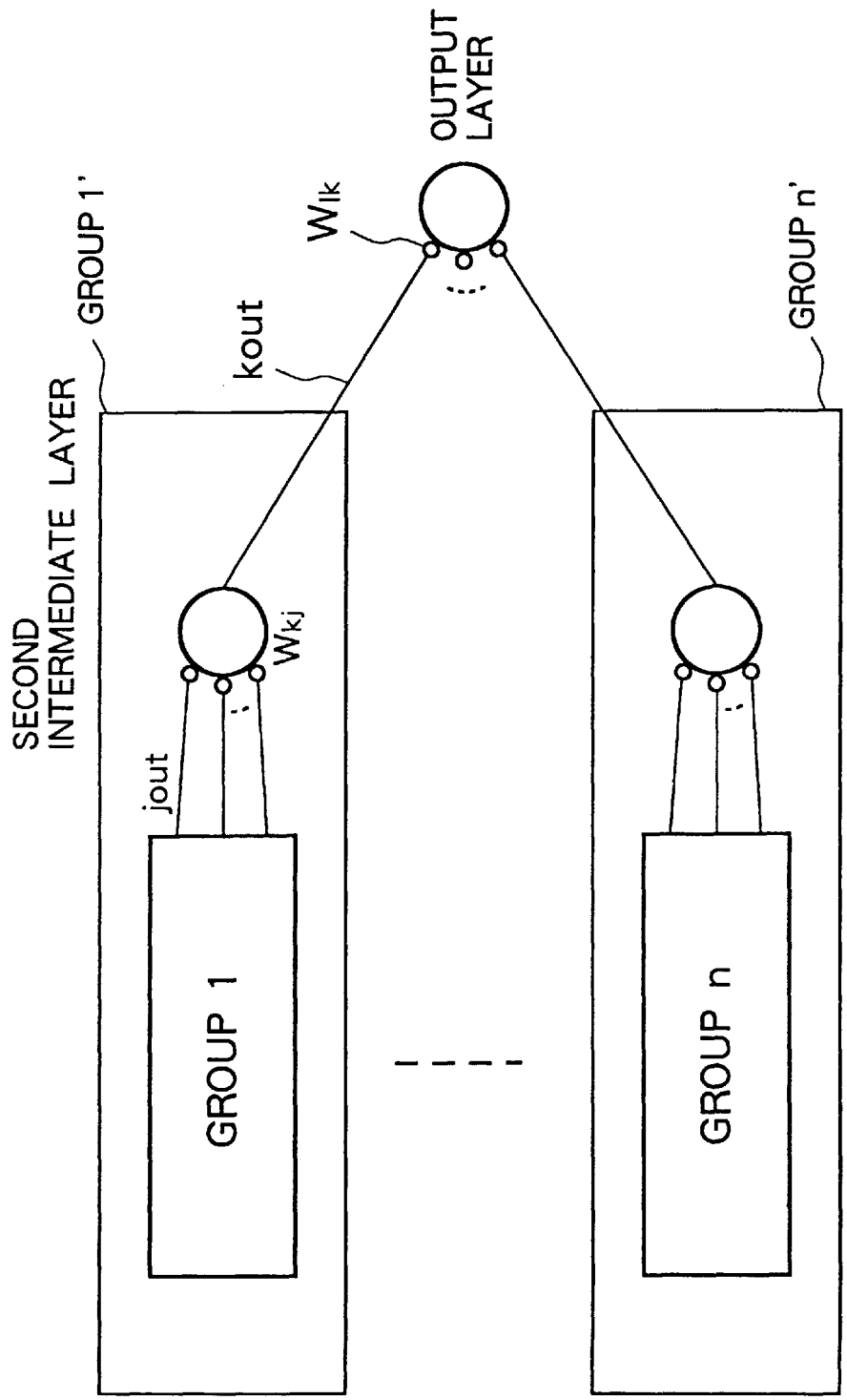
FIG. 16 is a block diagram showing the construction of neural elements in a second intermediate layer according to a modification of the second embodiment.

A proposed modification of the second embodiment will now be described, the construction of which is shown in FIG. 15. The neural network corresponding to this modification comprises four layers, namely an input layer (p-number of neurons), a first intermediate layer (q-number of neurons), a second intermediate layer and an output layer (renumber of neurons). Let $W_{ji}$ represent the coupling coefficient between the input layer and the first intermediate layer, $W_{kj}$ the coupling coefficient between the first intermediate layer and the second intermediate layer, and $W_{1k}$ the coupling coefficient between the second intermediate layer and the output layer. According to this modification, the neurons of the input layer and of the first and second intermediate layers are divided into n-number of groups. As one example, assume that the neurons belonging to the individual layers are divided into groups having the same numbers of neurons. In such case, p/n-number of neurons of the input layer, q/n-number of neurons of the first intermediate layer, and r/n-number of neurons of the second intermediate layer are adopted as one group. There is no coupling between neurons belonging to different groups. Grouping of the neurons belonging to the input layer and the first intermediate layer can be performed in exactly the same manner as the second embodiment described earlier. Specifically, the combination of the input layer and first intermediate layer can be referred to as group n (see FIG. 16) in accordance with the second embodiment. FIG. 16 illustrates the coupling between the neurons of the second intermediate layer the group n in a case where the number of neurons in the second intermediate layer is n (=r), namely in a case where the number of second intermediate-layer neurons belonging to one group is one. In FIG. 16, the combination of group n and an n-th neuron of the second intermediate layer is referred to as group n'. With regard to the neurons of the second intermediate layer, the input is multiplied by the weighting coefficient $W_{kj}$ of the second intermediate layer, the products within the group are summed and the value of the sigmoid function is computed.

This neural network comprising four layers can also be substituted by a circuit arrangement the same as that shown in FIGS. 13A and 13B. In this case, the results of the following arithmetic operations performed by the neurons would be stored in the arithmetic tables 53–54 illustrated in FIG. 13B. Specifically, the following contents would be stored in each table:

$$\text{sumi} = \Sigma W_{ji} \times \text{iout}$$

regarding all values iout of the input layer in each group;

$$\text{jout} = f(\text{sum}_i)$$

which is the value of the sigmoid function that is the output of the first intermediate layer;

$$\text{sum}_j = \Sigma W_{kj} \times \text{jout}$$

with respect to this output jout;

$$\text{kout} = f(\text{sum}_j)$$

which is the value of the sigmoid function that is the output of the first intermediate layer; and $$W_{1k} \times \text{kout}$$

obtained by multiplying kout by the weighting coefficient $W_{lk}$ in the output layer.

Accordingly, the adder 55 shown in FIG. 13B performs the arithmetic operation $$\text{sum}_k = \Sigma_{Wk1} \times \text{kout}$$

and the value of the sigmoid function $$\text{jout} = f(\text{sum}_k)$$

is obtained by table conversion in the function table 56. The final output is thus obtained.

<Other Modifications of the Second Embodiment>

In the description relating to the second embodiment set forth above, each group is completely divided with no sharing of neurons. However, this does not impose a limitation upon the invention, for it is permissible for neurons to be shared by different groups. The example of such an arrangement is shown in FIG. 17.

Figure 17:
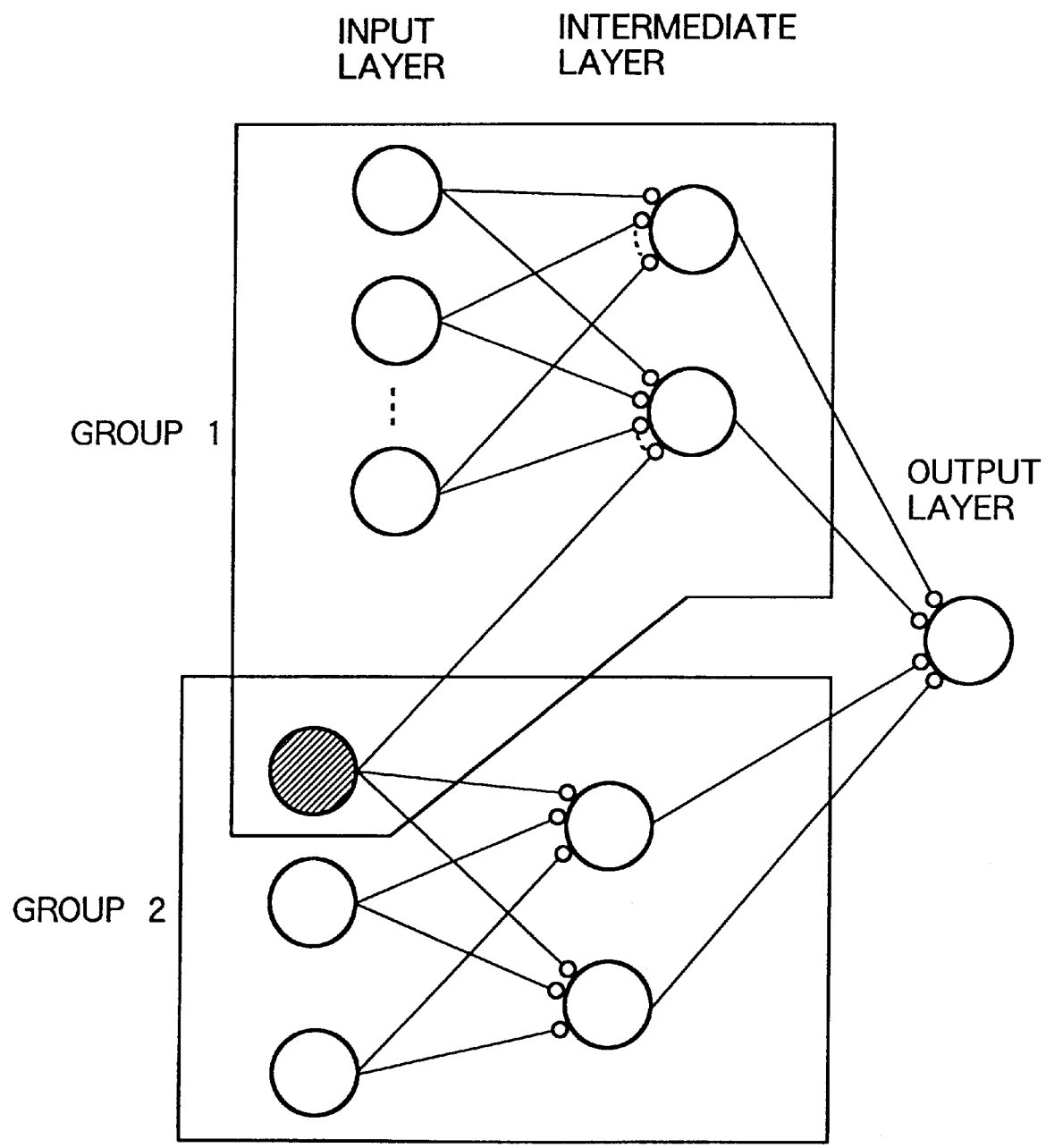
FIG. 17 is a diagram showing the construction of a neural network according to the third embodiment.

In FIG. 17, input and intermediate layers are each composed of two groups, and the shaded element among the elements of the input layer is shared by both groups.

In a case such as this, the size of the table in the hardware configuration is only doubled, for example, in comparison with the completely divided arrangement, even if the elements in each group are increased by one element from another group. A table of such size is permissible as long as it is within the allowable storage limits of the memory.

In accordance with the second embodiment, as described above, the neural network is divided into a plurality of groups on the input-layer side. Therefore, the arrangement is such that part of the processing of the neurons can be realized by table conversion based on addresses with a smaller number of bits. Consequently, most of the processing in the neural network can be performed by providing several memories, and therefore the circuitry can be reduced in scale.

In the output layer, on the other hand, groups divided on the input-layer side are connected, and therefore the action of the overall neural network is maintained.

In each of the divided groups, moreover, there is no need to enlarge the scale of the hardware even if the intermediate layer is constituted by a number of layers.

<Third Embodiment>

The neural network according to the third embodiment is applied to masking processing for obtaining Y', M', C', Bk' from image signals Y (yellow), M (magenta) and C (cyan).

Figure 18:
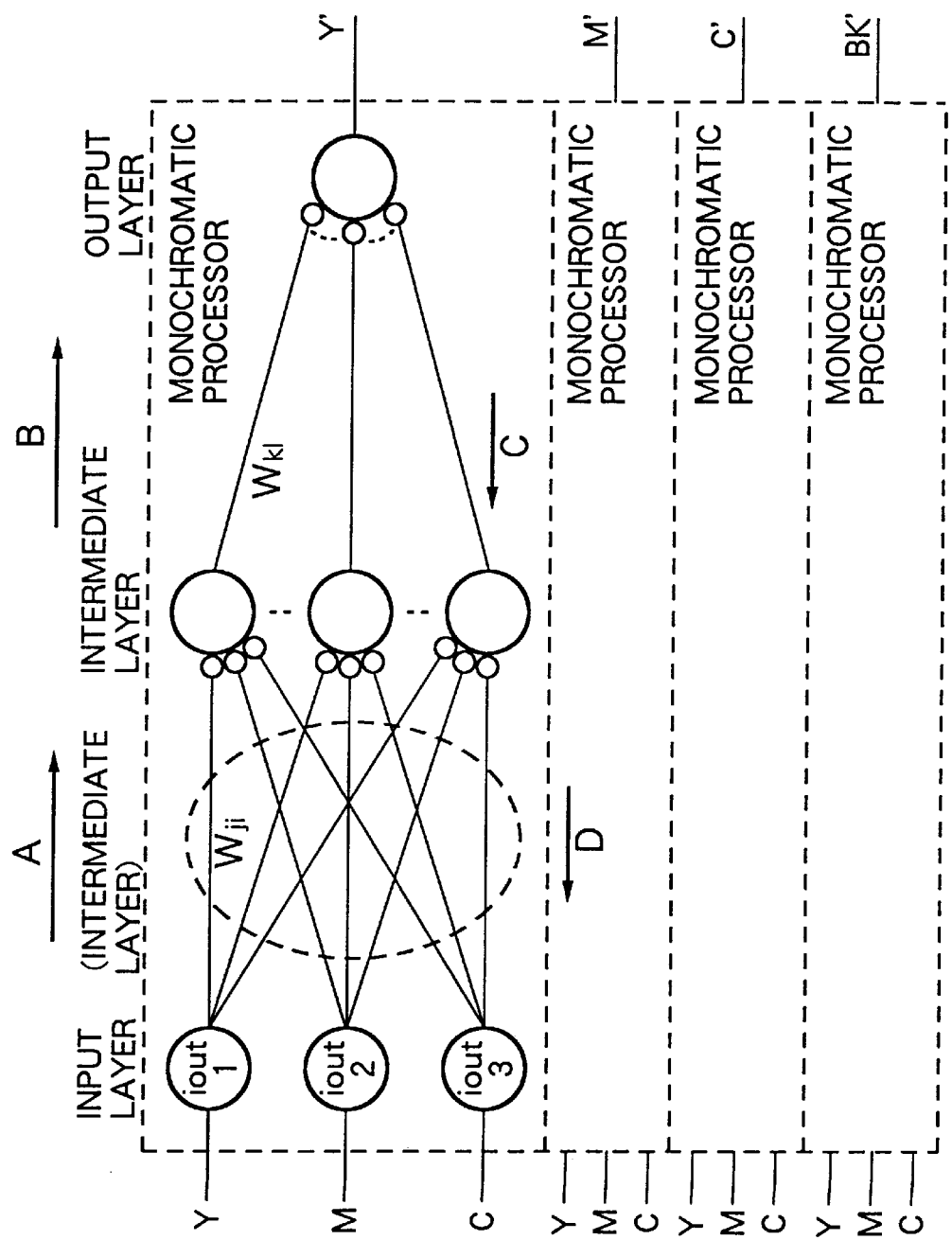
FIG. 18 is a block diagram showing the construction of a network according to the third embodiment of the invention.

FIG. 18 is a diagram showing the construction of the network according to the third embodiment. The outputs of the overall system are four, namely Y', M', C' and Bk'. Monochromatic processors that are completely mutually independent corresponding to respective ones of the outputs are formed by neural networks.

The network of each monochromatic processor has an input layer for three inputs corresponding to Y, M and C, an intermediate layer coupled to the input layer at a coupling coefficient $W_{ji}$, and an output layer coupled to the neurons of the intermediate layer at a coupling coefficient $W_{kj}$.

As for the neurons of the intermediate layer, a comparatively large number elements are assigned (e.g., 15) in case of one layer. If the intermediate layer is composed of two layers, a comparatively small number of elements are assigned (e.g., n=7). The number of elements in the output layer is assumed to be one. By way of example, in a case where two intermediate layers are provided, the number of connections between the neurons of these intermediate layers is a maximum of $n^2$ if the number of elements in each intermediate layer is n. Accordingly, if n is halved, the number of connections becomes ¼.

Both the number of connections between the neurons of the intermediate layer and the neurons of the input layer and the number of connections between the neurons of the intermediate layer and the neurons of the output layer are proportional to n. Since the connections between intermediate layers are eliminated by making the intermediate layer a single layer, the number of elements and the number of connections are greatly reduced.

The characterizing feature of the third embodiment is that the monochromatic processors mentioned above are constituted by mutually independent neural networks in view of the fact that the Y, M and C (an also Bk likewise) image signals are image signals having little correlation. By rendering mutually independent the neural networks which correspond to respective ones of the image signals exhibiting little correlation, the learning of the neural network can be made to converge at greater speed. In other words, the number of neural elements in the intermediate layer can be increased to the extent that the convergence speed is raised, and the result is that both higher learning efficiency and accurate masking processing can be achieved.

Further, by constructing the monochromatic processors of mutually independent neural networks, namely by rendering mutually independent the networks corresponding to the respective image signals exhibiting little correlation, the accuracy of masking processing can be improved in relative terms, the coupling constants can be decided, and learning efficiency is improved. Accordingly, the total number of elements in the intermediate layer can be reduced to the extent of these improvements in comparison with the prior art. More specifically, an apparatus of smaller scale, high processing accuracy and high processing speed can be reconciled.

Learning for the network system of FIG. 18 will now be described. In this embodiment, the so-called back-propagation method is employed as the learning method.

FIGS. 19A through 19C are diagrams illustrating input image signals (Y, M, C) for learning. FIGS. 20A through 20D are diagrams illustrating ideal signals (Y', M', C', Bk') for learning. In these Figures, ($x_i$, $y_i$) indicate pixel position. As for the input of the input of the input image signals and ideal signals to the network at the time of learning, the arrangement is such that the pixel designated by (xi,yi) for each signal is entered.

The learning procedure of the neural network will now be described in general terms with reference to FIG. 18.

First, the input image signals (Y, M, C) for learning shown in FIGS. 19A through 19C, as well as the ideal signals (Y',M',C, Bk) shown in FIGS. 20A through 20D, are prepared as learning data. These ideal output signals are used in order to generate a teach signal. After the coupling strength $W_{ji}$ between the input layer and intermediate layer and the coupling strength $W_{kj}$ between the intermediate layer and the output layer are initially decided in a suitable manner, the input image signals (Y, M, C) are inputted to the network coupled based upon the initial values, and the output Y', M', C', Bk' are obtained. These outputs are compared with the aforementioned ideal output signals, and the teach signal is generated from the comparison. This process is illustrated as the process A⇒B in FIG. 18. The coupling strengths $W_{ji}$, $W_{kj}$ are corrected from this teach signal while learning is performed in accordance with the back-propagation method. This process is illustrated as the process C⇒D in FIG. 18. When this learning is repeated, the coupling strengths $W_{ji}$, $W_{kj}$ are corrected as those appropriate for masking processing. The coupling strengths $W_{ji}$, $W_{kj}$ obtained as the result of learning are held within the network.

For the details of learning according to the third embodiment, reference can be made to the control procedure (FIGS. 3A and 3B) for learning according to the first and second embodiments.

Thus, in accordance with the third embodiment, each element of the output layer is coupled solely to a respective element group of the intermediate layer of its own group. Therefore, since these are mutually independent, learning converges more rapidly and learning accuracy is improved correspondingly. As a result, it is possible to reduce the intermediate layer by an amount commensurate with the improvement in speed and accuracy. More specifically, a reduction in the scale of the neural network and greater efficiency when learning the coupling coefficients of these neural elements can both be achieved.

<Modifications of the Third Embodiment>

The present invention can be modified in various ways within the scope of the claims.

For example, if the third embodiment is modified in such a manner that the input layers of the monochromatic processors are shared on the assumption that no processing whatsoever is executed in the input layers, it will be possible to regard the neural networks as being a single neural network in which the elements of all intermediate layers coupled by the neural networks are completely unshared up to the intermediate layers coupled to the element of each output layer, and up to the input layers.

The following modification is proposed:

If the output layer is composed of one element, as described above, the intermediate layer can be made a two-layer configuration and the number of elements can be reduced, or the intermediate layer can be made a single-layer configuration and the number of elements can be increased.

In particular, in a case where the ideal outputs of the output layer possess widely different attributes, the third embodiment (FIG. 18) should be applied. For example, the pixel of interest and several pixels peripheral to it are applied to the neurons of the input layer. Then, an edge emphasizing signal is applied to the neuron of the output layer, and learning and image processing are executed. With regard to another neural network, a smoothing signal is applied as the ideal signal of the output layer with respect to the same input. When this is done, excellent effects are attained.

Furthermore, though use is made of four (for four colors) monochromatic processors which are neural networks having exactly the same construction in the embodiment of FIG. 18, the number of elements in the intermediate layer can be different in each monochromatic processor. Moreover, with regard also to the coupling between elements, coupling is executed by combinations of all elements in the above embodiment. However, a case is permissible in which there is no coupling between a certain element of the intermediate layer and the next element.

<Fourth Embodiment>

The first and second embodiments described above are mainly intended to reduce the scale of the common neural network. They are general-purpose embodiments applicable to the fields of image processing, audio processing and the like. On the other hand, the fourth embodiment is one in which the application of a neural network is limited mainly to the field of data processing in which input data possesses local features. Whereas the first and second embodiments attempt to group input and intermediate layers from the viewpoint of reducing circuit scale, the fourth embodiment attempts to group the coupling between the input and intermediate layers (or between the intermediate and output layers) for the purpose of raising the accuracy of image processing in consideration of the special nature of an input image.

The fourth embodiment will now be described with reference to the drawings.

Figure 21:
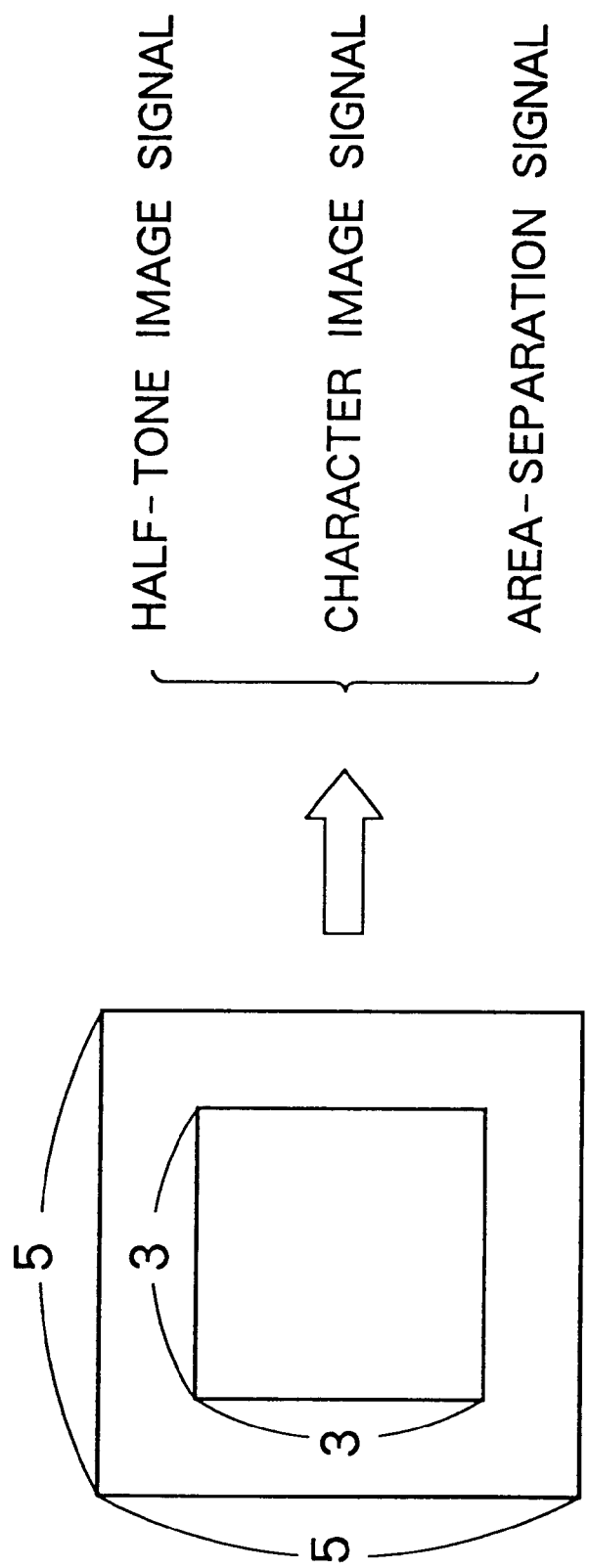
FIG. 21 is a diagram showing the range of pixels to be referred to when neural coupling coefficients are learned in a case where an input image is a binary image and in a case where the input image is a half-tone image in the fourth embodiment.

The fourth embodiment discloses an image processing method for restoring a binary image to a multivalued image. That is, in general terms, as shown in FIG. 21, a block of 5×5 pixels is inputted, the block is converted into multivalued edge image data and multivalued half-tone data, the picture characteristic within the block is judged and, based upon the results of judgment, the multivalued edge image data or the multivalued half-tone image data, whichever is optimum, is selected and outputted. It goes without saying that the size of the block shown in FIG. 21 is nothing more than a simple example.

The image processing method characteristic of the fourth embodiment involves the following:

(1) A neural network is used.

(2) In learning of the neural network, a 5×5 block of the kind shown in FIG. 21 is inputted as data for learning. However, in the learning of an image having a pronounced edge, such as the image of a character, learning data contained in a 3×3 zone of the 5×5 area is used. In the learning of a half-tone image, the image data in all 5×5 blocks is used.

(3) The learning of an image having a pronounced edge, such as the image of a character, is performed first, and the coupling constants (synapse parameters) of neurons closely related to processing of an image having a pronounced edge are decided. In the learning of a half-tone image, these previously decided neural coupling constants are fixed, and the coupling constants of neurons for the half-tone image are decided later (this is a second learning method).

Point (2) above will be described in further detail. Image data having a pronounced edge such as that of a character exhibits strong local features or properties. Conversely, in a case where the original image data is that of a half-tone image, local features are weak and the original tones are diffused over a wide area if the half-tone image is binarized as by an error diffusion method of dither method. Accordingly, in a case where learning of a neural network is performed for the purpose of restoring multivalued image data from binary image data in which the original image is a half tone, referring to a larger area is preferable. On the other hand, in a case where the original image is one having a pronounced edge, such as the image of a character, it is better to refer to a smaller area if learning of the neural network is performed for the purpose of restoring multivalued image data from the binary image data. In other words, when all 5×5=25 pixels are referred to in relation to restoring an image having a pronounced edge, the binary data of 25 pixels is interlocked in a complicated form and it is difficult to achieve agreement with the so-called "ideal signal" of the back-propagation method. This is the reason for approach taken in the fourth embodiment. That is, in learning an image exhibiting an edge, such as that of a character, learning data contained in the 3×3 zone of the 5×5 area is used. In learning a half-tone image, all of the image data in the 5×5 block is used.

Figure 22:
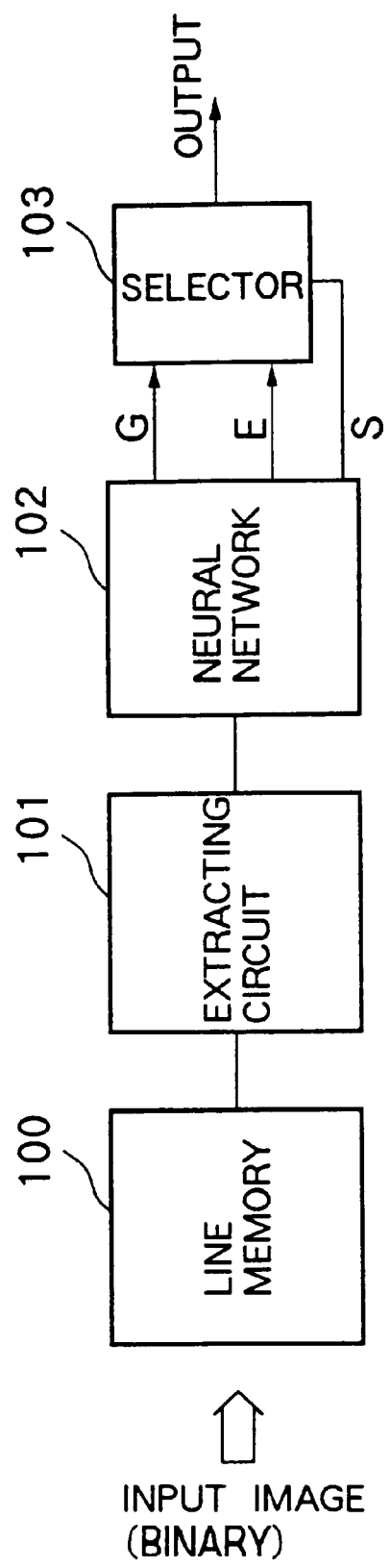
FIG. 22 is a diagram showing the construction of an image processing apparatus according to the fourth embodiment.

FIG. 22 illustrates the construction of an image processing apparatus according to the fourth embodiment. Here binary image data to which restoration processing is to be applied is entered from the outside. The data enters a line memory 100 having a capacity of five lines. The image data in a 5×5 area is extracted from the image data in the line memory by an extracting circuit 101, and the extracted image data is delivered to a neural network 102. In accordance with the fourth embodiment, the neural network 102 has coupling arrangement shown in FIG. 23.

The coupling constants of the neurons in network 102 are learned in advance through a procedure set forth below. This neural network outputs an image signal G suited to a half-tone image, an image signal E suited to an edge image, and an area-separation signal Is which represents the result of discriminating these images. These three signals enter a selector 103. The selector 103 selects and outputs the image signal G or the image signal E in accordance with the area separation signal S.

The construction of the network according to the image processing apparatus of the fourth embodiment will now be described with reference to FIG. 23.

In order to enter the 5×5 block, the neural network 102 is provided with 5×5=25 neural elements in its input layer. In order to output the half-tone image signal G, the character image signal E and the area separation signal Is, the output layer of the network is provided with three neural elements. The intermediate layer is composed of only a single layer, by way of example, and the total number of elements in the layer is 5×5=25.

As for the coupling between the neural elements of the layers, each of the 25 elements of the input layer is connected to all of the elements of the intermediate layer.

The coupling between elements of the intermediate and output layers will now be described. The neuron of the output layer which outputs the half-tone image signal G is coupled to all 25 elements of the intermediate layer. Specifically, as described in relation to FIG. 21, the half-tone image signal G is decided upon referring to all 5×5 pixels. In other words, the coupling constants between the output-layer neuron which outputs the half-tone image signal G and all 25 of the intermediate-layer elements are also decided upon referring to all 5×5=25 pixels.

The output-layer neuron which outputs the area-separation signal Is also is coupled to all 25 elements of the intermediate layer. That is, both the separation signal Is and the coupling constants between the output-layer neuron which outputs Is and all 25 elements of the intermediate layer are decided upon referring to all pixels of the 5×5 block.

On the other hand, in contrast to G and Is, the output-layer neuron for outputting the character image signal E is coupled to only 3×3=9 elements of the intermediate layer. That is, as described in relation to FIG. 21, the character image signal E is decided upon referring to 3×3=9 pixels. In a case where the character image signal E has been restored from binary data "0" and "1", E has a characteristic much closer to "0" or "1" than the intermediate values of 0.4, 0.5, 0.6, and so on. Therefore, coupling to the output element E is reduced to achieve a simplification.

The position of the 3×3=9 block in the 5×5 block will now be described. In principle, there is no strict limitation upon the positional relationship between the 5×5 block and the 3×3 block in FIG. 21. However, the binary image data should be decided in accordance with the kind of binarizing processing used to generate the original image. In the fourth embodiment, multivalued data regarding one pixel of interest is restored from the 5×5 block, and therefore it is preferred that the center of the 5×5 block be made to coincide with the center of the 3×3 block, as illustrated in FIG. 21.

As described above, the fourth embodiment is characterized by the coupling between the neurons of the intermediate layer and those of the output layer. Specifically, as set forth earlier, the output-layer neuron which outputs the character image signal E is coupled to only some of the neurons of the intermediate layer. Two learning methods will now be proposed in which special coupling of this kind is utilized in a positive manner.

Learning Method (1)

At the time of learning, a binary image is applied as an input image for learning, and a multivalued image is provided as an ideal output applied to the neural network 102.

However, since it is impossible to obtain a multivalued image which is an ideal output by restoring the binary image, in actuality a multivalued image (which is adopted as an ideal signal) in which the data is clearly understood is binarized and applied as the input signal for learning. Learning is performed by giving exactly the same ideal signal for the half-tone image signal G and character image signal E. That is, as shown in FIG. 24, multivalued image data 110 is prepared as an original image, this image data 110 is binarized by a 5×5 dither matrix 111 and a 3×3 fixed-threshold matrix 112, and the items of image data G and E are obtained. Further, the image data 110 enters an area-separation filter 113 as well so that the signal S is obtained. In accordance with the signal S, a selector 114 selects either the signal G binarized by the binarizer 111 or signal E binarized by the binarizer 112. Binary image data 116 for learning thus obtained is extracted every block of 5×5 pixels, and the data is inputted to the input layer of the network shown in FIG. 23. The multivalued signal 110 and the area-separation signal 115 of the original image are applied to the output layer as the ideal output signals.

Half-tone multivalued image data also is capable of being inputted for learning. However, the number of connections between the intermediate layer and output layer with regard to the character image signal E are few. Consequently, owing to the combination of "1"s and "0" is of the inputs to the input layer, the effect of weighting of the central pixel (the pixel of interest) strongly remains and characters or edges of high-frequency components readily remain. As a result, no problems are encountered even if the the half-tone multivalued image data is inputted for learning.

With regard to the area-separating signal for learning, edge detection is performed based upon the multivalued ideal signal or it will suffice to apply the result obtained by performing a correction.

Further, it is permissible to apply an image in which character areas and half-tone areas are distinctly divided into, say, rectangular shapes from the start. Moreover, if character images and half-tone images are prepared and combined to form an image, the ideal signal of an area-separation signal can be generated as a matter of course.

Learning Method (2)

The second learning method is divided into two stages (step I and step II), as shown in FIGS. 25A and 25B. With regard to generation of the learning data, however, use is made of the arrangement of FIG. 24 in the same way as the first learning method.

FIG. 25A is for describing the processing in step I. In this step, the coupling constants between the input layer and the intermediate layer, as well as the coupling constants between some of the neuron elements of the intermediate layer and the neural element E of the output layer, are decided while inputting a learning signal of a kind that is best suited in order to output the character image signal E. More specifically, at step I, a binary character image signal prepared for 5×5 learning is inputted to all elements of the input layer 25 to perform learning, whereby the coupling constants indicated by small black circles are decided. The coupling between neurons indicated by the small black circles is fixed.

Next, at step II of FIG. 25B, learning for the half-tone image signal G and the area-separation signal S is carried out in a state where the coupling constants (indicated by the small black circles) decided for the character image are fixed. That is, at step II, the binary half-tone image signal prepared for 5×5 learning is inputted to all 25 elements of the input layer, and the remaining coupling constants indicated by the small white signals in FIG. 25B are decided.

The characterizing features of the second learning method are as follows: With regard to the 9 (3×3) neural elements of the intermediate layer to which the output-layer neural elements (E, G) for the character image signal E and half-tone image signal G are commonly coupled, coupling constants are obtained that are suited to the nature of both images E, G and the nature of the area-separation signal S. As for the 16 elements of the intermediate layer that are not shared, coupling constants which satisfy only the two types of signals, namely the half-tone image signal G and the area-separation signal S, suffice. As a result, convergence of the coupling constants at the time of learning is greatly improved.

The coupling constants for the aforementioned nine shared elements of the intermediate layer are decided in order to improve the output of the character image signal E. However, even if the coupling constants for G and S are inadequate, the coupling strengths (coupling constants) of the 16 unshared elements of the intermediate layer perform a correcting function in such a manner that G and S approach the ideal signals.

In a case where a half-tone image is contained in the image data for learning in step I, and in a case where a character image is contained in the image data for learning in step II, an arrangement should be adopted in which learning is performed and the coupling constants updated only when the ideal signal of the area-separation signal S indicates the character image in the first case and the half-tone image in the second case. Learning is not performed in other cases.

The following arrangement is proposed as a modification of the second learning method. Specifically, at step II in learning method 2, it is permissible to apply both the character and half-tone images as the applied ideal signal, input signal and area-separation signal and perform learning in all cases.

Further, in step I, in order to ideally decide coupling constants relating to the character image signal E, learning is performed by assuming a state in which all coupling is temporarily severed except for coupling constants in which all couplings are shared. The remaining coupling constants are then decided and these are fixed. The foregoing is performed at coupling between the output layer or intermediate layer and the layer preceding it, with regard to the elements of the preceding layer.

Learning Control Procedure

The procedure for learning of the neural network 102 will now be described with reference to FIG. 23.

First, the binary image data 116 shown in FIG. 24 is prepared as the learning data and the multivalued image data 110 is prepared as the ideal output. The ideal output is used in order to generate a teach signal. After the coupling strength $W_{ji}$ between the input and intermediate layers and the coupling strength $W_{kj}$ between the intermediate and output layers are initially decided in suitable fashion, the binary image data 116 is inputted as learning data to the network coupled based upon these initial values, and multivalued image data (kout) is obtained from the output. This output and the original multivalued image data serving as the aforementioned ideal output are compared, and the teach signal (teach) is generated from the comparison. This process is illustrated as the process A⇒B in FIG. 23. The coupling strengths $W_{ji}$, $W_{kj}$ are corrected from this teach signal while learning is performed in accordance with the back-propagation method. This process is illustrated as the process C⇒D in FIG. 23. When this learning is repeated, the coupling strengths $W_{ji}$, $W_{kj}$ are corrected as those appropriate for restoring the multivalued image from the binary image. The coupling strengths $W_{ji}$, $W_{kj}$ obtained as the result of learning are held within the network.

As will be readily appreciated, the learning control procedure for the fourth embodiment is substantially the same as the learning control procedure (FIGS. 3A, 3B) described in the first embodiment. The procedure for learning will be described in detail with reference to FIGS. 3A and 3B. Though the procedure shown in these flowcharts is illustrated as being the same for the first and second learning methods, portions that differ will be described in their turn.

Figure 3A:
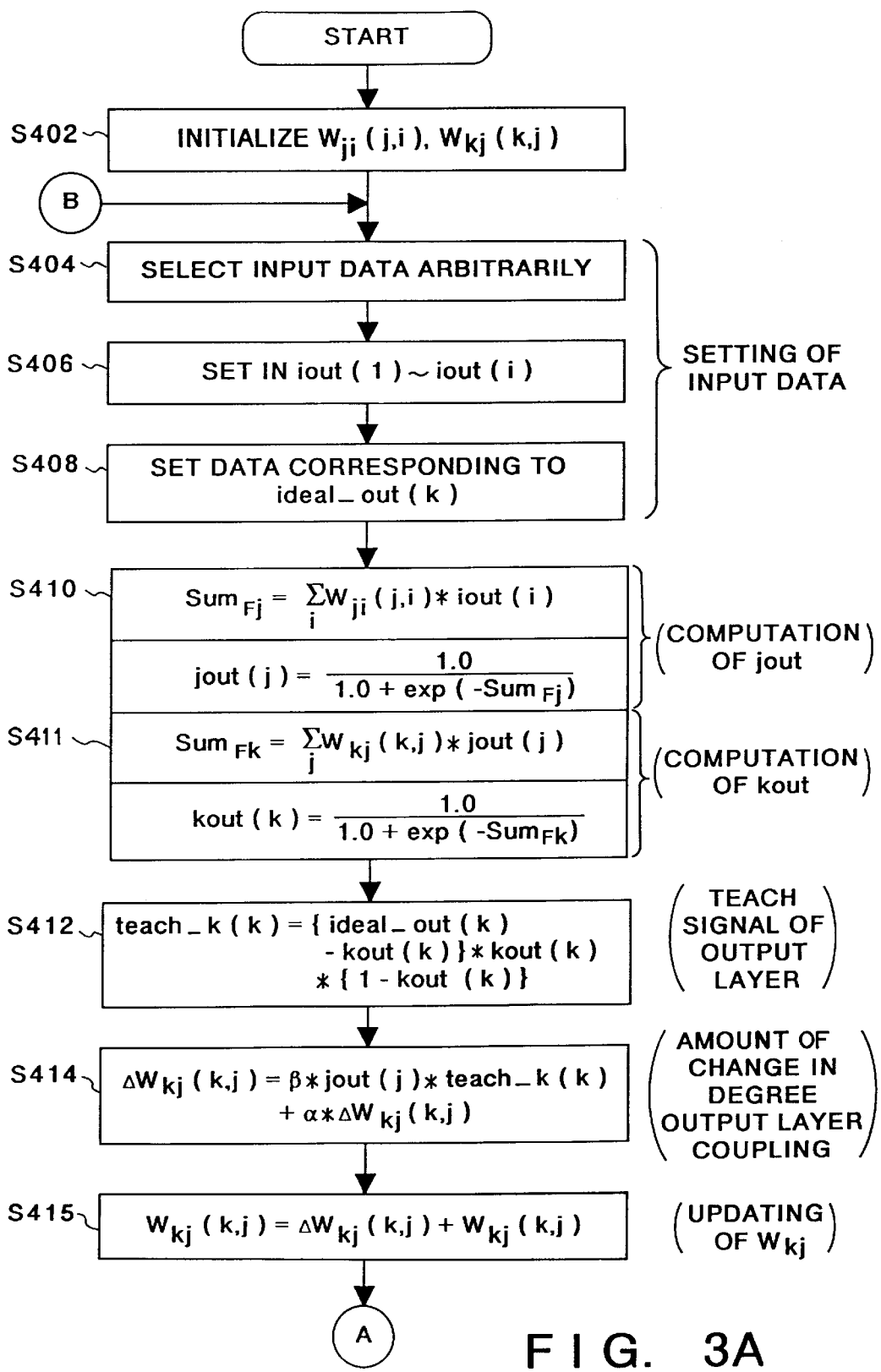
FIGS. 3A and 3B are flowcharts for describing the general learning procedure of the above-mentioned neural network.
Figure 3B:
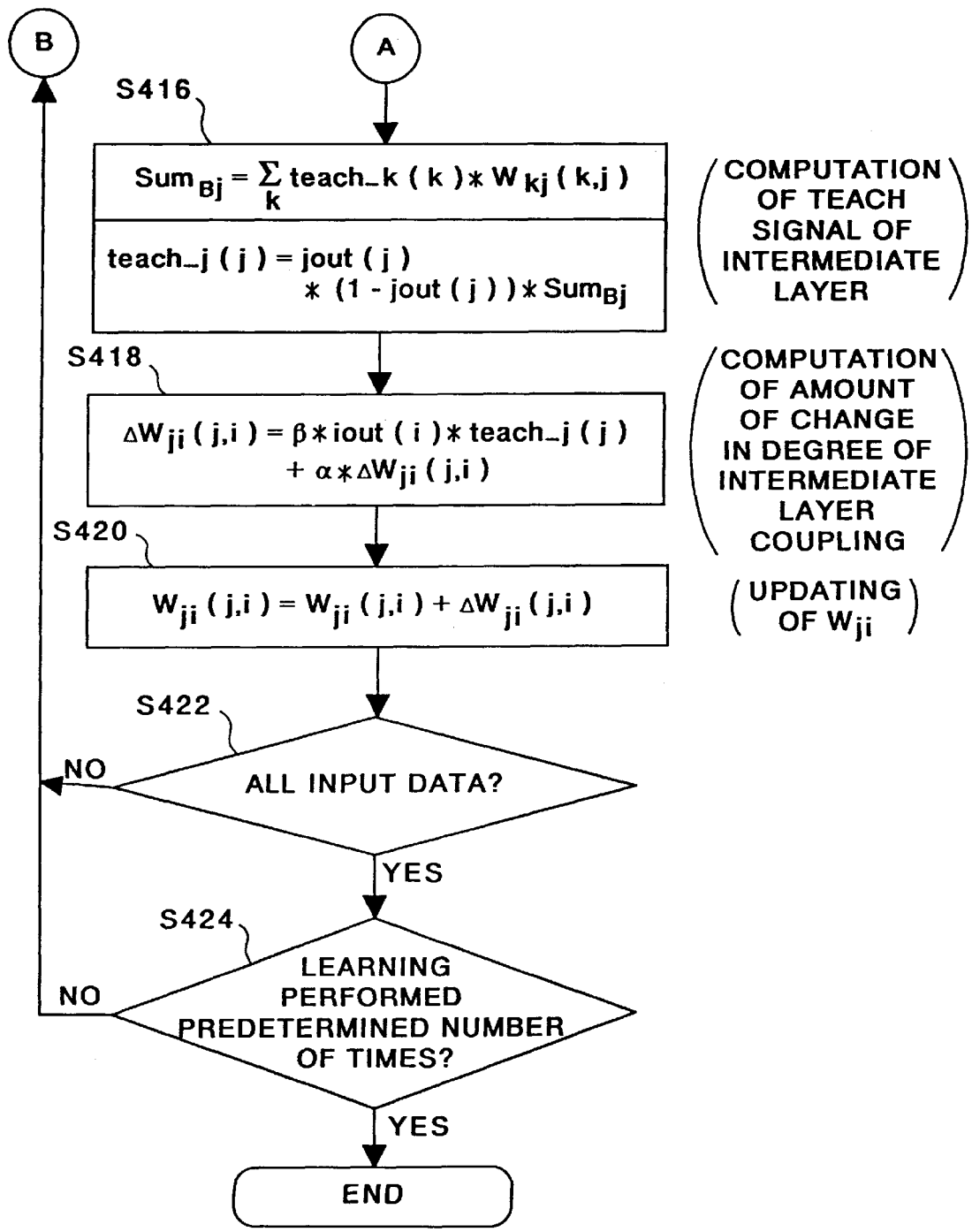

At step S402 in FIG. 3A, an initial value is applied to the weighting coefficient $W_{ji}$ which illustrates the strength of coupling between the input layer and intermediate layer, and an initial value is applied to the weighting coefficient $W_{kj}$ which illustrates the strength of coupling between the intermediate layer and the output layer. In consideration of convergence in the learning process, values in the range −0.5 to +0.5 are selected, just as in the first embodiment. At step S404, any 5×5 block is selected from the input data for learning. Steps S404 through S406 constitute a procedure for setting the input and output data to and from the neural network. Specifically, at step S406, the image data iout(i) within this 5×5 area (where i=1 through 16) is set in the neurons of the input layer. If the image data is 0 through 255 and consists of eight bits, the signals applied to the input layer have values of 0 through 1.0, which are obtained by dividing 0 through 255 by 255.

Next, at step S408, the multivalued image data 110 (ideal_out) and area-separation signal 115 are prepared as ideal outputs.

Step S410 illustrates the procedure for computing the output kout(k) based upon the given conversion coefficient. Specifically, the data iout(i) from the input layer is multiplied by the coefficient $W_{ji}$ of the intermediate layer, the sum $Sum_{Fj}$ of the products is computed in accordance with (1) mentioned above. Next, the j-th output jout(j) of the intermediate layer is computed in accordance with Eq. (2) using a sigmoid function in order to effect normalization to 0/1. Here F of $Sum_{Fj}$ means "forward". Similarly, the output value kout from the intermediate layer to the output layer is obtained is as follows: First, by using the coupling coefficient $W_{kj}$ of the output layer, the sum of the products between this coupling coefficient and the output value jout(j) of the intermediate layer is found to obtain $Sum_{Fk}$ in accordance with Eq. (3). Next, in accordance with Eq. (4), the output kout(k) of the output layer k is obtained using a sigmoid function in order to effect normalization to 0/1. Here k=1 through 3; k=1 signifies the half-tone image signal output G; k=2 the character image signal output E; and k=3 the area-separation signal output S.

Thus, computation of the forward direction with regard to one set of sample data is ended. The following is the backward computation, namely the procedure for correcting coupling strength by learning from sample data comprising the set of above-mentioned inputs and ideal outputs.

At step S412, the output kout(k) computed from the initial values (set at step S402) of $W_{ji}$, $W_{kj}$ is compared with the prepared ideal output ideal_out(k). That is, the teach signal teach_k(k) of the output layer is computed in accordance with Eq. (5) based upon the result of the comparison. Next, at step S414, a change $\Delta W_{kj}(k,j)$ in the degree of coupling of the output layer is obtained from Eq. (6).

The degree of coupling $W_{kj}(k,j)$ between the intermediate layer and output layer is updated in accordance with Eq. (7). In other words, learning is performed.

Next, at step S416, the teach signal teach-j(j) of the intermediate layer is computed. Specifically, the contribution in the backward direction from the output layer to each neuron of the intermediate layer is computed based upon Eq. (8). This contribution is normalized using the differential value of a sigmoid function, thereby computing the teach signal teach-j(j) of the intermediate layer.

Next, at step S418, a change $\Delta W_{ji}(j,i)$ in the degree of weighting of the intermediate layer is calculated in accordance with Eq. (10) using the teach signal teach-j(j). The degree of weighting $W_{ji}(j,i)$ is then updated at step S420 based upon Eq. (11).

Thus, the degrees of weighting $W_{ji}$, $W_{kj}$ are learned one time, based upon the back-propagation method, from one set (3×3 items of multivalued image data) serving as iout and the dither-processed binary data ideal_out serving as the ideal output data corresponding to the aforementioned set. It is determined at step S422 whether this operation has been carried out with regard to all sets of sampling input data. The procedure of steps S404 through S420 is repeated until the operation has been executed with regard to all sets of sampling data.

Accuracy can be considered to be low if learning with regard to all sets of sampling data is carried out only one time. Therefore, the processing of steps S404 through S422 is repeated until accuracy is believed to be high enough; i.e., until a YES decision is rendered at step S424.

In a case where learning is performed by the second learning method (FIGS. 25A, 25B) described earlier, processing for updating the coupling constant W at steps S415 and S420 is executed only with regard to those requiring updating. More specifically, in a case where the coupling constants indicated by the small black circles in FIG. 25B are learned (step I), updating of the coupling constants W indicated by the small white circles at steps S415 and S420 is omitted. Conversely, in a case where the coupling constants indicated by the small white circles are learned (step II), updating of the coupling constants W indicated by the small black circles at steps S415 and S420 is omitted.

Furthermore, the position of the block designated at step S404 should be designated randomly rather than sequentially.

The foregoing is a description of the principle of the fourth embodiment and of learning methods based upon the back-propagation method according to this embodiment.

<Modification of the Fourth Embodiment>

Figure 23:
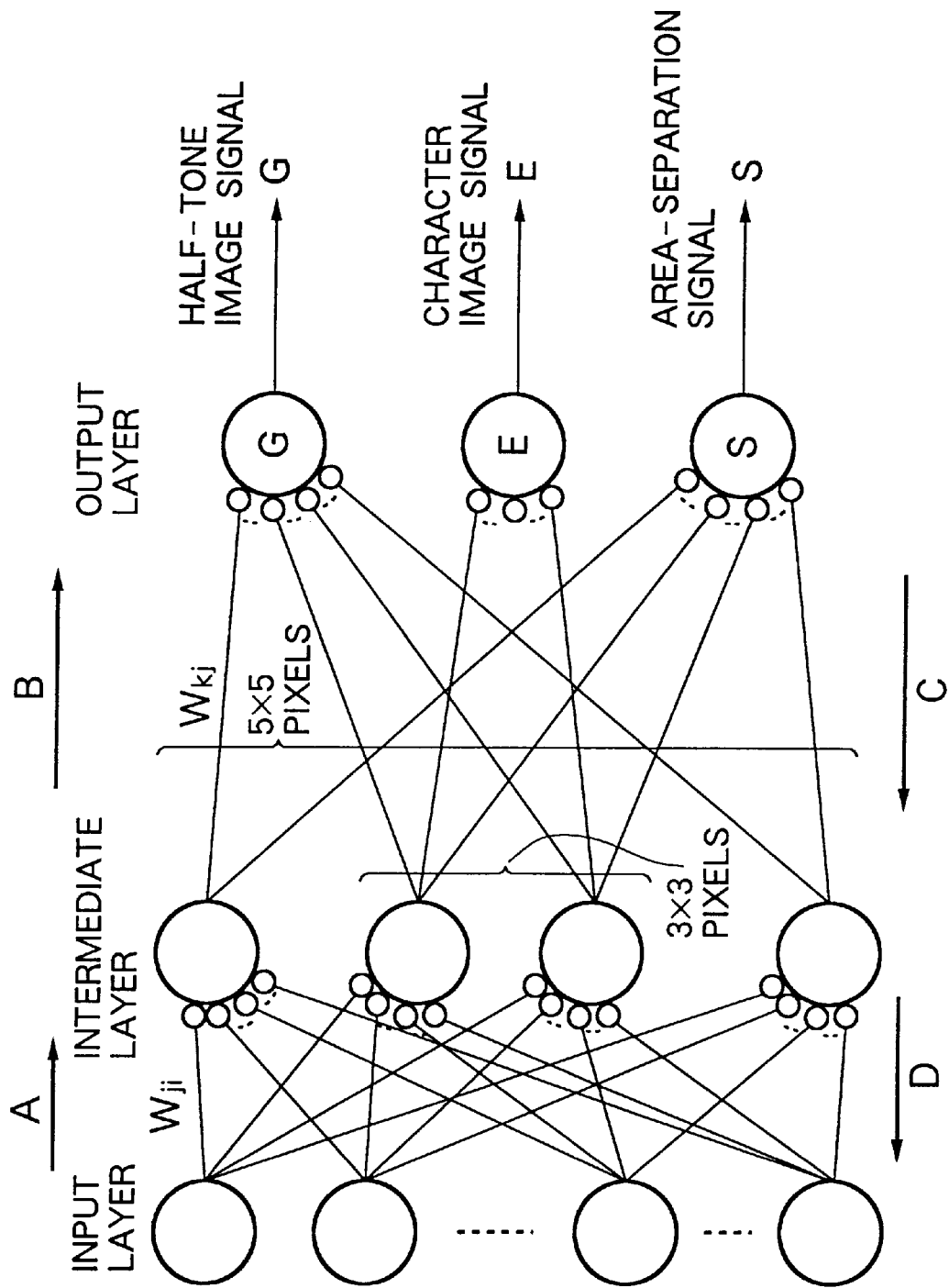
FIG. 23 is a diagram showing the construction of a neural network according to the fourth embodiment.
Figure 24:
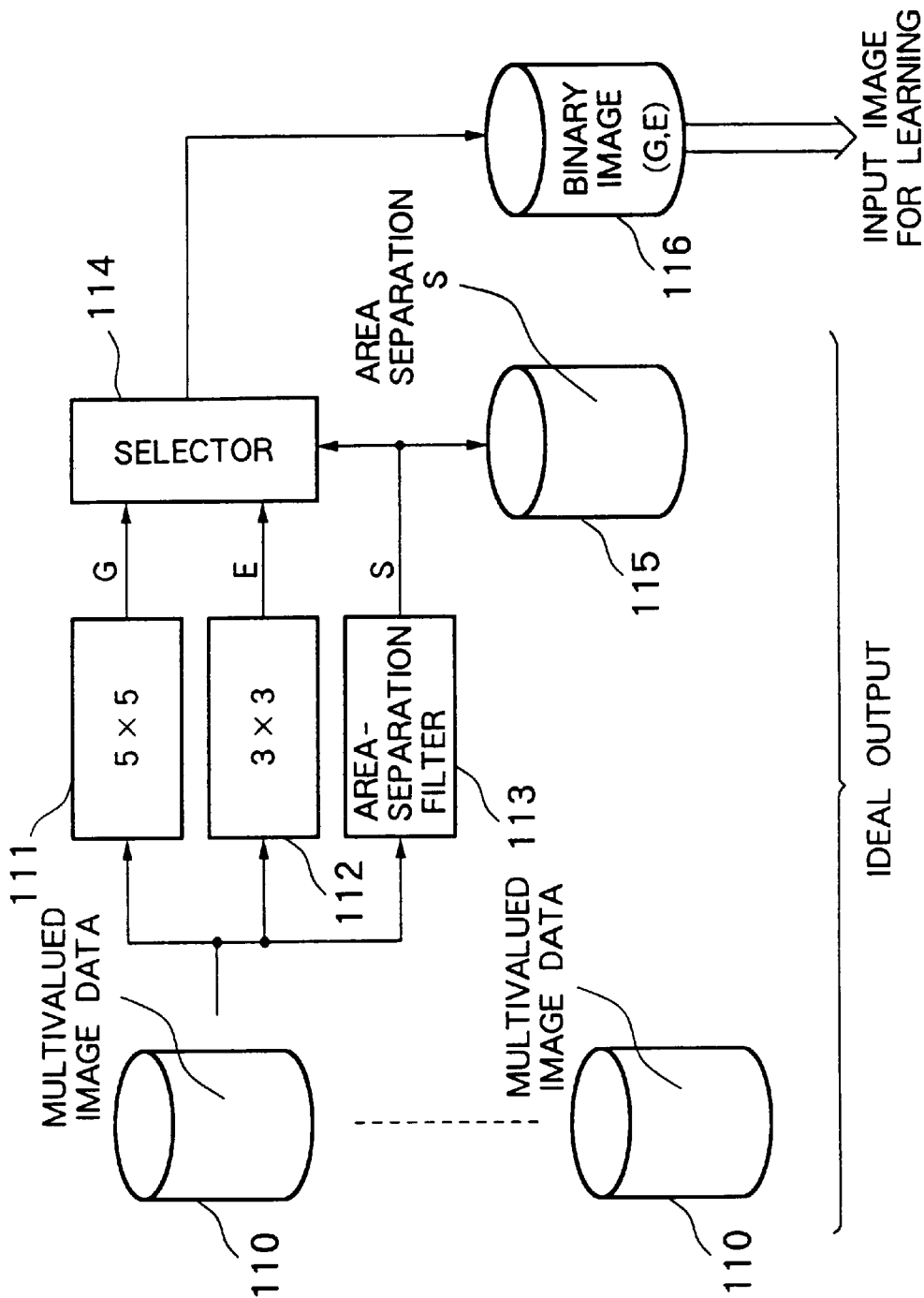
FIG. 24 is a system diagram when creating learning data for the neural network according to the fourth embodiment.

FIG. 26 is a block diagram showing the construction of a neural network according to a modification of the fourth embodiment illustrated in FIG. 23. According to the fourth embodiment, as shown in FIG. 23, the neural elements relating to the output of the character image signal E are 25 in number in the input layer and nine in number in the intermediate layer. In this modification, the input- and output-layer neural elements relating to the character image signal E are nine in number in both the input and intermediate layers. In particular, the nine elements of the input layer are nine pixels only, namely the pixel of interest and the pixels adjacent to it. As a consequence, the coupling constants best suited to processing for restoring the binary image of a character image to a multivalued image can be learned without any influence from the "1"s and "0"s of the peripheral pixels.

As for the construction of the apparatus according to this modification, reference can be had to that (FIG. 22) of the fourth embodiment illustrated in FIG. 23. Further, it is possible to refer to the control procedure of FIGS. 3A and 3B to comprehend the control procedure for learning this modification. As for the learning method, reference can be made to that of the fourth embodiment. Data creation for learning can be understood by referring to that (FIG. 24) according to the fourth embodiment.

FIGS. 27A and 27B correspond to FIGS. 25A and 25B of the fourth embodiment.

<Other Modification of the Fourth Embodiment>

Another modification of the fourth embodiment will now be described.

In the fourth embodiment (FIG. 23) and the modification thereof (FIG. 26), the size of the block is 5×5. However, this does not impose a restriction upon the present invention. Further, in the foregoing embodiments, the 3×3=9 elements in the intermediate layer share all-elements of the output layer and the output. However, the number of elements need not be nine.

Further, the numbers of elements in the input and intermediate layers of the neural network need not coincide, and the number is not limited to 25.

Though the intermediate layer is only a single layer in the foregoing embodiment, the number can be set freely to two, three, etc.

Further, though restoration from binary values to multiple values is described in the foregoing embodiment, this does not impose a limitation upon the invention. The invention can be applied very easily to processing for a conversion from multiple values to binary values.

<Fifth Embodiment>

The first through fourth embodiments described above are characterized in that the connections between neurons are grouped in order to raise the efficiency of arithmetic operations in the neural network. In the fifth embodiment to be described below, multiplication of weighting coefficients in part of a layer is replaced by a shift operation, thereby reducing the scale of the network circuitry.

In order to substitute a shift operation for the multiplication of weighting coefficients in part of a layer, the topology of the neural network which is the object of the substitution can be of any kind. Accordingly, the neural network which is the object of substitution in the fifth embodiment employs the network of FIG. 2. The problem dealt with in the fifth embodiment is how to substitute a shift circuit for an arithmetic operation in which weighting coefficients are multiplied in the intermediate layer of a neural network while the coupling coefficients between neurons is decided by learning in accordance with the procedure of FIGS. 3A and 3B. Three methods of substitution are proposed below.

Method 1

Multiplication of $W_{ji}$ in each coupling is replaced by a single power of 2 (that is, by $2^n$). In this case, W is replaced by the power of 2, among the values of $2^n$, that is closest to $W_{ji}$. In other words, $W_{ji}=2n$ is adopted.

Method 2

Multiplication of $W_{ji}$ in each coupling is replaced by the sum of terms (inclusive of one term) of powers of 2 whose value is closest to $W_{ji}$. These terms are from a power series of 2, namely a sum of terms of less than a predetermined number (plurality) of powers of two. In other words, $W_{ji} \approx 2^a + 2^b + 2^c + \ldots$ is adopted.

Method 3

This method resembles method 2 above. Though method 2 raises accuracy, large-scale circuitry is involved since $W_{ji}$ is replaced by a power series (i.e., a plurality of arithmetic circuits for powers of 2). Accordingly, in method 3, $W_{ji}$ is approximated by a power series of the minimum number of terms within the range of an allowable error $\Delta E$. Therefore, according to method 3, the allowable error $\Delta E$ is decided beforehand. Then, among the terms $2^n$, that term ($2^k$ is adopted) closest to $W_{ji}$ is obtained. If the difference between $W_{ji}$ and $2^k$ is less than $\Delta E$, $W_{ji}$ is replaced by $2^k$.

If, in a case where the aforesaid error is not less than $\Delta E$, the difference between $W_{ji}$ and the sum of terms ($2^k+2^l$ is adopted) whose value is closest to $W_{ji}$ among a series of powers of two comprising two terms is less than $\Delta E$, then $W_{ji}$ is replaced by this difference.

In the case where the error is not less than $\Delta E$, sums of successively greater numbers of terms are taken, such as the sum of three terms, the sum of four terms, etc., this being continued until an error less than $\Delta E$ is obtained.

In a case where $W_{ji}$ is a power of 2 (i.e., $2^n$) in methods 1 through 3 above, the arithmetic operation of multiplying a certain input by $W_{ji}$ is implemented by shifting the input n bits. Further, in a case where w can be approximated by the sum of powers of 2 (e.g., $2^n+2^m+2^1$) in method 2 or method 3, the arithmetic operation of multiplying an input by $W_{ji}$ is implemented by shifting the input n, m and 1 bits and taking the sum of these shifts. Accordingly, the section which multiplies the weighting coefficients (coupling constants) of the input network is attained by a shift operation or by a shift operation and addition operation.

Figure 28:
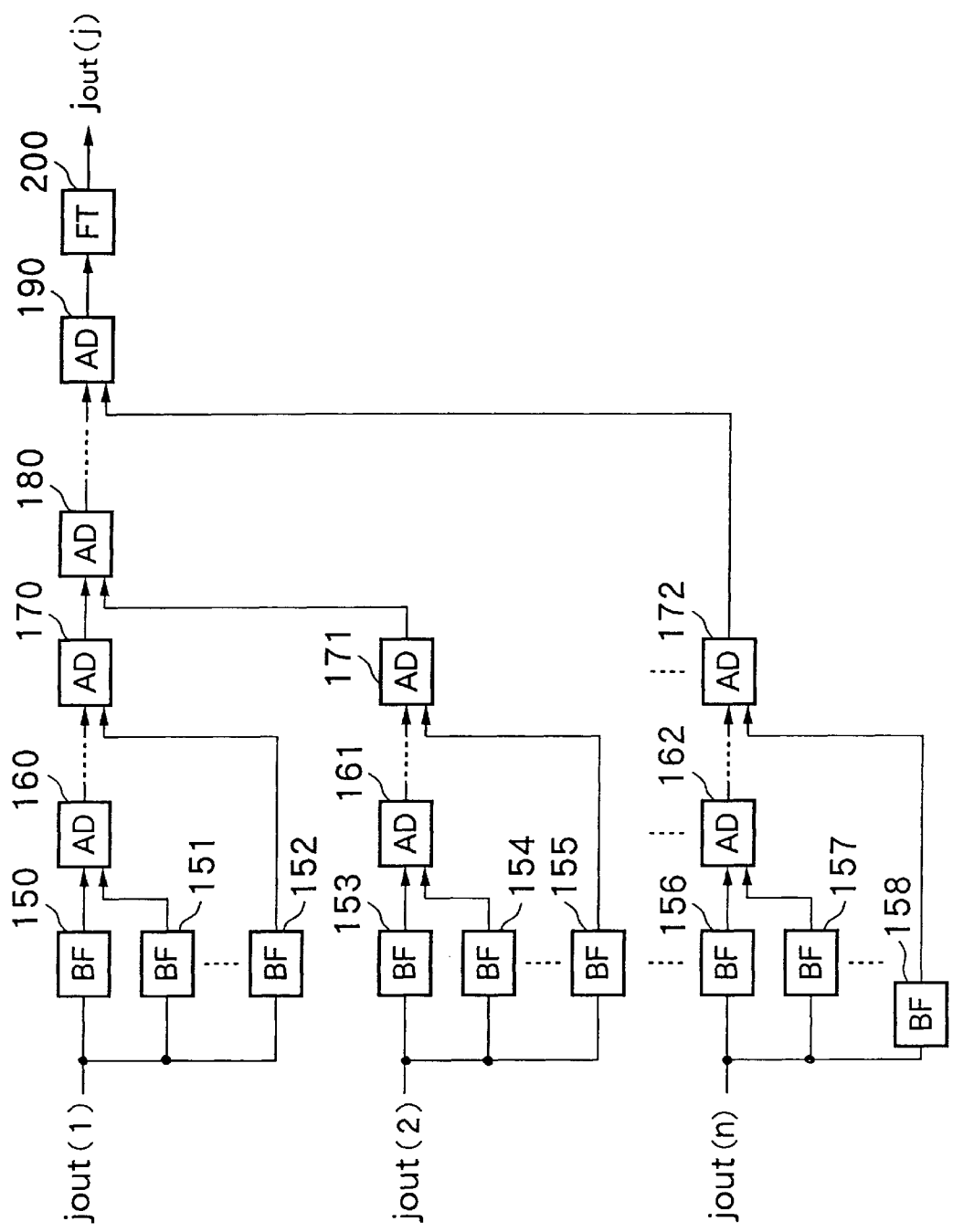
FIG. 28 is a diagram showing the construction of neurons according to the fifth embodiment.

FIG. 28 is hardware circuit which implements the processing performed by the neurons in the intermediate layer of the network shown in FIG. 2. In FIG. 28, BF represents a bit shifter and AD represents an adder for adding shifted inputs applied thereto. Further, FT denotes a sigmoid-function table having a characteristic of the kind shown in FIG. 9 (or FIG. 10). The operation of circuit shown in FIG. 28 will now be described.

By way of example, assume that the following holds:

$$W_{j1} \approx 2^{aj1} + 2^{bj1} + \ldots + 2^{cj1}$$

$$W_{j2} \approx 2^{aj2} + 2^{bj2} + \ldots + 2^{cj2}$$

$$\vdots$$

$$W_{jn} \quad 2^{ajn} + 2^{bjn} + \ldots + 2^{cjn}$$

In FIG. 28, assume that BF150 performs a shift operation of $a_{j1}$ bits, BF151 a shift operation of $b_{j1}$ bits, BF152 a shift operation of $c_{j1}$ bits, BF153 a shift operation of $a_{j2}$ bits, BF154 a shift operation of $b_{j2}$ bits, BF155 a shift operation of cj2 bits, BF156 a shift operation of $a_{jn}$ bits, BF157 a shift operation of $b_{jn}$ bits, and BF158 a shift of $c_{jn}$ bits. In such case, the output of an adder 190 is approximately equal to $$\sum_{i=1}^{n} W_{ji} \cdot iout(i)$$

An FT280 applies a sigmoid-function operation to these approximate results. That is, the operation of the circuit shown in FIG. 28 is nothing more than one operation performed the neurons of the intermediate layer.

It should be noted that while the BFs can also be realized by ordinary shift circuits, this is undesirable as it would increase the scale of the circuitry. The circuits BF of the fifth embodiment shift the terminal positions applied to the adders AD in such a manner that the inputs to the adders AD enter in shifted form.

Figure 29:
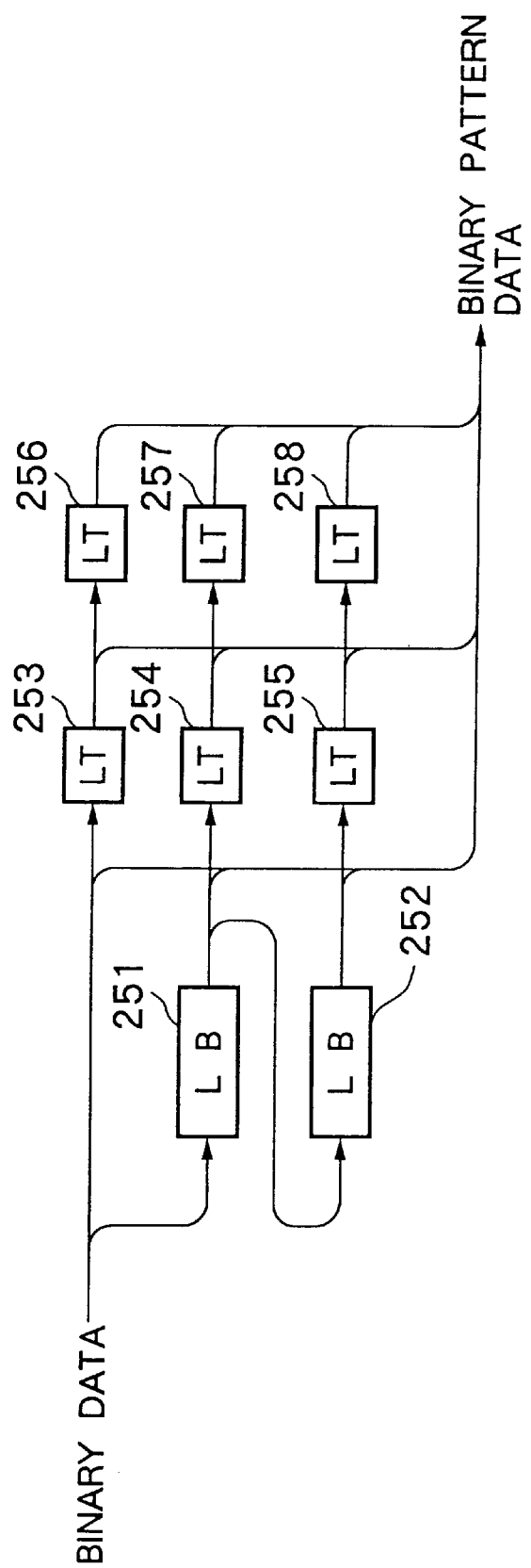
FIG. 29 is a block diagram showing an image-block extracting circuit in the neural network of the fifth embodiment.
Figure 30:
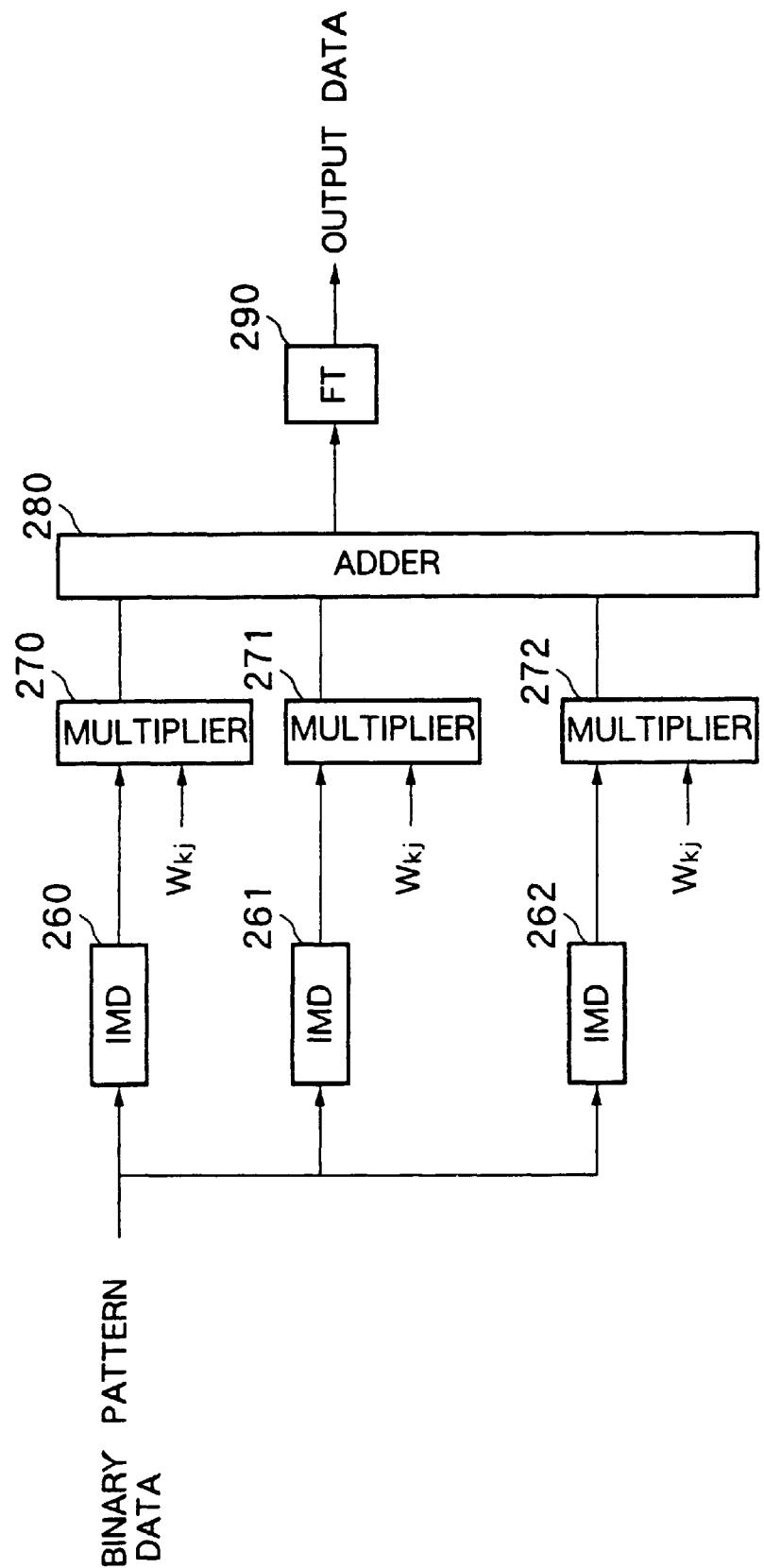
FIG. 30 is a conceptual view of the neural network according to the fifth embodiment.

FIGS. 29 and 30 are diagrams in which the neural network of FIG. 2 is replaced by shift circuits and an adder, etc. FIG. 29 is a diagram showing an example of an input circuit for making the binary image of a 3×3 area the input of a neural network. FIG. 30 is a diagram in which each neuron of the intermediate layer of FIG. 2 is substituted by the circuit of FIG. 28. In the circuit of FIG. 30, the circuit system shown in FIG. 28 is expressed as an intermediate unit IMD.

First, the entered binary data is delayed by one line by a line buffer (LB) 251, and an additional one line of delay is then applied by a line buffer (LB) 252. Thus, the image data is delayed by two lines. The undelayed data, the data delayed by one line and the data delayed by two lines are latched respectively by latches (LT) 253–255 to obtain a delay of one pixel, and a further delay of one pixel is obtained by latches (LT) 256–258. These outputs constitute binary pattern data in the form of binary data of a 3×3 area continuous in the horizontal line direction and vertical pixel direction.

The binary pattern data enters the intermediate units IMD. As described in connection with FIG. 28, the arithmetic operations in the intermediate layer of the neural network are performed by a bit shift and addition in the intermediate unit IMD. The outputs of the intermediate units IMD (260, 261, 262) enter multipliers 270, 271, 272, where they are multiplied by the weighting coefficient $W_{kj}$ of the output layer. The outputs of the multipliers are added up by an adder 280. The sum computed by the adder 280 is subjected to a table conversion by a function arithmetic unit FT, thereby obtaining the value of the corresponding sigmoid function as the final result.

Thus, the intermediate layer of any neural network can be replaced by bit-shift circuits and adders. This makes it possible to speed up the processing of the neural network.

<Modification of the Fifth Embodiment>

According to the technique of the fifth embodiment, the processing of multiplying input data by the coupling strength $W_{ji}$ in the intermediate layer approximates a series expansion of 2, and hence the result is that a value multiplied by a neuron of the intermediate layer differs from that obtained by learning. As a consequence, the output value of the network develops some error. No problems are encountered as long as this error is within allowable limits.

However, in view of the fact that it is possible for the error to exceed the allowable limits, a modification of the fifth embodiment is proposed. Specifically, an ordinary neural network has one or more intermediate layers, and hence at the very least there is coupling ($W_{kj}$) between the intermediate layer and output layer besides coupling ($W_{ji}$) between the input layer and intermediate layer. According to this proposed modification, the weighting coefficient $W_{ji}$ fixed by the hardware circuitry of FIG. 28 is left fixed, and the weighting coefficient $W_{kj}$ between the intermediate layer and output layer is relearned.

Figure 31:
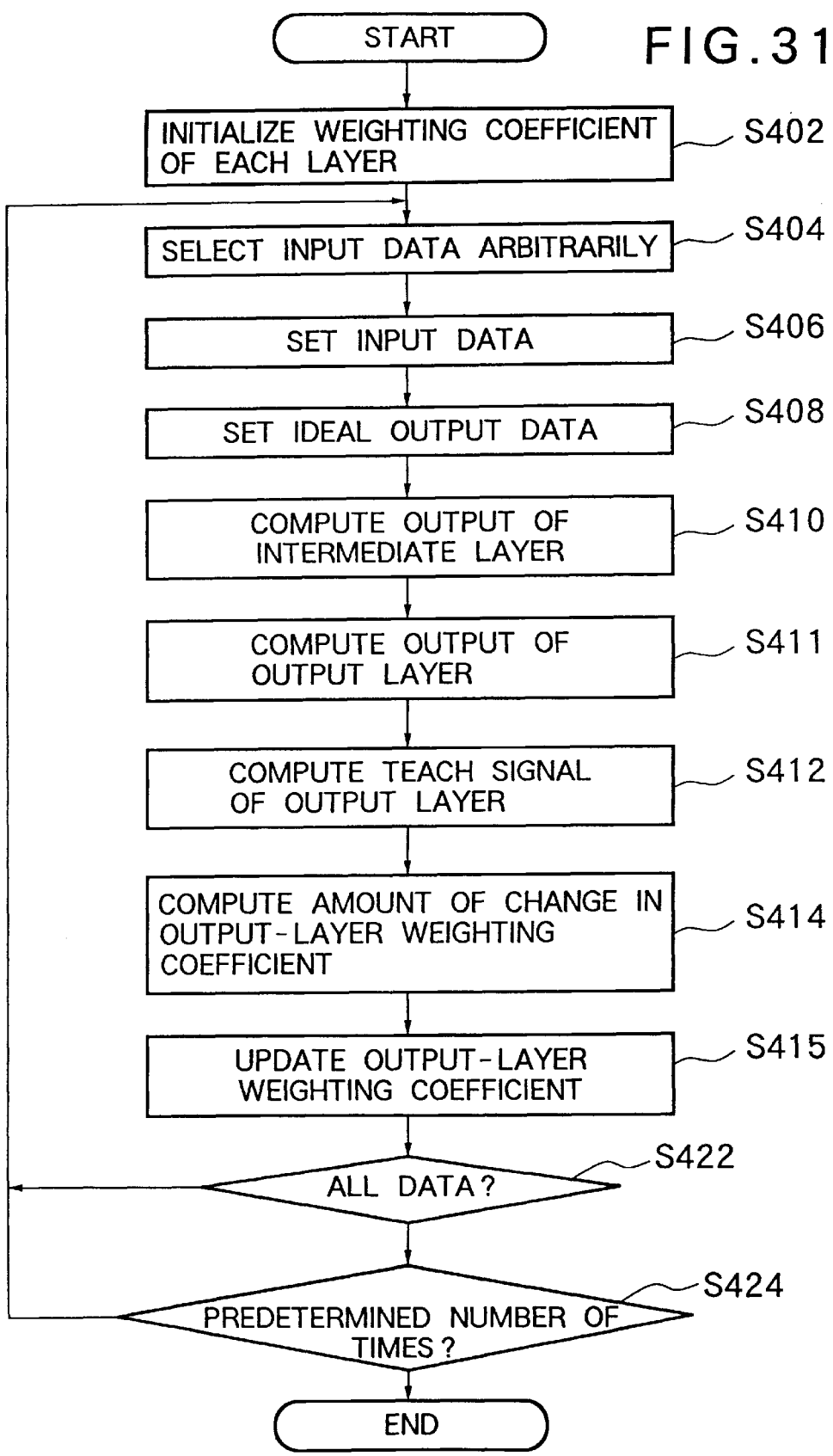
FIG. 31 is a flowchart showing a relearning procedure relating to the fifth embodiment.

FIG. 31 is a flowchart for relearning $W_{kj}$. Since the flowchart of FIG. 31 is for relearning the weighting coefficient $W_{kj}$ between the intermediate layer and the output layer, the only difference from the flowcharts of FIGS. 3A and 3B is that the operations of steps S416, S418 and S420 are unnecessary. Accordingly, with regard to the outputs of the intermediate layer based upon the fixed weighting coefficient $W_{ji}$, only the weighting coefficient $W_{kj}$ is relearned, thereby reducing the error of the output from the output layer.

In accordance with the fifth embodiment and its modification, as described above, it is possible for multiplication in the neurons to be replaced by a bit shift or by the sum of bit-shifted items.

In particular, if the network of the fifth embodiment is applied to restoration of a multivalued image from a binarized image, the input is limited to "0" or "1" and the results of a bit shift corresponding thereto are added. Consequently, it is possible to perform the arithmetic operations fully using adders of several bits at most. Accordingly, it is possible to construct the hardware of the neural network as an LSI or gate array.

Though the foregoing description relates to input of binary image data, it goes without saying that the invention is applicable also to inputs of data in other forms.

Furthermore, according to the modification described above, a neural network having an input layer, one or more intermediate layers and an output layer, in which coupling constants are decided beforehand by learning, is characterized in that a power of 2 closest to the weighting coefficient of a certain layer is obtained, and the multiplier of this weighting coefficient is substituted by a shift arithmetic unit which effects multiplication by the power of 2 obtained.

<Second Modification of the Fifth Embodiment>In FIG. 28 illustrating the fifth embodiment, the adders AD must have a size of, say, 8–10 bits in order that they are capable of dealing with the shifts of the bit-shifters BF provided in front of them. An adder of 8–10 bits has a comparatively large circuit arrangement.

A second modification is proposed for the purpose of reducing the size of the adders AD shown in FIG. 28. Specifically, according to the second modification, if a power series of 2 approximating the computation of the coupling constant $W_{ji}$ by a certain neuron is given, or in other words, if the amount of shift of each bit of the input data which enters this neuron has been decided, then a reduction in the scale of the overall circuit can be achieved by considering how to combine adders and which one or plurality of the adders should be so combined. More specifically, if the coupling constants $W_{ji}$ a neuron j=1, for example, in the intermediate layer are as follows:

$$W_{11} \approx 2^{a11} + 2^{b11} + \ldots + 2^{c11}$$
$$W_{12} \approx 2^{a12} + 2^{b12} + \ldots + 2^{c12}$$
$$\vdots$$
$$W_{1n} \approx 2^{a1n} + 2^{b1n} + \ldots + 2^{c1n}$$

then the arithmetic operation in this neuron will be expressed as follows:

$$\sum_{i=1}^{n} W_{1i} \cdot iout(i) = (2^{a11} + 2^{b11} + \cdots + 2^{c11}) \cdot iout(1) + \qquad (22)$$
$$(2^{a12} + 2^{b12} + \cdots + 2^{c12}) \cdot iout(2) +$$
$$\cdots + (2^{a1n} + 2^{b1n} + \cdots + 2^{c1n}) \cdot iout(n)$$

Figure 32:
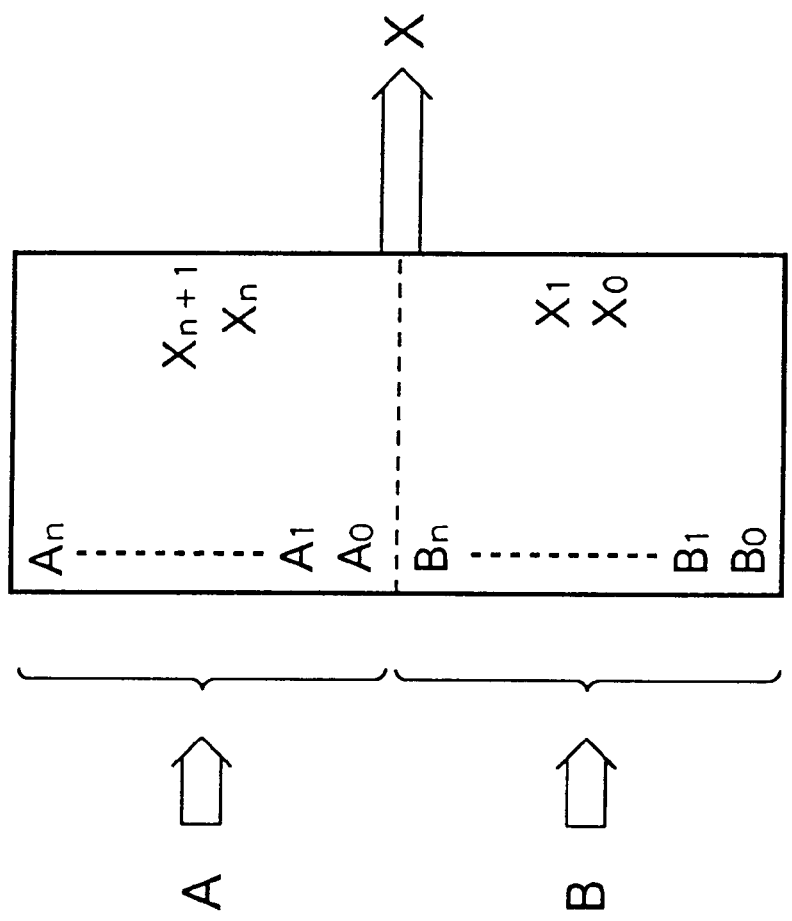
FIG. 32 is a diagram for describing the construction of an adder used in a modification of the fifth embodiment.

In Eq. (22), i(out) (i) is merely a value of "0" or "1". Accordingly, Eq. (22) is merely the result of shifting iout(i) and adding up the result of the shifting operations, and it has no terms of multiplication or division. Accordingly, the addition operation of Eq. (22) is in principle the addition of like terms having the same amounts of shift. Terms having different amounts of shift need not be applied to the adders. As long as this general rule is observed, the sequence of the adders and their combination can be selected at will. It is necessary also to be aware of the following point: Specifically, if the most significant effective bits inputted to a binary-data adder are n bits, then the output of the adder will be n+1 bits at most (in particular, if the input is one bit, the output will be two bits). Based upon the foregoing consideration, the five rules given below are set as guidelines in terms of designing the arithmetic circuit in a neuron. As shown generally in FIG. 32, the binary adder produces a sum X upon receiving A data and B data as inputs. As a matter of course, an adder of this kind adds A data and B data having the same bit values. The bit position (digit position) within one adder merely indicates the relative bit position (digit position) within the adder, and the final bit position of the output data is represented by the position of the output data line.

Rule 1:
When the outputs of bit shifters BF are assigned to the input terminals of an adder, signals having the same amounts of shift (sf) are inputted to the A terminal and B terminal of the same position.

Rule 2:
When the output of bit shifters BF are assigned to the input terminals of an adder, four or more outputs having different amounts of shift are assigned to the input terminals of the adder in a form that maintains these bit positions. For example, with regard to two items of data (e.g., $a_{11}$ and $b_{11}$) for which sf=−1 holds and two items of data (e.g., $C_{23}$ and $d_{01}$) for which sf=1 holds, if $a_{11}$ is inputted to the A1 terminal of the adder and b21 is inputted to the B1 terminal in accordance with Rule 1, then $c_{23}$ must be applied to the A3 terminal and $d_{01}$ must be applied to the B3 terminal.

Rule 3:
In a case where it is necessary that the output of a certain adder be applied to another adder, the assignment of data to the input terminals is performed in such a manner that only data which does not overlap in terms of digit position or bit position enters the same adder. Rule 3 represents an extension of Rule 2.

Rule 4:
In a case where the sum of the output of an adder and the output of a bit shifter is inputted to a single adder, items of data which do not overlap in terms of bit position are assigned so as to enter the same adder as a group.

Rule 5:
The assignment of data to the input terminals of an adder is performed in such a manner that items of data having different digit positions will enter the adder to the greatest extent possible.

FIG. 33 illustrates an example of a circuit, designed based upon the foregoing rules, for performing addition in the neurons of an intermediate layer. The circuit comprises a plurality of shift circuits BF, a four-bit adder 358, a one-bit adder 359, a one-bit adder 360, a five-bit adder 361, and a function arithmetic unit 362.

In FIG. 33, sf with regard to the bit shifters (BF) 351–357 indicates the amount of shift. If sf=n holds, an n-digit shift to the left (if n<0 holds, an |n|-digit shift to the right) is performed and the input is increased $2^n$ fold. In the example of FIG. 33, the amounts of shift of the bit shifters (BF) 351–57 are assumed to be "3", "0", "1", "−1", "2", ..., "1", "−1", respectively. Further, the n of $d_n$ (n=−2, −1, . . . , 3) indicates the bit value (bit position) possessed by the signal line to which $d_n$ is attached.

The four-bit adder 358 adds a four-bit A input and a four-bit B output. The output of a certain BF (not shown in FIG. 33), the sf of which is −1, enters the $A_0$ terminal of the adder 358. The output (sf=0) of BF 352 enters the $A_1$ terminal; the output (sf=1) of BF 353 enters the $A_2$ terminal; and the output (sf=2) of a certain BF (not shown) enters the $A_3$ terminal. The aforementioned terminals A0 through A3 are assigned as one item of data to the A-input terminal group of adder 358. This is in accordance with Rule 2.

Next, on the basis of Rule 5, items of data having the same amounts of shift (sf=−1 through 2) for their digits as respective ones of the A inputs area applied to the B inputs of the adder 358 collectively in accordance with Rules 1 and 2.

In accordance with Rule 1, two inputs for both of which sf=1 holds are added by the one-bit adder 359. Similarly, in accordance with Rule 1, two inputs for both of which sf=−1 holds are added by the one-bit adder 360. The outputs of the adders 359, 360 are $d_1$ through $d_2$ and $d_{-1}$ through $d_0$, respectively. Since these do not overlap, they are collected together in accordance with Rule 3. Further, the output of the BF for which sf=3 holds is grouped together with $d_1$ through $d_2$ and $d_1$ through $d_0$ in accordance with Rule 4, and the result enters the five-bit adder 361 as the five-bit input $d_{-1}$ through $d_3$.

Meanwhile, the output of the four-bit adder 358 also is $d_{-1}$ through $d_3$, and this enters the five-bit adder 361 in accordance with Rule 5. The output of another BF for which sf=−2 holds is grouped together with the output ($d_{-1}$ through $d_4$) of the five-bit adder 361 in accordance with Rule 4.

In FIG. 33, the portions of the circuit arrangement at which Rules 1 through 5 are employed are represented by ① through ⑤, respectively.

Order of priority is not assigned to application of the above-described Rules 1 through 5. In addition, utilization of all rules is not required, and there are no instances in which the presence of portions that are exceptions to the rules are allowed.

In the modifications of the fifth embodiment described above, the inputs are limited to "0" or "1", and since the results of the bit shifts corresponding thereto are added, it is possible for arithmetic operations to be performed fully using adder having several bits at most.

Accordingly, even if a design in which one neuron is replaced by a circuit of the kind shown in FIG. 33 is applied to a neural network as a whole, it will still be possible for the hardware of the circuitry for the overall network to be constructed using an LSI or gate array.

Though the foregoing relates to inputs of binary image data, binary data is not limited to images.

Further, though the modifications take the weighting coefficients of the intermediate layer as an example, it will suffice if the input from the preceding stage is a binary value of "0" or "1". For example, the invention can be applied in any layer by executing processing based upon a threshold-value function.

The present invention is not limited to the above embodiments and various changes and modifications can be made within the spirit and scope of the present invention. Therefore, to apprise the public of the scope of the present invention, the following claims are made.

What is claimed is:

1. A method of concretely constructing a neural network in which coupling coefficients have already been decided by learning, comprising the steps of:
   determining, with respect to each coupling coefficient of one or more neural elements contained in said neural network, a sum of a plurality of terms of powers of 2 so that the number of the plurality of terms is minimized under the condition that a difference between the sum and the coefficient is not greater than a predetermined allowable error; and
   replacing multiplication between a coupling coefficient and input data inputted to the neural element thereof by processing for shifting said input data by each exponent for every one of a plurality of exponents of the obtained powers of 2, and addition processing for adding the results of shifting.

2. The method according to claim 1, wherein said network has an input layer, one or more intermediate layers, and an output layer, and said multiplication is performed for the sake of coefficients between said input layer and said intermediate layer.

3. The method according to claim 1, wherein said processing for shifting said input data by each exponent for every one of a plurality of exponents of the obtained powers of 2 is executed by regarding the inputted data in said addition processing as data of value after the shifting.

4. A neural network constructed by the method according to claim 1.

5. A method of concretely constructing a neural network in which coupling coefficients have already been decided by learning, comprising the steps of:
   approximating each coupling coefficient of a plurality of neural elements contained in said neural network by a term of a power of 2;
   replacing multiplication between each coupling coefficient of the plurality of neural elements and input data inputted to this neural element by processing for shifting the input data by an exponent of the obtained power of 2; and
   adding all the shifted data by one or more adders by integrating into a single addend a plurality of shifted data which do not share the same digit positions among the shifted data arising from different neural elements, and inputting the integrated addend to one input terminal of one of the adders.

6. The method according to claim 5, wherein the coupling coefficients of remaining neural elements are relearned after said multiplication is replaced by shift processing.

7. A neural network constructed by the method according to claim 5.

8. A method of concretely constructing a neural network in which coupling coefficients have already been decided by learning, comprising the steps of:
   approximating each coupling coefficient of a plurality of neural elements contained in said neural network by a sum of a plurality of terms of powers of 2;
   replacing multiplication between each coupling coefficient of the plurality of neural elements and input data inputted to this neural element by processing for shifting said input data by an exponent for every one of a plurality of exponents of the obtained powers of 2, and addition processing for adding the results of shifting; and
   in an adder having two input terminals used in this addition processing, integrating into a single addend a plurality of shifted data which do not share the same digit positions among the shifted data arising from different neural elements, and inputting the integrated addend to one of the input terminals of the adder.

9. The method according to claim 8, further comprising the step of inputting, to respective input terminals of the adder, two items of shifted data at the same digit positions in shifted data arising from two or more different neural elements.

10. The method according to claim 8, wherein the coupling coefficients of remaining neural elements are relearned after said multiplication is replaced by shift processing and addition processing.

11. The method according to claim 8, wherein when the coupling coefficient of each of the plurality of neural elements is approximated by a sum of a plurality of terms of powers of 2, the plurality of terms is determined so that the number of terms is minimized under the condition that a difference between the sum and the coefficient is not greater than a predetermined allowable error.

12. A neural network constructed by the method according to claim 8.

* * * * *

UNITED STATES PATENT AND TRADEMARK OFFICE
CERTIFICATE OF CORRECTION

PATENT NO. : 6,243,490 B1
DATED : June 5, 2001
INVENTOR(S) : Yoshinobu Mita

It is certified that error appears in the above-identified patent and that said Letters Patent is hereby corrected as shown below:

<u>Title page,</u>
Item [56], References Cited, OTHER PUBLICATIONS,
Under Watanabe et al., "Neura" should read -- Neural --; and
Under Marchesi et al., "Circuitts" should read -- Circuits --.

<u>Column 2,</u>
Line 4, close up right margin; and
Line 5, close up left margin.

<u>Column 14,</u>
Line 50, "is" should read -- 3 --.

<u>Column 15,</u>
Line 45, "$Sum_{Fj}=\rho W_{ji}*out$" should read -- $Sum_{Fj}=\Sigma W_{ji}*out$ --;
Line 50, "able" should read -- table --;
Line 65, "products" should read -- products of --.

<u>Column 16,</u>
Line 46, "$f'(sum)*W_{kj}$" should read -- $\Sigma f'(sum)*W_{kj}$ --.

<u>Column 17,</u>
Line 33, "is" should be deleted.

<u>Column 20,</u>
Line 3, "(renumber" should read -- (r-number --;
Line 26, "layer" should read -- layer and --; and
Line 55, "$sum_{j=\Sigma wkj}xjout$" should read -- $sum_j=\Sigma W_{kj}xjout$ --.

<u>Column 24,</u>
Line 38, "of" should read -- or --.

<u>Column 25,</u>
Line 5, "Is" should read -- S --;
Line 16, "Is," should read -- S, --; and
Line 38, "Is" should read -- S, --.

UNITED STATES PATENT AND TRADEMARK OFFICE
CERTIFICATE OF CORRECTION

PATENT NO. : 6,243,490 B1
DATED : June 5, 2001
INVENTOR(S) : Yoshinobu Mita

It is certified that error appears in the above-identified patent and that said Letters Patent is hereby corrected as shown below:

Column 28,
Line 48, "is" should be deleted.

Column 31,
Line 43, "$W_{jn}2^{ajn}$" should read -- $W_{jn} \approx 2^{ajn}$ --.

Column 34,
Line 51, "351-57" should read -- 351-357 --.

Column 35,
Line 26, close up right margin; and
Line 27, close up left margin.

Signed and Sealed this

Third Day of December, 2002

JAMES E. ROGAN
*Director of the United States Patent and Trademark Office*